US012477627B2

(12) United States Patent
Fukuda et al.

(10) Patent No.: US 12,477,627 B2
(45) Date of Patent: Nov. 18, 2025

(54) FILM HEATER

(71) Applicant: DENSO CORPORATION, Kariya (JP)

(72) Inventors: Koutarou Fukuda, Kariya (JP); Kouji Oota, Kariya (JP); Syuzou Oda, Kariya (JP); Takumi Okamoto, Kariya (JP); Taro Ogura, Kariya (JP)

(73) Assignee: DENSO CORPORATION, Kariya (JP)

( * ) Notice: Subject to any disclaimer, the term of this patent is extended or adjusted under 35 U.S.C. 154(b) by 878 days.

(21) Appl. No.: 17/728,641

(22) Filed: Apr. 25, 2022

(65) Prior Publication Data

US 2022/0256656 A1 Aug. 11, 2022

Related U.S. Application Data

(63) Continuation of application No. PCT/JP2020/042452, filed on Nov. 13, 2020.

(30) Foreign Application Priority Data

Nov. 27, 2019 (JP) .................................. 2019-214228

(51) Int. Cl.
*H05B 3/84* (2006.01)
*B60J 1/00* (2006.01)
*B60S 1/02* (2006.01)

(52) U.S. Cl.
CPC ................ *H05B 3/84* (2013.01); *B60J 1/002* (2013.01); *B60S 1/026* (2013.01);
(Continued)

(58) Field of Classification Search
CPC ................ H05B 3/84; H05B 2203/007; H05B 2203/013; H05B 2203/016;
(Continued)

(56) References Cited

U.S. PATENT DOCUMENTS

| 5,798,499 A | 8/1998 | Shibata et al. |
| 2010/0200568 A1* | 8/2010 | Liu ........................ H05B 3/265 219/553 |

(Continued)

FOREIGN PATENT DOCUMENTS

| CN | 112889001 A * | 6/2021 | ............. H04N 23/52 |
| EP | 0395301 A2 | 10/1990 | |

(Continued)

OTHER PUBLICATIONS

CN112889001A—Translation (Year: 2025).*

(Continued)

*Primary Examiner* — Elizabeth M Kerr
*Assistant Examiner* — Keith Brian Assante
(74) *Attorney, Agent, or Firm* — Harness, Dickey & Pierce, P.L.C.

(57) ABSTRACT

A film heater includes a transparent conductive film and first and second electrodes. The transparent conductive film includes a heat generating portion that generates heat when energized by the first and second electrodes. An outer edge of the heat generating portion has a short side, a long side, and first and second oblique sides. The first and second electrodes include a plurality of first and second connection portions corresponding to a plurality of first and second ports, respectively. A plurality of first and second current suppression portions is disposed to suppress flow of the current between the inside and outside of the heat generating portion through a region between the plurality of first and second ports, respectively. For each of some or all of the plurality of first ports, the current flows through the heat generating portion between the first port and at least two second ports.

14 Claims, 24 Drawing Sheets

(52) U.S. Cl.
CPC .................. *H05B 2203/007* (2013.01); *H05B 2203/013* (2013.01); *H05B 2203/016* (2013.01)

(58) Field of Classification Search
CPC ........ H05B 2203/008; H05B 2203/037; H05B 3/03; B60J 1/002; B60S 1/026
See application file for complete search history.

(56) References Cited

U.S. PATENT DOCUMENTS

| | | |
|---|---|---|
| 2017/0339750 A1 | 11/2017 | Schall et al. |
| 2017/0368907 A1 | 12/2017 | Yoneda et al. |
| 2019/0193514 A1 | 6/2019 | Yoneda et al. |
| 2020/0094781 A1 | 3/2020 | Ota et al. |

FOREIGN PATENT DOCUMENTS

| | | | | |
|---|---|---|---|---|
| JP | H0872674 | A | 3/1996 | |
| JP | H08244561 | A | 9/1996 | |
| JP | 2707636 | B2 | 2/1998 | |
| JP | 2003176154 | A | 6/2003 | |
| JP | 2005104221 | A | 4/2005 | |
| JP | 2005306196 | A | 11/2005 | |
| JP | 4277376 | B2 | 6/2009 | |
| JP | 2016137826 | A | 8/2016 | |
| JP | 2017062108 | A | 3/2017 | |
| JP | 2018004241 | A | 1/2018 | |
| JP | 2018152192 | A * | 9/2018 | |
| JP | 6463842 | B2 | 2/2019 | |
| JP | 2019137380 | A | 8/2019 | |
| KR | 20100119032 | A * | 11/2010 | ............. H05B 3/145 |
| KR | 20180095226 | A * | 8/2018 | ............... H05B 3/84 |

OTHER PUBLICATIONS

JP2018152192A—Translation (Year: 2025).*
KR20100119032A—Translation (Year: 2025).*
KR20180095226A—Translation (Year: 2025).*

* cited by examiner

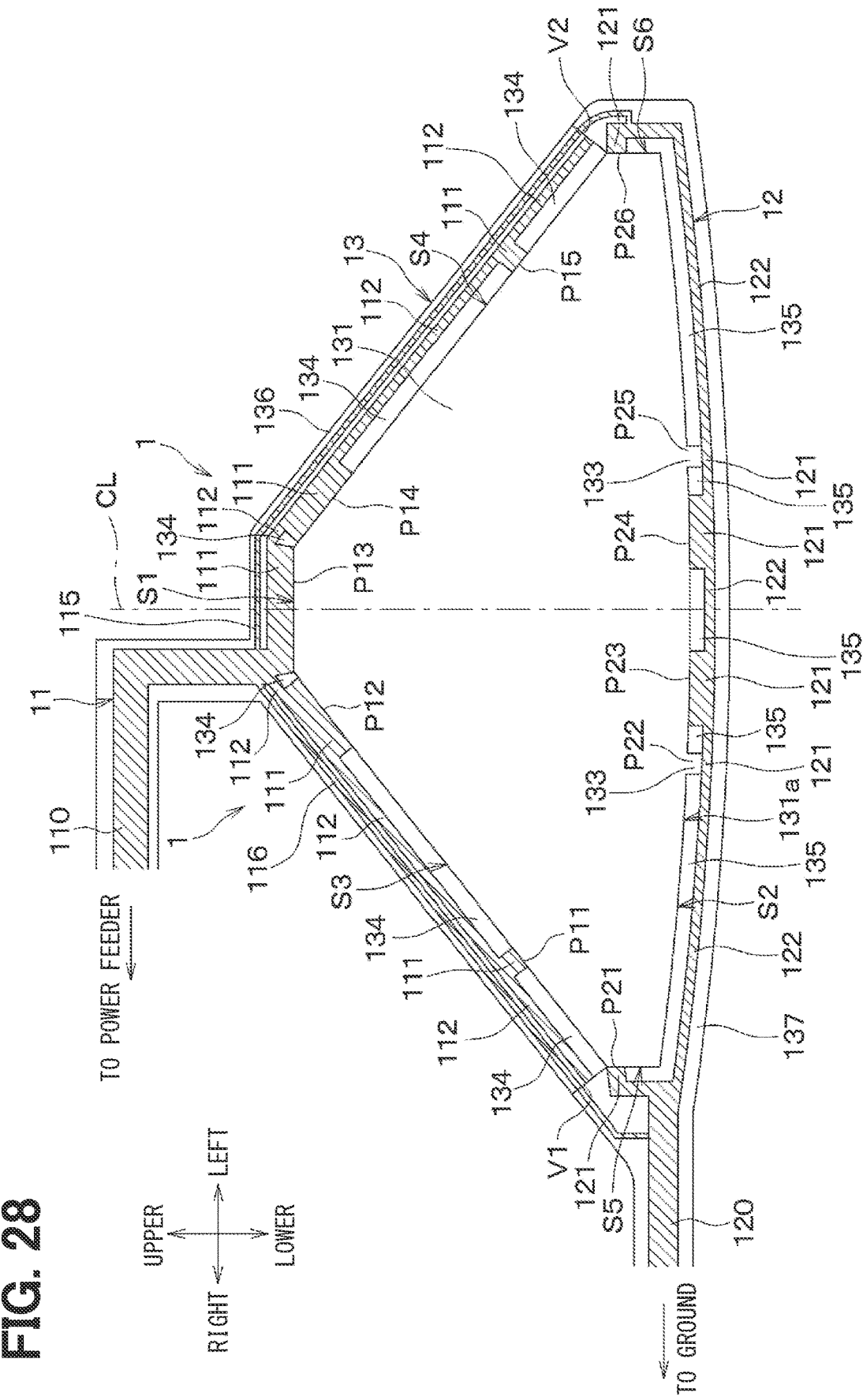

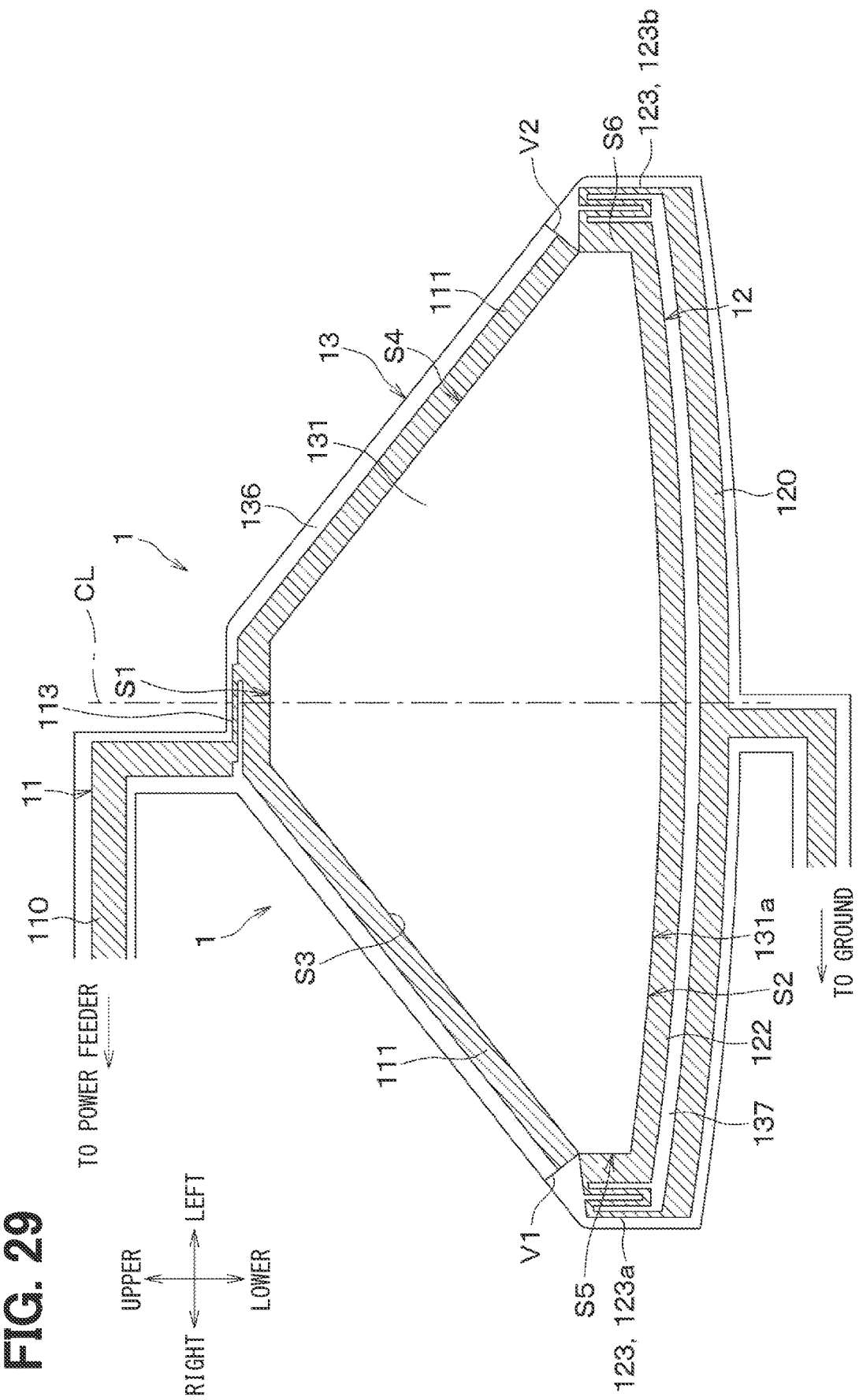

US 12,477,627 B2

FILM HEATER

CROSS REFERENCE TO RELATED APPLICATION

The present application is a continuation application of International Patent Application No. PCT/JP2020/042452 filed on Nov. 13, 2020, which designated the U.S. and claims the benefit of priority from Japanese Patent Application No. 2019-214228 filed on Nov. 27, 2019. The entire disclosures of all of the above applications are incorporated herein by reference.

TECHNICAL FIELD

The present disclosure relates to a film heater.

BACKGROUND

Conventionally, film heaters are known which are attached to light transmissive members, through which light is transmitted, in vehicles, and designed to generate heat when energized. For example, a film heater is affixed within the field of view of a sensor in the windshield of a vehicle and generates heat, thereby preventing fogging of the windshield within the field of view. The known way to energize the film heater attached to the light transmissive member in the vehicle involves arranging a pair of opaque electrodes above and below a transparent heat generating portion which is to generate heat in the film heater. With this arrangement, current is allowed to flow from one electrode to the other through the heat generating portion in the film heater, thus energizing the heat generating portion to generate heat therefrom.

SUMMARY

According to an aspect of the present disclosure, a film heater to be attached to a light transmissive member of a vehicle includes a transparent conductive film configured to transmit the light and to generate heat by being energized, a first electrode connected to the transparent conductive film, and a second electrode connected to the transparent conductive film. The transparent conductive film includes a heat generating portion configured to heat the light transmissive member by generating heat through the energization using the first electrode and the second electrode. An outer edge of the heat generating portion has a short side, a long side that is longer than the short side and extends while facing the short side, a first oblique side that extends from one end of the short side to approach one end of the long side, and a second oblique side that extends from another end of the short side to approach the another end of the long side. The first electrode includes a plurality of first connection portions corresponding to a plurality of first ports that are located across the short side, the first oblique side, and the second oblique side while being spaced apart from each other. The second electrode includes a plurality of second connection portions corresponding to a plurality of second ports that are located in a range including the long side while being spaced apart from each other. A plurality of first current suppression portions may be disposed along the outer edge of the heat generating portion to suppress flow of the current between the inside and an outside of the heat generating portion through a region between the plurality of first ports along the outer edge of the heat generating portion. A plurality of second current suppression portions may be disposed along the outer edge of the heat generating portion to suppress flow of the current between the inside and the outside of the heat generating portion through a region between the plurality of second ports along the outer edge of the heat generating portion. Furthermore, each of some or all of the plurality of first ports may be configured to flow the current through the inside of the heat generating portion between the first port and at least two second ports.

Alternatively, according to another aspect of the present disclosure, a film heater to be attached to a light transmissive member includes a transparent conductive film configured to transmit the light and to generate heat by being energized, a first electrode connected to the transparent conductive film, and a second electrode connected to the transparent conductive film. The transparent conductive film includes a heat generating portion that heats the light transmissive member by generating heat through the energization using the first electrode and the second electrode. An outer edge of the heat generating portion has a long side, a first oblique side, and a second oblique side. A plurality of first current suppression portions may be disposed along the outer edge of the heat generating portion to suppress flow of the current between the inside and an outside of the heat generating portion through a region between a plurality of first ports along the outer edge. A plurality of second current suppression portions may be disposed along the outer edge of the heat generating portion to suppress flow of the current between the inside and the outside of the heat generating portion through a region between a plurality of second ports along the outer edge. For each of some or all of the plurality of first ports, the current flows through the inside of the heat generating portion between the first port and at least two second ports.

BRIEF DESCRIPTION OF THE DRAWINGS

The above and other objects, features and advantages of the present disclosure will become more apparent from the following detailed description made with reference to the accompanying drawings.

FIG. 28 is a cross-sectional view taken at the same cross-section as FIG. 3 in a modification 1.

FIG. 29 is a cross-sectional view taken at the same cross-section as FIG. 3 in a modification 2.

DESCRIPTION OF EMBODIMENTS

Figure 1:
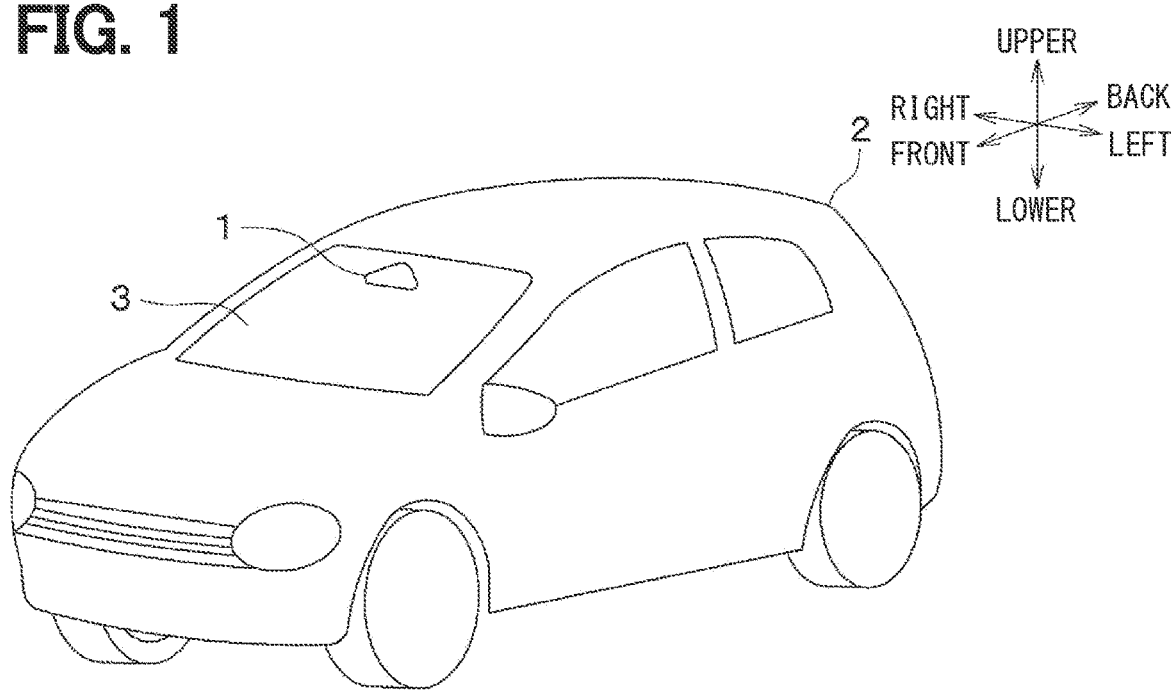
FIG. 1 is a perspective view illustrating a film heater attached to a windshield of a vehicle in a first embodiment.

Film heaters attached to light transmissive members in vehicles may have a limited shape due to various restrictions such as the shape of an attachment object and the shape of the field of view of the sensor. For example, a part of a film heater, where light is to be transmitted, has a substantially trapezoidal shape, a substantially triangular shape, or the like in some cases.

When the shape of the part of the film heater where light is to be transmitted is not rectangular, a distance from one electrode to the other along the film heater may vary depending on locations. Consequently, the current density and furthermore the temperature of the heat generating portion in the film heater could become non-uniform.

A film thickness of the heat generating portion in the film heater may be made thicker in some areas and thinner in other areas so that the resistance density and heat generation density of the heat generating portion are adjusted, thereby equalizing the temperature of the heat generating portion.

However, according to the studies conducted by the inventors, such the non-uniform thickness of the film heater may impair the optical uniformity, i.e., the uniformity of the light transmission performance.

It is an object of the present disclosure to suppress uneven temperature distribution in a heat generating portion of a film heater that does not have a rectangular shape, without changing the film thickness of the heat generating portion of the film heater.

According to an aspect of the present disclosure, a film heater to be attached to a light transmissive member through which light is transmitted in a vehicle includes a transparent conductive film configured to transmit the light and to generate heat by being energized, a first electrode connected to the transparent conductive film, and a second electrode connected to the transparent conductive film. The transparent conductive film includes a heat generating portion configured to heat the light transmissive member by generating heat through the energization using the first electrode and the second electrode. An outer edge of the heat generating portion has a short side, a long side that is longer than the short side and extends while facing the short side, a first oblique side that extends from one end of the short side to approach one end of the long side, and a second oblique side that extends from another end of the short side to approach the another end of the long side. The first electrode includes a plurality of first connection portions corresponding to a plurality of first ports that are located across the short side, the first oblique side, and the second oblique side while being spaced apart from each other. The second electrode includes a plurality of second connection portions corresponding to a plurality of second ports that are located in a range including the long side while being spaced apart from each other. Each of the plurality of first connection portions is connected to the transparent conductive film such that current flows between an inside of the heat generating portion and the first connection portion through the corresponding first port, and each of the plurality of second connection portions is connected to the transparent conductive film such that the current flows between the inside of the heat generating portion and the second connection portion through the corresponding second port. A plurality of first current suppression portions is disposed along the outer edge of the heat generating portion to suppress flow of the current between the inside and an outside of the heat generating portion through a region between the plurality of first ports along the outer edge of the heat generating portion. A plurality of second current suppression portions is disposed along the outer edge of the heat generating portion to suppress flow of the current between the inside and the outside of the heat generating portion through a region between the plurality of second ports along the outer edge of the heat generating portion. Furthermore, each of some or all of the plurality of first ports is configured to flow the current through the inside of the heat generating portion between the first port and at least two second ports.

Thus, the plurality of first ports serving as the passage port through which the current flows between the first electrode and the inside of the heat generating portion are located across the short side, the first oblique side, and the second oblique side while being spaced apart from each other. Further, the plurality of second ports serving as the passage port through which the current flows between the second electrode and the inside of the heat generating portion are located at the long side while being spaced apart from each other. Therefore, by devising the positions of the plurality of first ports and the plurality of second ports, the unevenness of the temperature distribution in the heat generating portion can be suppressed while limiting the possibility of impairing the optical uniformity in the heat generating portion.

According to another aspect of the present disclosure, a film heater to be attached to a light transmissive member through which light is transmitted in a vehicle includes a transparent conductive film configured to transmit the light and to generate heat by being energized, a first electrode connected to the transparent conductive film, and a second electrode connected to the transparent conductive film. The transparent conductive film includes a heat generating portion that heats the light transmissive member by generating heat through the energization using the first electrode and the second electrode. An outer edge of the heat generating portion has a long side, a first oblique side, and a second oblique side. The first oblique side has one end connected to the second oblique side and another end connected to one end of the long side. The second oblique side has one end connected to the one end of the first oblique side and another end connected to another end of the long side. The first electrode includes a plurality of first connection portions corresponding to a plurality of first ports that are located across the first oblique side and the second oblique side, while being spaced apart from each other. The second electrode includes a plurality of second connection portions corresponding to a plurality of second ports that are located in a range including the long side, while being spaced apart from each other. Each of the plurality of first connection portions is connected to the transparent conductive film such that current flows between an inside of the heat generating portion and the first connection portion through the corresponding first port. Each of the plurality of second connection portions is connected to the transparent conductive film such that the current flows between the inside of the heat generating portion and the second connection portion through the corresponding second port. A plurality of first current suppression portions is disposed along the outer edge of the heat generating portion to suppress flow of the current between the inside and an outside of the heat generating portion through a region between the plurality of first ports along the outer edge. A plurality of second current suppression portions is disposed along the outer edge of the heat generating portion to suppress flow of the current between the inside and the outside of the heat generating portion through a region between the plurality of second ports along the outer edge. For each of some or all of the plurality of first ports, the current flows through the inside of the heat generating portion between the first port and at least two second ports.

Thus, the plurality of first ports serving as the passage port through which the current flows between the first electrode and the inside of the heat generating portion are located across the first oblique side and the second oblique side while being spaced apart from each other. Further, the plurality of second ports serving as the passage port through which the current flows between the second electrode and the inside of the heat generating portion are located at the long side while being spaced apart from each other. Therefore, by devising the positions of the plurality of first ports and the plurality of second ports, the unevenness of the temperature distribution in the heat generating portion can be suppressed while limiting the possibility of impairing the optical uniformity in the heat generating portion.

Hereinafter, multiple embodiments for performing the present disclosure will be described with reference to the drawings. In each embodiment, portions corresponding to those described in the preceding embodiment are denoted by the same reference numerals, and overlapping descriptions may be omitted. In a case where only a part of a configuration is described in each embodiment, the other embodiments described above are capable of being applied for the other parts of the configuration. Not only a combination of parts that clearly indicate that the combination is possible in each embodiment, but also a partial combination of embodiments even if the combination is not specified is also possible when there is no problem in the combination.

A first embodiment of the present disclosure will be now described. As illustrated in FIG. 1, a film heater 1 according to this embodiment is an electric heater in the form of a thin film and is affixed to the surface of a glass windshield 3 of a vehicle 2 on the vehicle interior side. Alternatively, when the windshield 3 includes two overlapping glass panels, the film heater 1 may be disposed between those two glass panels. In the following, when referring to a direction, it means the direction relative to the direction of travel of the vehicle, unless otherwise stated. It is noted that the windshield 3 corresponds to a window member and a light transmissive member.

Figure 2:
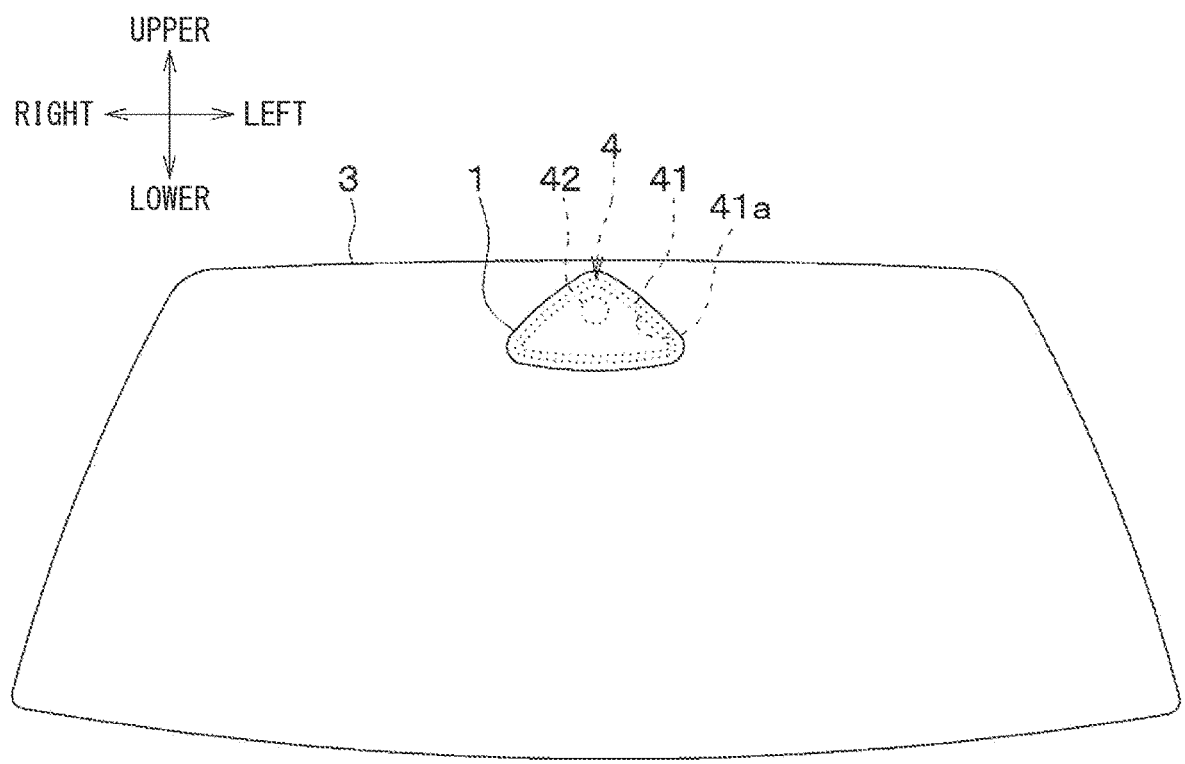
FIG. 2 is a front view of the film heater, the windshield, and an image sensor.

As illustrated in FIGS. 1 and 2, an image sensor 4 is mounted near the film heater 1 in a vehicle cabin. The image sensor 4 receives light (for example, ultraviolet rays, visible rays, and near-infrared rays) that enters the vehicle cabin from the front of the vehicle 2 through the windshield 3 and the film heater 1, and outputs a video signal corresponding to the received light. The output video signal is used for an image recognition process, such as detection of obstacles in front of the vehicle 2. Alternatively, the image sensor 4 itself may execute the image recognition process, including the detection of obstacles in front of the vehicle 2, based on the video signal, and then output the recognition result to other devices mounted on the vehicle 2 (for example, a device for controlling the travel of the vehicle).

As illustrated in FIG. 2, the image sensor 4 includes a housing 41, a camera module 42, and a circuitry (not illustrated). The housing 41 is a casing that accommodates the camera module 42 and the circuitry. The housing 41 has an opening 41a that is formed in contact with the film heater 1 or an inner surface of the windshield 3 while overlapping the film heater 1 in the direction orthogonal to the surface of the windshield 3.

The camera module 42 is an optical system of the image sensor 4. The camera module 42 includes a lens group for light collection, a solid-state image sensor that outputs an electrical signal according to the light collected by the lens group, and a holder that accommodates the lens group and the solid-state image sensor. The camera module 42 is accommodated in the housing 41 such that its optical axis passes through a portion of the film heater 1 which is surrounded by the opening 41a. Therefore, the inside of the opening 41a becomes the range of the field of view of the image sensor 4, and the opening 41a becomes the boundary of the range of the field of view of the image sensor 4. Thus, the range of the field of view of the image sensor 4 is defined by the shape or the like of the housing 41.

The circuitry generates an image of the front of the vehicle 2 captured by the camera module based on the electrical signals output by the solid-state image sensor of the camera module, and outputs a video signal showing the generated image. The circuitry may execute the image recognition process described above.

As illustrated in FIGS. 3 to 12, the film heater 1 includes a first electrode 11, a second electrode 12, a transparent conductive film 13, and a transparent insulating film 14, and is formed into a film shape as a whole.

The transparent insulating film 14 is a thin film made of a transparent material with electrical insulation properties. The transparent insulating film 14 may be made of, for example, polycarbonate or other materials.

The transparent conductive film 13 has almost the same shape as the transparent insulating film 14 and is stacked at a surface of the transparent insulating film 14 on the front side. The transparent conductive film 13 is a transparent film with electrical conductivity as illustrated in FIGS. 4 to 10. For example, the transparent conductive film 13 may be a protective film of chromium and chromium oxide formed on an ITO film by sputtering or other means. ITO is an abbreviation for Indium-Tin-Oxide. The resistivity of the transparent conductive film 13 may be uniform in the plane or may be non-uniform, in other words, uneven. Such a transparent conductive film 13 is configured to allow current to flow through inside it in a planar manner but not in a linear manner.

Figure 5:
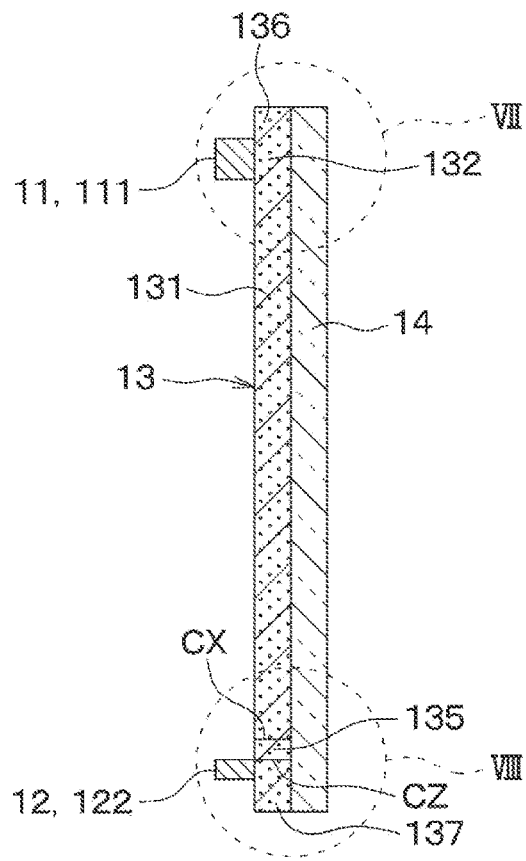
FIG. 5 is an end view taken along line V-V of FIG. 3.
Figure 6:
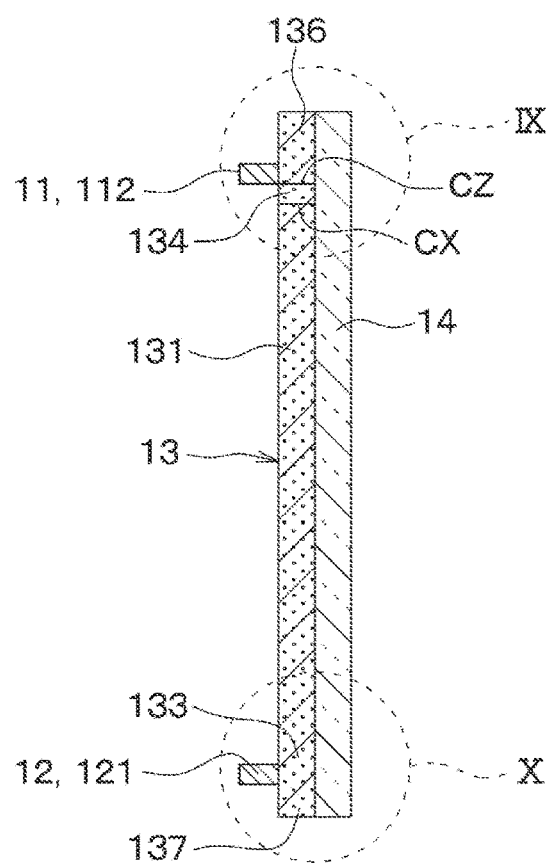
FIG. 6 is an end view taken along line VI-VI of FIG. 3.

The transparent conductive film 13 and the transparent insulating film 14 have almost the same shape on the plane orthogonal to a stacking direction of the film heater 1 (i.e., in the left-right direction in FIGS. 5 and 6). The transparent conductive film 13 and the transparent insulating film 14 overlap and substantially coincide with each other in the stacking direction. It is noted that the stacking direction of the film heater 1 coincides with the direction orthogonal to the surface of the windshield 3. Hereinafter, the stacking direction of the film heater 1 is simply referred to as the stacking direction.

Figure 4:
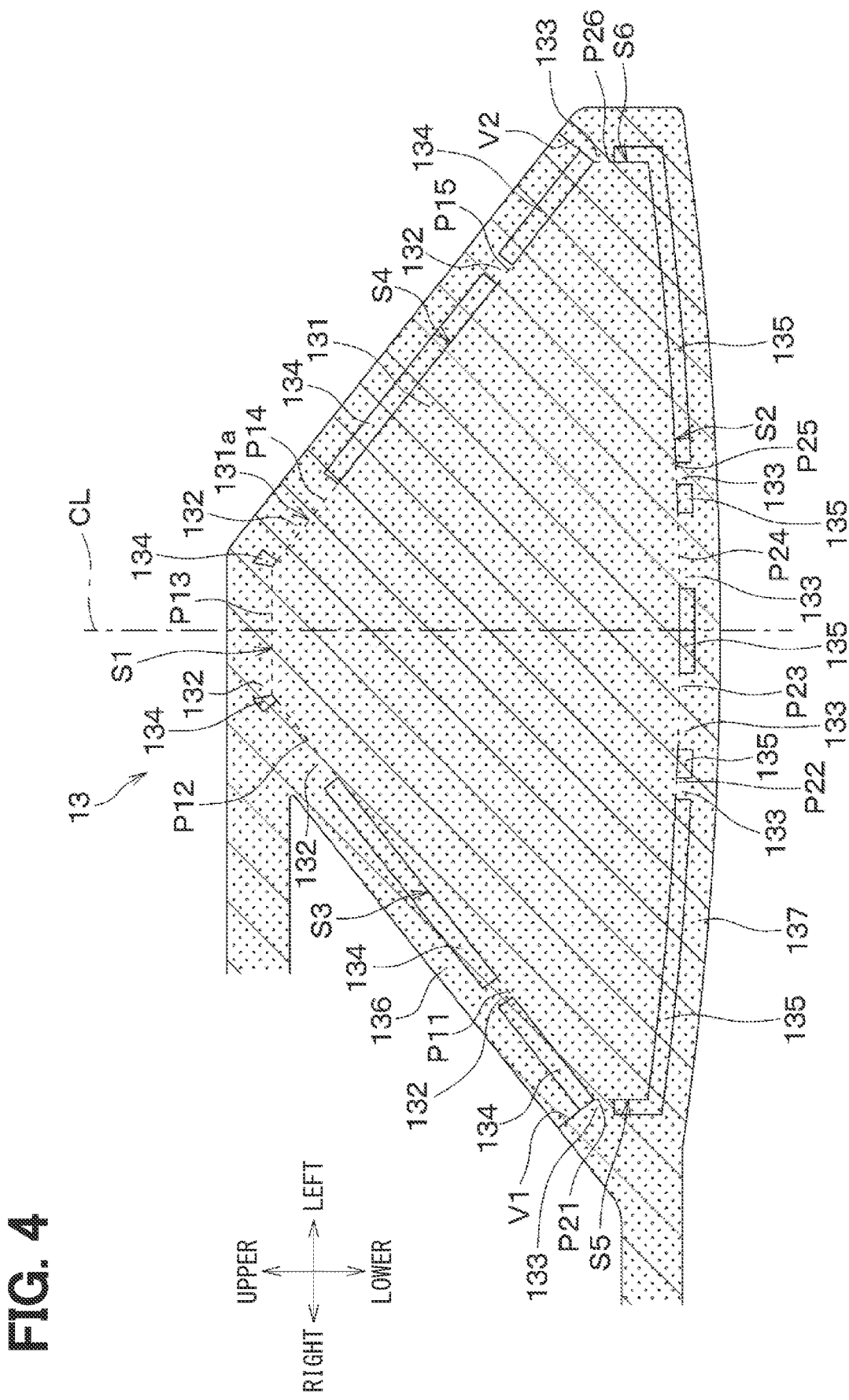
FIG. 4 is a cross-sectional view of the film heater, taken at a layer of a transparent conductive film.

As illustrated in FIG. 4, the transparent conductive film 13 has one heat generating portion 131, a plurality of first bridge portions 132, a plurality of second bridge portions 133, a plurality of first resistive portions 134, a plurality of second resistive portions 135, one first peripheral portion 136, and one second peripheral portion 137. These members 131 to 137 are formed integrally from one substrate.

The heat generating portion 131 is a portion disposed within the range of the field of view of the image sensor 4. Light that enters the vehicle cabin from the front of the vehicle 2 through the windshield 3 and the heat generating portion 131 is focused by the camera module 42 of the image sensor 4 to form an image. In a state where the image sensor 4 is set inside the vehicle cabin, an outer edge 131a of the heat generating portion 131 coincides with the opening 41a of the housing 41. In FIG. 4, a portion of the outer edge 131a of the heat generating portion 131 that does not overlap the first resistive portions 134 and the second resistive portions 135 is represented with a dashed line.

Therefore, a portion of the windshield 3 where the heat generating portion 131 is attached is desirably configured to allow light to pass therethrough well. Thus, desirably, the heat generating portion 131 generates heat, with which the above portion of the windshield 3 is heated, thereby suppressing fogging of the windshield 3. In fact, the heat generating portion 131 heats the windshield 3 by being energized due to the potential difference between the first and second electrodes 11 and 12 and generating heat, as mentioned later. Thus, the heat generating portion 131 is a portion where heat is to be generated in order to prevent fogging. The resistivity of the heat generating portion 131 may be uniform in the plane or may be non-uniform, in other words, uneven.

As illustrated in FIG. 4, the outer edge 131a of the heat generating portion 131 has a substantially hexagonal shape that includes a short side S1, a long side S2, a first oblique side S3, a second oblique side S4, a first cut side S5, and a second cut side S6. The short side S1 is located on the uppermost side of the outer edge 131a. As another example, the short side S1 may be located anywhere on the lowermost, rightmost, or leftmost side of the outer edge 131a.

The long side S2 is longer than the short side S1 and extends while facing the short side S1. The first oblique side S3 extends from a right end of the short side S1 to approach a right end of the long side S2. The second oblique side S4 extends from a left end of the short side S1 to approach a left end of the long side S2. The left side corresponds to one side, while the right side corresponds to the other side. The first oblique side S3 and the second oblique side S4 extend linearly away from each other in the direction from the short side S1 toward the long side S2.

The end of the first oblique side S3 on the side of the short side S1 is connected to the right end of the short side S1, while the end of the first oblique side S3 on the side of the long side S2 is not connected to the right end of the long side S2. The end of the second oblique side S4 on the side of the short side S1 is connected to the left end of the short side S1, while the end of the second oblique side S4 on the side of the long side S2 is not connected to the left end of the long side S2.

The first cut side S5 is a side extending from the right end of the first oblique side S3 to the right end of the long side S2. The end of the first cut side S5 on the side of the first oblique side S3 is connected to the right end of the first oblique side S3, while the end of the first cut side S5 on the side of the long side S2 is connected to the right end of the long side S2.

The second cut side S6 is a side extending from the left end of the second oblique side S4 to the left end of the long side S2. The end of the second cut side S6 on the side of the second oblique side S4 is connected to the left end of the second oblique side S4, while the end of the second cut side S6 on the side of the long side S2 is connected to the left end on the side of the long side S2.

Each of the short side S1 and the long side S2 extends in a gentle curved shape that is slightly convex toward the outside of the heat generating portion 131 with respect to a horizontal straight line.

The plurality of first bridge portions 132 is connected to the outer edge 131a of the heat generating portion 131. More specifically, the plurality of first bridge portions 132 is arranged side by side in the direction of extension of the outer edge 131a and away from each other, across the short side S1, the first oblique side S3, and the second oblique side S4.

Each first bridge portion 132 is connected to the side of the first peripheral portion 136 on the heat generating portion 131 side, at an edge of the first bridge portion 132 on a side opposite to the side connected to the outer edge 131a. Therefore, each first bridge portion 132 extends from the first peripheral portion 136 to the heat generating portion 131, in a direction that intersects the outer edge 131a.

The plurality of second bridge portions 133 is connected to the outer edge 131a of the heat generating portion 131. More specifically, the plurality of second bridge portions 133 is arranged side by side in the direction of extension of the outer edge 131a and away from each other, across the long side S2, the first cut side S5, and the second cut side S6.

Each second bridge portion 133 is connected to the side of the second peripheral portion 137 on the heat generating portion 131 side, at an edge of the second bridge portion 133 on a side opposite to the side connected to the outer edge 131a. Therefore, each second bridge portion 133 extends from the second peripheral portion 137 to the heat generating portion 131, in the direction that intersects the outer edge 131a.

Figure 9:
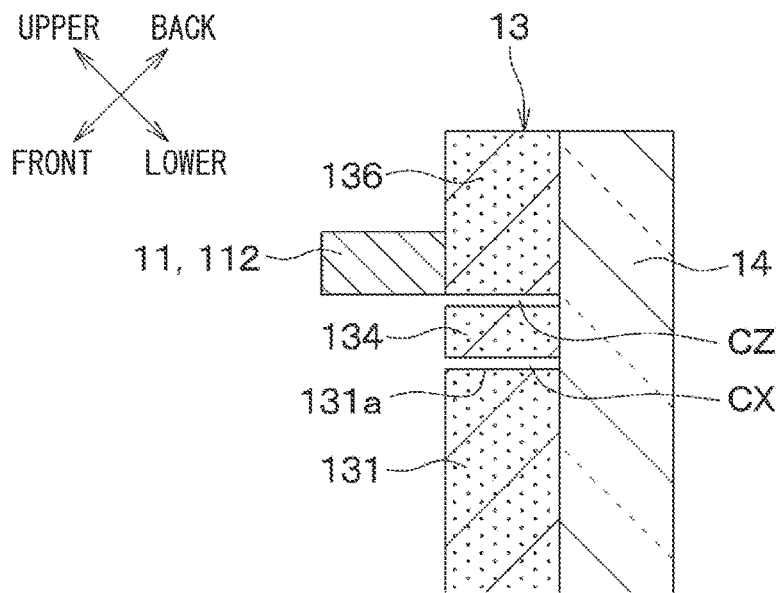
FIG. 9 is an enlarged view of a part IX of FIG. 6.
Figure 11:
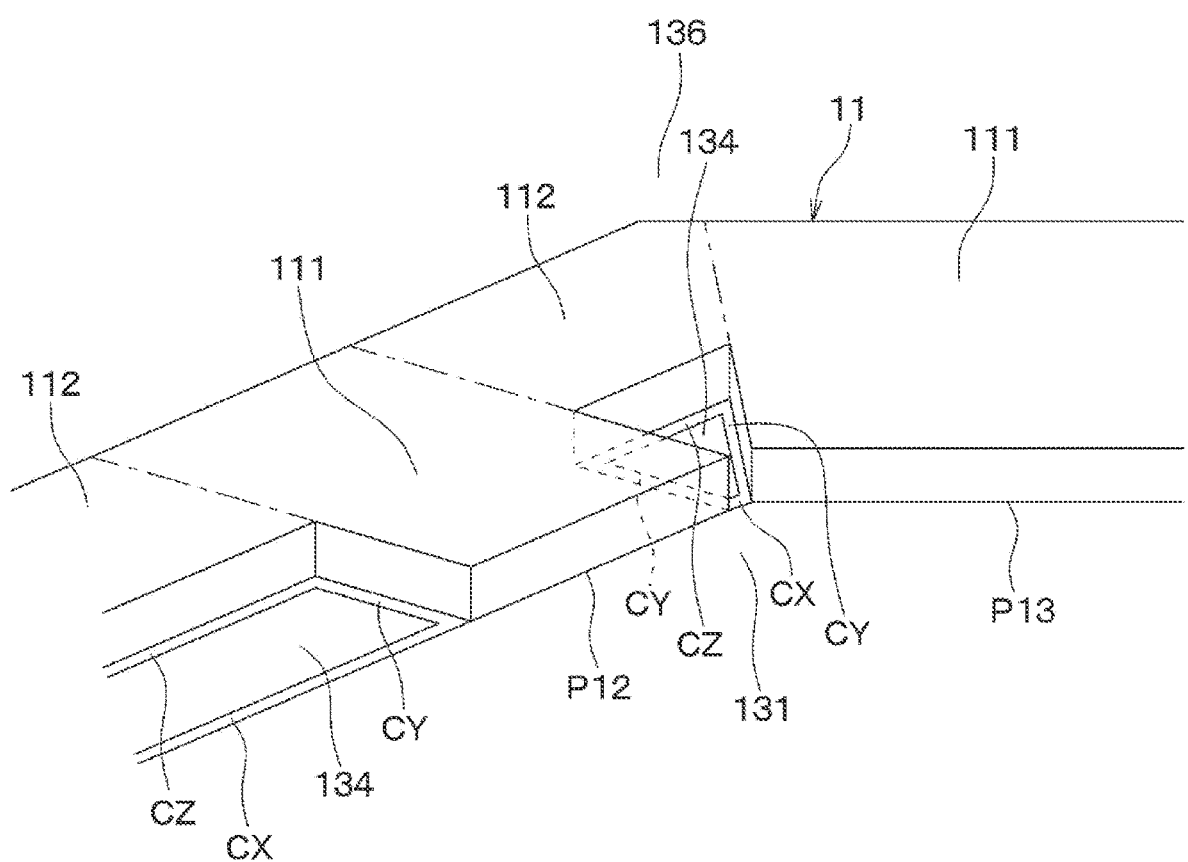
FIG. 11 is a partially enlarged perspective view of a first electrode and the transparent conductive film.

The plurality of first resistive portions 134 is arranged adjacent to each other at a distance from the outer edge 131a of the heat generating portion 131. More specifically, the plurality of first resistive portions 134 is arranged side by side in the direction of extension of the outer edge 131a and away from each other, across the short side S1, the first oblique side S3, and the second oblique side S4. As illustrated in FIGS. 9 and 11, one edge of each first resistive portion 134, which is located on the outer edge 131a side, faces the outer edge 131a while being slightly apart from the outer edge 131a with a gap CX in between. Meanwhile, the other edge of each first resistive portion 134, which is on the first peripheral portion 136 side, faces the first peripheral portion 136 while being slightly apart from the first peripheral portion 136 with a gap CZ in between.

The plurality of first bridge portions 132 and the plurality of first resistive portions 134 are alternately arranged adjacent to each other, one by one, along the outer edge 131a. As illustrated in FIG. 11, each first resistive portion 134 faces the adjacent first bridge portion 132 at its end on the first bridge portion 132 side while being slightly apart from the first bridge portion 132 with a gap CY in between.

The gap CX at the edge of each first resistive portion 134 on the outer edge 131a side, the gap CZ at the edge thereof on the first peripheral portion 136 side, and the gap CY at the end thereof on the first bridge portion 132 side as described above are formed, for example, by cutting the transparent conductive film 13 with a laser. These gaps CX, CY, and CZ are coupled together annularly as a whole to form a substantially quadrilateral shape.

Each of the first resistive portions 134 becomes nonconductive to the heat generating portion 131, the first bridge portion 132, and the first peripheral portion 136 due to these gaps CX, CY, and CZ. Thus, the plurality of first resistive portions 134 is disposed in portions around the heat generating portion 131, through which the conduction between the first electrode 11 and the heat generating portion 131 is not desired. Each first resistive portion 134 constitutes a first current suppression portion together with the gaps CX, CY, and CZ adjacent to the first resistive portion 134.

Figure 8:
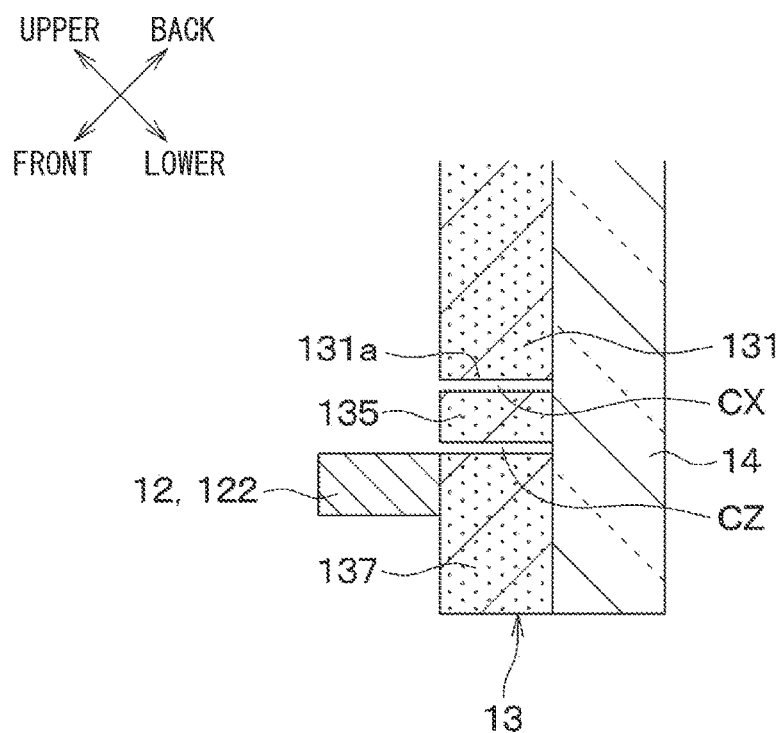
FIG. 8 is an enlarged view of a part VIII of FIG. 5.
Figure 12:
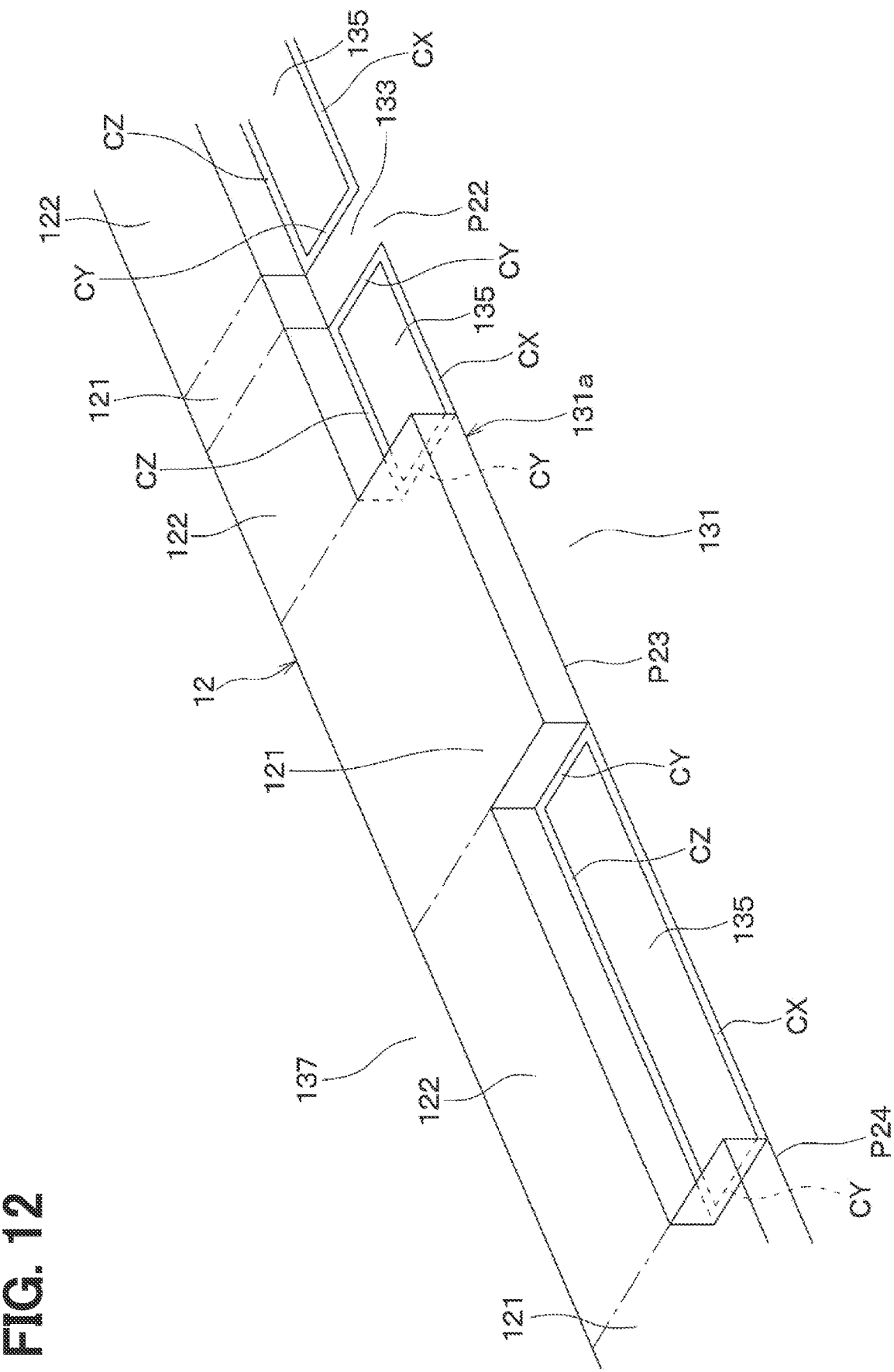
FIG. 12 is a partially enlarged perspective view of a second electrode and the transparent conductive film.

The plurality of second resistive portions 135 is arranged adjacent to each other at a distance from the outer edge 131a of the heat generating portion 131. More specifically, the plurality of second resistive portions 135 is arranged side by side in the direction of extension of the outer edge 131a and away from each other, across the long side S2, the first cut side S5, and the second cut side S6. As illustrated in FIGS. 8 and 12, one edge of each second resistive portion 135, which is located on the outer edge 131a side, faces the outer edge 131a while being slightly apart from the outer edge 131a with the gap CX in between. The other edge of each second resistive portion 135, which is located on the second peripheral portion 137 side, faces the second peripheral portion 137 while being slightly apart from the second peripheral portion 137 with the gap CZ in between.

The plurality of second bridge portions 133 and the plurality of second resistive portions 135 are alternately arranged adjacent to each other, one by one, along the outer edge 131a. As illustrated in FIG. 12, each second resistive portion 135 faces the adjacent second bridge portion 133 at its end on the second bridge portion 133 side while being slightly apart from the second bridge portion 133 with the gap CY in between.

The gap CX at the edge of each second resistive portion 135 on the outer edge 131a side, the gap CZ at the edge thereof on the second peripheral portion 137 side, and the gap CY at the end thereof on the second bridge portion 133 side as described above are formed, for example, by cutting the transparent conductive film 13 with the laser. These gaps CX, CY, and CZ are coupled together annularly as a whole to form a substantially quadrilateral shape.

Each of the second resistive portions 135 becomes nonconductive to the heat generating portion 131, the second bridge portion 133, and the second peripheral portion 137 due to the presence of these gaps CX, CY, and CZ. Thus, the plurality of second resistive portions 135 is disposed in potions around the heat generating portion 131, through which the conduction between the second electrode 11 and the heat generating portion 131 is not desired. Each second resistive portion 135 constitutes a second current suppression portion together with the gaps CX, CY, and CZ adjacent to the second resistive portion 135.

The first peripheral portion 136 is located on the opposite side of each of the plurality of first bridge portions 132 and the plurality of first resistive portions 134 relative to the heat generating portion 131. The first peripheral portion 136 extends along the short side S1, the first oblique side S3, and the second oblique side S4 of the outer edge 131a. That is, the plurality of first bridge portions 132 and the plurality of first resistive portions 134 are in the state of being interposed between the first peripheral portion 136 and the heat generating portion 131. The edge of the first peripheral portion 136 on the heat generating portion 131 side is connected to the plurality of first bridge portions 132. In addition, the edge of the first peripheral portion 136 on the heat generating portion 131 side faces the plurality of first resistive portions 134 while being spaced apart from them with the above-described gap CZ in between. The first peripheral portion 136 also includes a portion extending away from the heat generating portion 131 to guide the first electrode 11 to a power feeder.

The second peripheral portion 137 is located on the opposite side of each of the plurality of second bridge portions 133 and the plurality of second resistive portions 135 relative to the heat generating portion 131. The second peripheral portion 137 extends along the long side S2, the first cut side S5, and the second cut side S6 of the outer edge 131a. That is, the plurality of second bridge portions 133 and the plurality of second resistive portions 135 are in a state of being interposed between the second peripheral portion 137 and the heat generating portion 131. The edge of the second peripheral portion 137 on the heat generating portion 131 side is connected to the plurality of second bridge portions 133. In addition, the edge of the second peripheral portion 137 on the heat generating portion 131 side faces the second resistive portions 135 while being spaced apart from them with the above-described gap CZ in between. The second peripheral portion 137 also includes a portion extending away from the heat generating portion 131 to guide the second electrode 12 to the ground.

It is noted that the heat generating portion 131, the first bridge portions 132, the second bridge portions 133, the first resistive portions 134, the second resistive portions 135, the first peripheral portion 136, and the second peripheral portion 137 are individually stacked on the transparent insulating film 14 fixedly.

Figure 3:
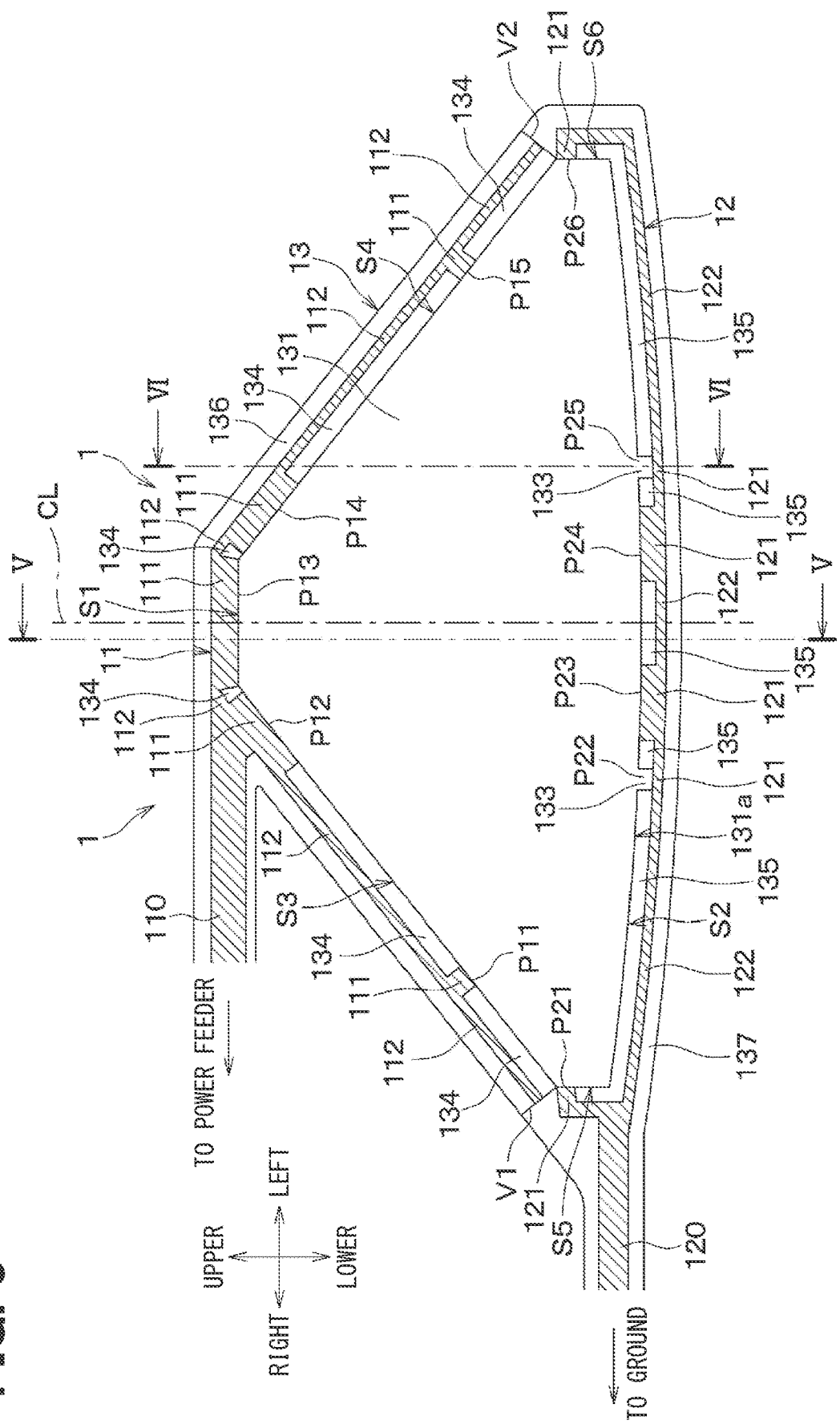
FIG. 3 is a cross-sectional view of the film heater, taken at an electrode layer.

As illustrated in FIGS. 3 and 4, slight gaps V1 and V2 are present between the first peripheral portion 136 and the second peripheral portion 137. Therefore, the end of the first peripheral portion 136 facing the second peripheral portion 137 and the end of the second peripheral portion 137 facing the first peripheral portion 136 also face each other while being spaced apart from each other with the gap V1 or V2 in between these ends. These gaps V1 and V2 are formed, for example, by cutting the transparent conductive film 13 with the laser. With this arrangement, direct conduction between the first peripheral portion 136 and the second peripheral portion 137 is prevented.

The first electrode 11 and the second electrode 12 are conductive layers which are stacked on and in contact with a surface of the transparent conductive film 13 on the side opposite to the transparent insulating film 14. The first electrode 11 and the second electrode 12 are electrically connected through the transparent conductive film 13. The first electrode 11 and the second electrode 12 may be formed, for example, by printing silver paste on the transparent conductive film 13 and firing the printed silver paste. The first electrode 11 and the second electrode 12 are electrically conductive to the transparent conductive film 13 at their portions that are in physical contact with the transparent conductive film 13.

The resistivity of each of the first and second electrodes 11 and 12 is sufficiently lower than the resistivity of the transparent conductive film 13. For example, an average value of the resistivity of the first electrode 11 and an average value of the resistivity of the second electrode 12 are less than or equal to $1/100$ of an average value of the resistivity of the transparent conductive film 13.

As illustrated in FIGS. 3 and 11, the first electrode 11 has a first take-out portion 110, a plurality of first connection portions 111, and a plurality of first bypass portions 112. The dashed-dotted line in FIG. 11 is merely a virtual line to clearly show the boundary between the first connection portion 111 and the first bypass portion 112, and does not indicate a real line as a whole at the location of this dashed-dotted line.

The first take-out portion 110 receives power from the power feeder for supplying the power to the film heater 1 and allows the current to flow from the power feeder to the plurality of first connection portions 111 and the plurality of first bypass portions 112. One end of the first take-out portion 110 is connected to the power feeder. The other end of the first take-out portion 110 is connected to the first connection portion 111 adjacent to the short side S1, another first connection portion 111 adjacent to a portion of the first oblique side S3 closest to the short side S1, and the first bypass portion 112 located between these two first connection portions 111.

As illustrated in FIGS. 3 and 11, the plurality of first connection portions 111 and the plurality of first bypass portions 112 are alternately arranged adjacent to each other, one by one, along the short side S1, the first oblique side S3, and the second oblique side S4. Along this sequence, the plurality of first connection portions 111 and the plurality of first bypass portions 112 are conductive to each other.

Figure 7:
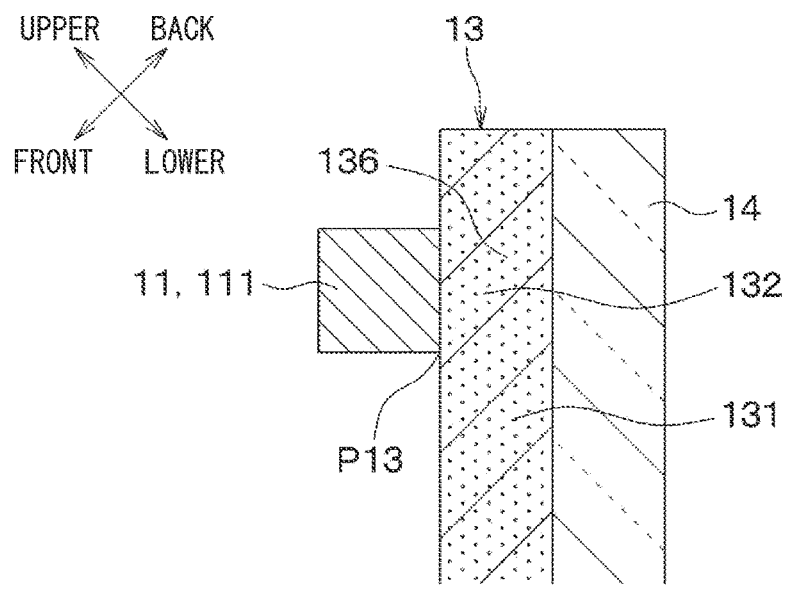
FIG. 7 is an enlarged view of a part VII of FIG. 5.

Each first connection portion 111 is stacked on the corresponding first bridge portion 132 of the transparent conductive film 13, and also stacked on a portion of the first peripheral portion 136 which is connected to the first bridge portion 132, as in the first connection portion 111 illustrated in FIGS. 5 and 7. Such a connection form between the first connection portion 111 and the transparent conductive film 13 is hereinafter referred to as a first connection form.

First ports P11, P12, P13, P14, and P15 illustrated in FIGS. 3, 4, 7, and 11 will now be described. A plurality of portions of the outer edge 131a of the transparent conductive film 13 where the first bridge portions 132 are connected to the heat generating portion 131 are the respective first ports P11 to P15. That is, each of the first ports P11 to P15 is a boundary surface between the heat generating portion 131 and the corresponding first bridge portion 132. The first ports P11 and P12 are disposed on the first oblique side S3, the first port P13 is disposed on the short side S1, and the first ports P14 and P15 are disposed on the second oblique side S4.

Each first connection portion 111 is directly connected to the corresponding first port of the plurality of first ports P11 to P15 in a small area, while being directly connected to the first bridge portion 132 facing this first port in a wide area. Therefore, the current flows between the inside of the heat generating portion 131 and the first connection portion 111 mainly in a path through the first connection portion 111 and the corresponding first bridge portion 132 via each of these first ports P11 to P15.

The first bypass portion 112 is stacked on a portion of the first peripheral portion 136 of the transparent conductive film 13 which sandwiches the first resistive portion 134 together with the heat generating portion 131 as illustrated in FIGS. 3, 6, and 9. Therefore, the first bypass portion 112 has its conduction with the heat generating portion 131 suppressed by the first resistive portion 134. As a result, the first bypass portion 112 is conductive to the heat generating portion 131 only through the adjacent first connection portions 111 and the corresponding first ports. Thus, the first resistive portion 134 suppresses the flow of the current between the inside and outside of the heat generating portion 131 not through the first ports P11 to P15 but through the first resistive portion 134.

As illustrated in FIGS. 3 and 12, the second electrode 12 has a second take-out portion 120, a plurality of second connection portions 121, and a plurality of second bypass portions 122. The dashed-dotted line in FIG. 12 is merely a virtual line to clearly show the boundary between the second connection portion 121 and the second bypass portion 122, and does not indicate a real line at the location of this dashed-dotted line.

The second take-out portion 120 allows the current to flow from the plurality of second connection portions 121 and the plurality of second bypass portions 122 to the ground. One end of the second take-out portion 120 is connected to the ground. The other end of the second take-out portion 120 is connected to the second connection portion 121 adjacent to the first cut side S5, and the second bypass portion 122 adjacent to a portion of the long side S2 closest to the first cut side S5.

The plurality of second connection portions 121 and the plurality of second bypass portions 122 are alternately arranged adjacent to each other, one by one, along the long side S2, the first cut side S5, and the second cut side S6 as illustrated in FIGS. 3 and 12. Along this sequence, the plurality of second connection portions 121 and the plurality of second bypass portions 122 are conductive to each other.

The connection of the second connection portion 121 with the second bridge portion 133 and the second peripheral portion 137 in the transparent conductive film 13 takes two forms.

Specifically, each of the second connection portions 121 closest to the second bridge portions 133 corresponding to second ports P23 and P24 illustrated in FIG. 4 is stacked on the corresponding second bridge portion 133 as illustrated in FIG. 12. Further, the second connection portion 121 is also stacked on a portion of the second peripheral portion 137 that is connected to the second bridge portion 133. Such a connection form between the second connection portion 121 and the transparent conductive film 13 is hereinafter referred to as the first connection form.

Figure 10:
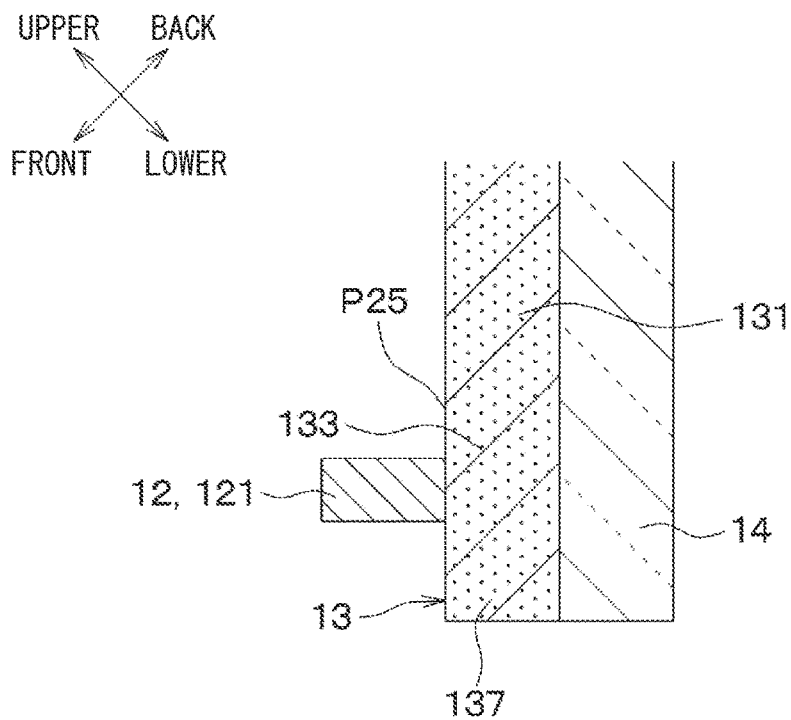
FIG. 10 is an enlarged view of a part X of FIG. 6.

Each of the second connection portions 121 closest to the second bridge portions 133 corresponding to second ports P21, P22, P25, and P26 illustrated in FIG. 4 is not stacked on the corresponding second bridge portion 133 as illustrated in FIGS. 6 and 10. Meanwhile, the second connection portion 121 is stacked on a portion of the second peripheral portion 137 that is connected to the second bridge portion 133. Such a connection form between the second connection portion 121 and the transparent conductive film 13 is hereinafter referred to as a second connection form.

The second ports P21, P22, P23, P24, P25, and P26 illustrated in FIGS. 3, 4, 10, and 12 will now be described.

A plurality of portions of the outer edge 131a of the transparent conductive film 13 where the second bridge portions 133 are connected to the heat generating portion 131 are the respective second ports P21 to P26. That is, each of the second ports P21 to P26 is a boundary surface between the heat generating portion 131 and the corresponding second bridge portion 133. The second port P21 is disposed on the first cut side S5, the second ports P22, P23, P24, and P25 are disposed on the long side S2, and the second port P26 is disposed on the second cut side S6.

As illustrated in FIG. 12, each of the second connection portions 121 connected to the transparent conductive film 13 in the first connection form is directly connected to a corresponding second port of the second ports P21, P23, P24, and P26 in a small area. In addition, each of the second connection portions 121 is directly connected to the second bridge portion 133 facing this second port in a wide area. Therefore, the current flows between the inside of the heat generating portion 131 and the second connection portion 121 mainly in a path through the second bridge portion 133 and the second connection portion 121 via each of these second ports P21, P23, P24, and P26.

As illustrated in FIGS. 10 and 12, each of the second connection portions 121 connected to the transparent conductive film 13 in the second connection form is not directly connected to a corresponding second port of the second ports P22 and P25. In addition, this second connection portion 121 is directly connected to the second bridge portion 133 facing the second port in a small area. Further, the second connection portion 121 is directly connected to a portion of the second peripheral portion 137 which is directly connected to the second bridge portion 133 in a wide area. Therefore, the current flows between the inside of the heat generating portion 131 and the second connection portion 121 mainly in a path through the second bridge portion 133, the above-described portion of the second peripheral portion 137, and the second connection portion 121 via each of these second ports P22 and P25.

It is noted that in the second connection form, the distance from the second connection portion 121 to the corresponding second port is long, compared to in the first connection form. In other words, in the second connection form, the distance by which the current passes through the transparent conductive film 13 until the current having flowed from the second port reaches the second connection portion 121 is long. As mentioned above, the resistivity of the transparent conductive film 13 is greater than that of the second electrode 12. Therefore, the amount per unit length of the current flowing between the second port and the second connection portion 121 along the outer edge 131a is greater in the first connection form than in the second connection form.

The second bypass portion 122 is stacked on a portion of the second peripheral portion 137 of the transparent conductive film 13 which sandwiches the second resistive portion 135 together with the heat generating portion 131 as illustrated in FIGS. 3, 5, and 8. Therefore, the second bypass portion 122 has its conduction with the heat generating portion 131 suppressed by the second resistive portion 135. As a result, the second bypass portion 122 is conductive to the heat generating portion 131 only through the adjacent second connection portions 121 and the corresponding second ports. Thus, the second resistive portion 135 suppresses the flow of the current between the inside and outside of the heat generating portion 131 not through the second ports P21 to P26 but through the second resistive portion 135.

The operation of the film heater 1 with the above-described configuration will be described below. As illustrated in FIGS. 1 and 2, power is supplied from the power feeder to the film heater 1 in a state where the film heater 1 is attached to the windshield 3 of the vehicle. Then, current flows through the first electrode 11, the transparent conductive film 13, the second electrode 12, and the ground in this order. At this time, the heat generating portion 131 generates heat as the current flows to the heat generating portion 131 of the transparent conductive film 13. With this heat generation, fogging of a portion of the windshield 3 where the heat generating portion 131 is attached is suppressed. As a result, the image sensor 4 can capture an image of the front of the vehicle 2 satisfactorily.

The flow of the current in the transparent conductive film 13 at this time will be described in detail. When the power is supplied from the power feeder to the film heater 1, the current flows from the power feeder to the plurality of first connection portions 111 and the first bypass portions 112 through the first take-out portion 110. Then, the current flows from the plurality of first connection portions 111 into the heat generating portion 131 through the plurality of first ports P11 to P15 as described above.

The plurality of first current suppression portions suppresses the inflow of the current from the adjacent first bypass portions 112 to the heat generating portion 131 at this time. Specifically, the plurality of first current suppression portions prohibits the inflow of the current from the adjacent first bypass portions 112 into the heat generating portion 131. As a result, the portions of the outer edge 131a through which the current flows from the first electrode 11 into the heat generating portion 131 are only the first ports P11 to P15, which are arranged discretely.

Meanwhile, at this time, the current flows from the heat generating portion 131 to the ground through the plurality of second connection portions 121 and the plurality of second bypass portions 122 and then through the second take-out portion 120. As mentioned above, the current at this time flows from the heat generating portion 131 to the plurality of second connection portions 121 through the plurality of second ports P21 to P26.

The plurality of second current suppression portions also suppresses the inflow of the current into the adjacent second bypass portions 122 from the heat generating portion 131 at this time. Specifically, the plurality of second current suppression portions prohibits the inflow of the current from the heat generating portion 131 to the adjacent second bypass portions 122. As a result, the portions of the outer edge 131a through which the current flows from the heat generating portion 131 into the second electrode 12 are only the second ports P21 to P26, which are arranged discretely.

Thus, while the film heater 1 is energized, the current flows into the heat generating portion 131 only through the first ports P11 to P15, which are arranged discretely, and flows out of the heat generating portion 131 only through the second ports P21 to P26, which are arranged discretely.

The current flowing in the plane of the heat generating portion 131 has a substantially two-dimensional flexibility in its flowing direction. Therefore, for each of the first ports P11 to P15, the current flows through the inside of the heat generating portion 131 between the first port and at least two second ports. Specifically, the current flows from the first port P11 to at least all of the second ports P21, P22, and P23. Further, the current flows from each of the first ports P12, P13, and P14 to at least all of the second ports P22, P23, P24, and P25. The current flows from the first port P15 to at least both of the second ports P25 and P26. Similarly, for each of the second ports P22 to P25, the current flows through the inside of the heat generating portion 131 between the second port and at least two first ports.

Figure 13:
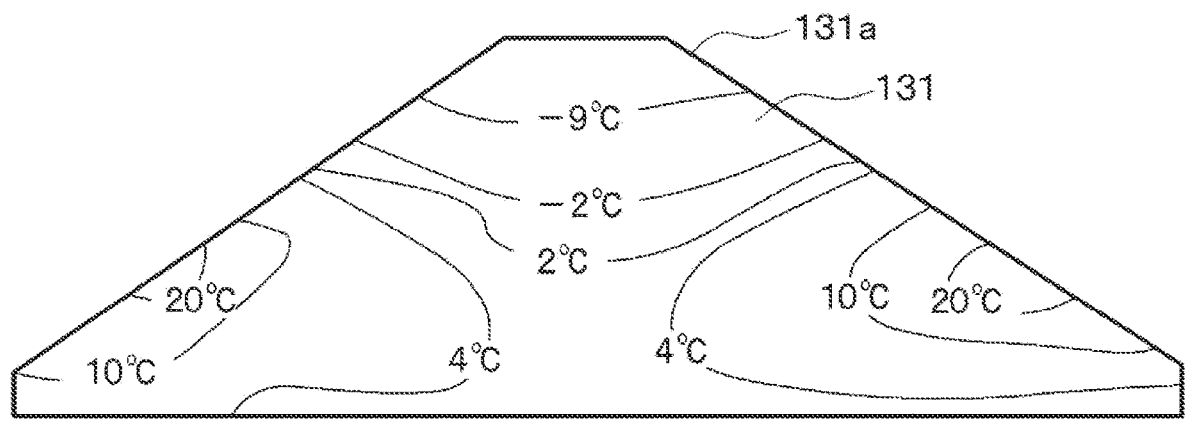
FIG. 13 is a contour diagram illustrating the temperature distribution of a heat generating portion in the first embodiment.

Consequently, the temperature distribution of the heat generating portion 131 is represented by the contour diagram in FIG. 13, for example. On the other hand, when current flows into the heat generating portion 131 uniformly from the short side S1, the first oblique side S3, and the second oblique side S4 as a whole and flows out of the heat generating portion 131 uniformly to the long side S2, the first cut side S5, and the second cut side S6, the temperature distribution of the heat generating portion 131 is represented by the contour diagram in FIG. 14.

Figure 14:
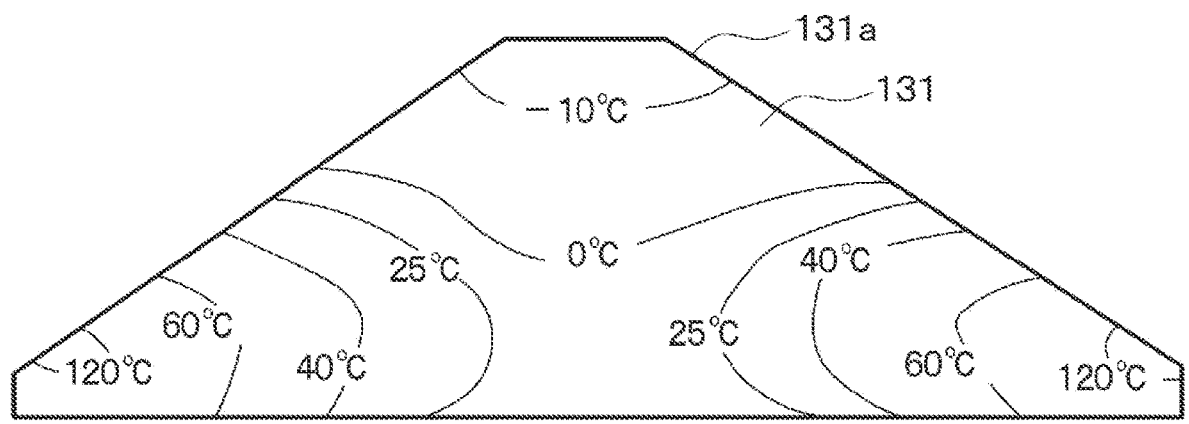
FIG. 14 is a contour diagram illustrating the temperature distribution of a heat generating portion in Comparative Example.

It is noted that the environment in which the temperature distribution of FIG. 13 is obtained is the same as the environment in which the temperature distribution of FIG. 14 is obtained, except for the inflow and outflow forms of the current to/from the heat generating portion 131. For example, the case where the temperature distribution of FIG. 13 is obtained and the case where the temperature distribution of FIG. 14 is obtained are the same in terms of the external environment such as temperature around the vehicle 2 as well as the driving conditions of the vehicle 2. When comparing FIG. 13 and FIG. 14, variations in the temperature in FIG. 13 (for example, standard deviation) are less than those in FIG. 14. In addition, when comparing FIG. 13 and FIG. 14, the difference between the maximum and minimum temperatures is smaller in FIG. 13 than that in FIG. 14.

In the present embodiment, the first ports P11 to P15 through which the current flows from the first electrode 11 into the heat generating portion 131 are arranged discretely as described above. Further, the second ports P21 to P26 through which the current flows out of the heat generating portion 131 to the second electrode 12 are arranged discretely.

In other words, the first ports P11 to P15 that serve as passage ports through which the current flows between the first electrode 11 and the inside of the heat generating portion 131 are located across the short side S1, the first oblique side S3, and the second oblique side S4 while being spaced apart from each other. Meanwhile, the second ports P21 to P26 that serve as a passage port through which the current flows between the second electrode 12 and the inside of the heat generating portion 131 are located across the long side S2, the first cut side S5, and the second cut side S6. By implementing such a discrete arrangement, the positions of the first ports P11 to P15 and the second ports P21 to P26 can be adjusted. Further, the distribution of current density in the heat generating portion 131 can be adjusted by such an adjustment of the positions of ports. The distribution of current density is a major factor in determining the temperature distribution in the heat generating portion 131. Therefore, by devising the positions of the first ports P11 to P15 and the second ports P21 to P26, the unevenness of the temperature distribution in the heat generating portion 131 can be suppressed while limiting the possibility of impairing the optical uniformity in the heat generating portion 131.

For example, in the present embodiment, an existence ratio between the first port and the first current suppression portion in the direction along the outer edge 131a is greater in the short side S1 than in each of the first oblique side S3 and the second oblique side S4. The existence ratio in a portion from the center of the first oblique side S3 to its end on the side of the short side S1 is higher than that in a portion from the center of the first oblique side S3 to its end on the side of the long side S2. The existence ratio in a portion from the center of the second oblique side S4 to its end on the side of the short side S1 is higher than that in a portion from the center of the second oblique side S4 to its end on the side of the long side S2. The existence ratio between the port and the current suppression portion in the direction along the outer edge 131a within one range refers to a ratio of the total length of the ports disposed in that range along the outer edge 131a to the total length of the current suppression portions disposed in that range along the outer edge 131a.

Thus, the unevenness of the temperature distribution in the heat generating portion 131 can be suppressed by increasing the existence ratio of the first port in the portion where the distance from the first port to the second port is relatively long through the heat generating portion 131.

However, at least one first port is located on a side closer to the long side S2 with respect to the center of the first oblique side S3. Specifically, the first port P11 is located on a side closer to the long side S2 with respect to the center of the first oblique side S3.

A portion of the heat generating portion 131 that is enclosed between a side of the first oblique side S3 closer to the long side S2 with respect to the center of the first oblique side S3 and the right side of the long side S2 with respect to the center of the long side S2 corresponds to a corner. If none of the first ports exists near the corner, the amount of current flowing to the corner may become extremely small, causing the temperature at the corner to be biased significantly toward the lower temperature. In contrast, the possibility that the temperature at the corner may be significantly biased toward the lower temperature can be reduced when at least one first port is located on the side closer to the long side with respect to the center of the first oblique side S3 as described above.

Similarly, at least one first port is located on the side closer to the long side S2 with respect to the center of the second oblique side S4. Specifically, the first port P15 is located on the side closer to the long side S2 with respect to the center of the second oblique side S4. Thus, the possibility that the temperature of a corner enclosed between the side of the second oblique side S4 closer to the long side S2 with respect to the center of the second oblique side S4 and the left side of the long side S2 with respect to the center of the long side S2 may be biased significantly toward the lower temperature can be reduced.

The first port P13 of the first ports P11 to P15 is located on the short side S1. Portions of the second ports P23 and P24 are located on the long side S2 in positions facing the short side S1.

Specifically, a portion of the long side S2 is located between a virtual straight line (not illustrated) passing in parallel to a center line CL illustrated in FIGS. 3 and 4 and through one end of the short side S1 (i.e., the right end) and another virtual straight line (not illustrated) passing in parallel to the center line CL and through the other end of the short side S1 (i.e., the left end). This portion of the long side S2 is a portion of the long side S2 that faces the short side S1. The second ports P23 and P24 are partially included in this part.

Since the short side S1 is located farther from the long side S2 than the first oblique side S3 and the second oblique side S4 are, when at least one first port is located on the short side, the amount of current passing through this first port may become extremely small. Furthermore, the temperature near the first port P13 may become uneven while being biased significantly toward the lower temperature. In contrast, the possibility that the temperature near the short side S1 may be biased significantly toward the lower temperature can be reduced when at least one second port P23 or P24 is located on the long side in the position facing the short side S1 as described above.

The second port P21 is disposed on the first cut side S5. Depending on the arrangement of the first port and the second port, the current may flow less through the corner enclosed between the side of the first oblique side S3 closer to the long side S2 with respect to the center of the first oblique side S3 and one side (i.e., the right side) of the long side S2, causing the temperature of the corner to be biased significantly toward the lower temperature side. By providing the first cut side S5, the corner is shaped with its apex cut, so that the tendency for the current to flow less through the corner can be reduced. In addition, by disposing at least one second port (i.e., the second port P21) on the first cut side S5, the possibility that the temperature of the corner may be biased significantly toward the lower temperature can be further reduced.

Similarly, the second port P26 is disposed on the second cut side S6. By providing the second cut side S6, the tendency for the current to flow less through the corner, which is enclosed between the side of the second oblique side S4 closer to the long side S2 with respect to the center of the second oblique side S4 and the other side of the long side S2 (i.e., the left side), can be reduced as described above. In addition, by disposing at least one second port (i.e., the second port P26) on the second cut side S6, the possibility that the temperature of the corner may be biased significantly toward the lower temperature can be further reduced.

The current suppression portion between the first ports P11 and P12 has a length longer than that of each of the second current suppression portion between the second ports P22 and P23, the second current suppression portion between the second ports P23 and P24, and the second current suppression portion between the second ports P24 and P25. The same goes for the first current suppression portion between the first ports P14 and P15. The same goes for the first current suppression portion on the side closer to the first cut side S5 with respect to the first port P11 and the first current suppression portion on the side closer to the second cut side S6 with respect to the first port P15. The length as used herein refers to a length along the outer edge 131a of the heat generating portion 131.

The length of a portion composed of the short side S1, the first oblique side S3, and the second oblique side S4 in the outer edge 131a of the heat generating portion 131 is longer than that of a portion composed of the long side S2. Therefore, when the plurality of first current suppression portions and the plurality of second current suppression portions have the same length in total, the number of first ports P1 may be much greater than the number of second ports P2. If the number of first ports P1 becomes much greater than the number of second ports P2, the current may be concentrated on the second ports, resulting in an excessive amount of heat generated near the second ports of the heat generating portion 131. In contrast, when any of the first current suppression portions is longer than any of the second current suppression portions, the number of first ports P1 can be prevented from possibly becoming much greater than the number of second ports P2. Then, the possibility of generation of an excessive amount of heat near the second ports of the heat generating portion 131 can be reduced.

The sum of the lengths of the plurality of first ports P11 to P15 is longer than the sum of the lengths of the plurality of second ports P21 to P25. The length as used herein refers to a length along the outer edge 131a of the heat generating portion 131. With this arrangement, the possibility of generation of an excessive amount of heat near the second ports of the heat generating portion 131 can be reduced.

As described above, the plurality of second connection portions 121 include second connection portions 121 connected to the transparent conductive film 13 in the first connection form, and other second connection portions 121 connected to the transparent conductive film 13 in the second connection form.

Here, the resistance value per unit length from each second connection portion 121 to the corresponding second port along the outer edge 131a of the heat generating portion 131 is lower when the second connection portion 121 is in the first connection form than when the second connection portion 121 is in the second connection form.

Therefore, when the width of the second connection portion 121 along the outer edge 131a in the first connection form is the same as that in the second connection form, the current value between the second connection portion 121 in the first connection form and the corresponding second port is greater than the current value between the second connection portion 121 in the second connection form and the corresponding second port.

Here, the second ports corresponding to the respective second connection portions 121 in the first connection form are the second ports P21, P23, P24, and P26. Meanwhile, the second ports corresponding to the respective second connection portions 121 in the second connection form are the second ports P22 and P25.

By making the resistance values per unit length of these different second connection portions 121 along the outer edge 131a of the heat generating portion 131 different in this way, the distribution of the current density of the current flowing through the heat generating portion can be adjusted more flexibly, compared to when setting the resistance values per unit length of different second connection portions 121 uniformly the same. Furthermore, the temperature distribution of the heat generating portion 131 can be adjusted more flexibly.

As illustrated in FIGS. 3 and 4, the second port P21 located at the farthest position on one side (i.e., the right side) from the center line CL among the plurality of second ports, which center line is a straight line connecting the center of the short side S1 and the center of the long side S2, is farther from the center line CL than the first port P11 located at the farthest position on this side from the center line CL among the plurality of first ports.

Depending on the arrangement of the first port and the second port, the current flows less through the corner enclosed between the side of the first oblique side S3 closer to the long side S2 with respect to the center of the first oblique side S3 and one side of the long side S2 with respect to the center of the long side S2. Thus, the temperature of the corner may be biased significantly toward the lower temperature side. Specifically, when comparing the first port P11 and the second port P21 which are located at the farthest positions on one side from the center line CL among the first and second ports, respectively, the current flows avoiding the corner if the first port P11 is located farther from the center line CL than the second port P21. On the other hand, when comparing the first port P11 and the second port P21 which are located at the farthest positions on one side from the center line CL among the first and second ports, respectively, the current flows in the direction that passes through the corner if the second port P21 is located farther from the center line CL than the first port P11. Thus, the possibility that the temperature of the corner may be biased significantly toward the lower temperature in the heat generating portion 131 can be reduced.

Similarly, the second port P26 located at the farthest position on the other side (i.e., the left side) from the center line CL among the second ports is farther from the center line CL than the first port P15 located at the farthest position on the other side from the center line CL among the first ports. Thus, the heat generating portion 131 can reduce the possibility that the temperature of the corner enclosed between the side of the second oblique side S4 closer to the long side S2 with respect to the center of the second oblique side S4 and the other side of the long side S2 with respect to the center of the long side S2 may be biased significantly toward the lower temperature.

Second Embodiment

Next, a second embodiment will be described with reference to FIG. 15. A film heater 1 of the present embodiment differs from that of the first embodiment in that the shapes of a first electrode 11, a second electrode 12, and a transparent conductive film 13 are changed.

Figure 15:
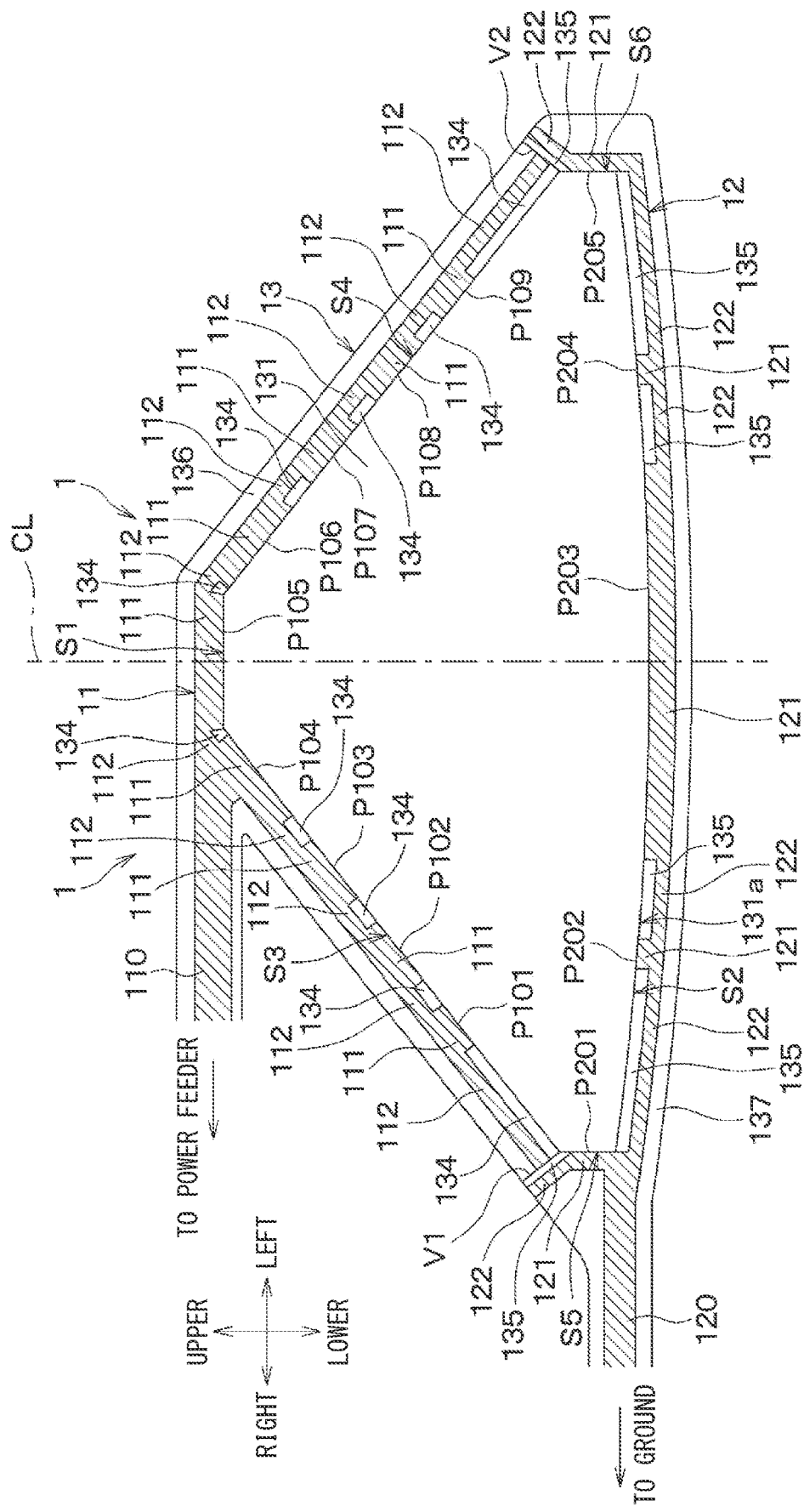
FIG. 15 is a cross-sectional view taken at the same cross-section as FIG. 3 in a second embodiment.

Specifically, as illustrated in FIG. 15, the plurality of first connection portions 111, the plurality of first bypass portions 112, the plurality of second connection portions 121, the plurality of second bypass portions 122, the plurality of first resistive portions 134, and the plurality of second resistive portions 135 are disposed. The first ports P101 to P109 are disposed in one-to-one correspondence with these first connection portions 111. The second ports P201 to P205 are disposed in one-to-one correspondence with these second connection portions 121. It is noted that in the present embodiment, all the first connection portions 111 and all the second connection portions 121 are in contact with the heat generating portion 131 in the first connection form.

Such an arrangement of the first connection portions 111, the second connection portions 121, the first resistive portions 134, and the second resistive portions 135 can also obtain the same effects as in the first embodiment.

Specifically, the first ports P101 to P109 through which the current flows from the first electrode 11 into the heat generating portion 131 are arranged discretely. Further, the second ports P201 to P205 through which the current flows out of the heat generating portion 131 to the second electrode 12 are arranged discretely. Therefore, by devising the positions of the first ports P101 to P109 and the second ports P201 to P205, the unevenness of the temperature distribution in the heat generating portion 131 can be suppressed.

An existence ratio between the first port and the first current suppression portion in the direction along the outer edge 131a is greater in the short side S1 than in each of the first oblique side S3 and the second oblique side S4. The existence ratio in a portion from the center of the first oblique side S3 to its end on the side of the short side S1 is higher than that in a portion from the center of the first oblique side S3 to its end on the side of the long side S2. The existence ratio in a portion from the center of the second oblique side S4 to its end on the side of the short side S1 is higher than that in a portion from the center of the second oblique side S4 to its end on the side of the long side S2. Thus, the unevenness of the temperature distribution in the heat generating portion 131 can be suppressed.

Meanwhile, the first port P101 is located on the side closer to the long side S2 with respect to the center of the first oblique side S3. Similarly, the first port P109 is located on the side closer to the long side S2 with respect to the center of the second oblique side S4. Thus, the possibility that the temperature of the corner may be biased significantly toward the lower temperature can be reduced.

The first port P105 is located on the short side S1. A portion of the second port P203 is located on the long side S2 in the position facing the short side S1. Thus, the possibility that the temperature near the short side S1 may be biased significantly toward the lower temperature can be reduced.

The second port P201 is disposed on the first cut side S5. The second port P205 is disposed on the second cut side S6. Thus, the possibility that the temperature of the corner may be biased significantly toward the lower temperature can be further reduced.

The first current suppression portion on the side closer to the first cut side S5 with respect to the first port P101 is longer than each of the second current suppression portion between the second ports P202 and P203, and the second current suppression portion between the second ports P203 and P204. The same goes for the first current suppression portion on the side closer to the second cut side S6 with respect to the first port P109. The sum of the lengths of the plurality of first ports P101 to P109 is longer than the sum of the lengths of the plurality of second ports P201 to P205. In addition, the possibility of generation of an excessive amount of heat near the second ports of the heat generating portion 131 can be reduced.

The second port P201 located at the farthest position on one side (i.e., the right side) from the center line CL among the second ports, which center line is a straight line connecting the center of the short side S1 and the center of the long side S2, is farther from the center line CL than the first port P101 located at the farthest position on this side from the center line CL among the first ports. Similarly, the second port P205 located at the farthest position on the other side (i.e., the left side) from the center line CL among the second ports is farther from the center line CL than the first port P109 located at the farthest position on the other side from the center line CL among the first ports. Thus, the possibility that the temperature of the corner may be biased significantly toward the lower temperature can be reduced.

Third Embodiment

Figure 16:
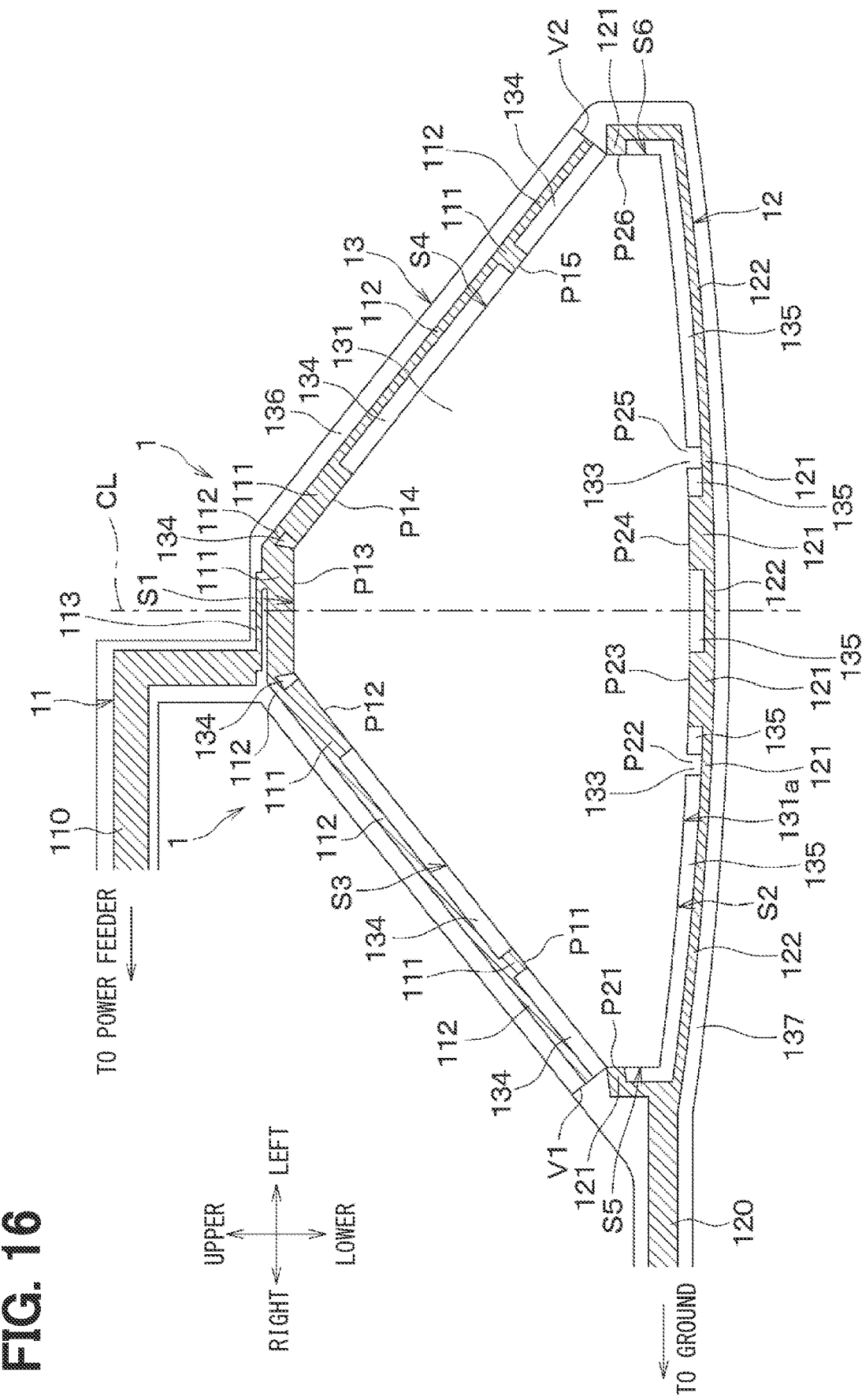
FIG. 16 is a cross-sectional view taken at the same cross-section as FIG. 3 in a third embodiment.

Next, a third embodiment will be described with reference to FIGS. 16 and 17. In a film heater 1 of the present embodiment, the shapes of a first electrode 11 and a transparent conductive film 13 are changed from those of the first embodiment. Specifically, as illustrated in FIG. 16, the first electrode 11 has a first resistance increase portion 113, in addition to the first take-out portion 110, the plurality of first connection portions 111, and the plurality of first bypass portions 112. The material for the first resistance increase portion 113 is the same as that for the first take-out portion 110, the first connection portion 111, and the first bypass portion 112.

One end of the first take-out portion 110 is connected to the power feeder, while the other end thereof is connected to one end of the first resistance increase portion 113. The other end of the first resistance increase portion 113 is connected to the first connection portion 111 adjacent to the short side S1. This other end of the first resistance increase portion 113 may be connected to any one of other first connection portions 111 or may be connected to the first bypass portion 112.

The first resistance increase portion 113 has a width narrower than that of the first take-out portion 110. As used herein, the widths of the first resistance increase portion 113 and the first take-out portion 110 are the lengths of the first resistance increase portion 113 and the first take-out portion 110, respectively, in a direction orthogonal to the direction through which the current flows in the plane of the film heater 1. Therefore, the resistance value per unit length of the first resistance increase portion 113 along the flow direction of the current is greater than the resistance value per unit length of the first take-out portion 110 along the flow direction of the current.

The width of the first resistance increase portion 113 is shorter than the width of the first connection portion 111 to which the first resistance increase portion 113 is directly connected, and also shorter than the width of the other first connection portions 111. As used herein, the width of the first connection portion 111 is the length of the first connection portion 111 in a direction orthogonal to the outer edge 131a of the heat generating portion 131 in the plane of the film heater 1.

The above width of the first resistance increase portion 113 is shorter than that of any of the first bypass portions 112. As used herein, the width of the first bypass portion 112 is the length of the first bypass portion 112 in the direction orthogonal to the outer edge 131a of the heat generating portion 131 in the plane of the film heater 1.

The first resistance increase portion 113 is disposed to face the short side S1. The first resistance increase portion 113 is disposed in the position closest to the short side S1 on the outer edge 131a of the heat generating portion 131 and extends in parallel to and along the short side S1. The first connection portion 111 corresponding to the first port P13 is disposed between the first resistance increase portion 113 and the short side S1.

The transparent conductive film 13 has its shape changed to overlap the first take-out portion 110 and the first resistance increase portion 113, in response to the addition of the first resistance increase portion 113 and the change in the shape of the first take-out portion 110 that follows this addition.

With this arrangement, the current flows through the first take-out portion 110, the first resistance increase portion 113, the first connection portions 111, and the heat generating portion 131 in this order. That is, the first take-out portion 110, the first resistance increase portion 113, and the heat generating portion 131 are connected in series.

When the current flows through the first resistance increase portion 113, the first resistance increase portion 113 generates heat. At this time, the temperature of the first resistance increase portion 113 becomes higher than the temperature of the first take-out portion 110. This is because the resistance value per unit length of the first resistance increase portion 113 along the flow direction of the current is greater than the resistance value per unit length of the first take-out portion 110 along the flow direction of the current.

The heat generating portion 131 is heated with heat generated from the first resistance increase portion 113. Thus, the temperature of the heat generating portion 131 can be adjusted. Therefore, the temperature distribution of the heat generating portion 131 can be adjusted more flexibly. With a simple configuration in which the width of the first resistance increase portion 113 is made narrower than the width of the first take-out portion 110, the temperature of the first resistance increase portion 113 can be increased.

The reason why the first resistance increase portion 113 is disposed near the short side S1 is that the temperature near the short side S1 of the heat generating portion 131 is more likely to become lower than that of other portions of the heat generating portion 131. This is because the short side S1 is far from the long side S2, compared to the second oblique side S4 and the first oblique side S3, and the corner is located near the short side S1, for example. Therefore, the unevenness of the temperature in the heat generating portion 131 can be reduced more by providing the first resistance increase portion 113 because the first resistance increase portion 113 generates heat near the short side S1.

Figure 17:
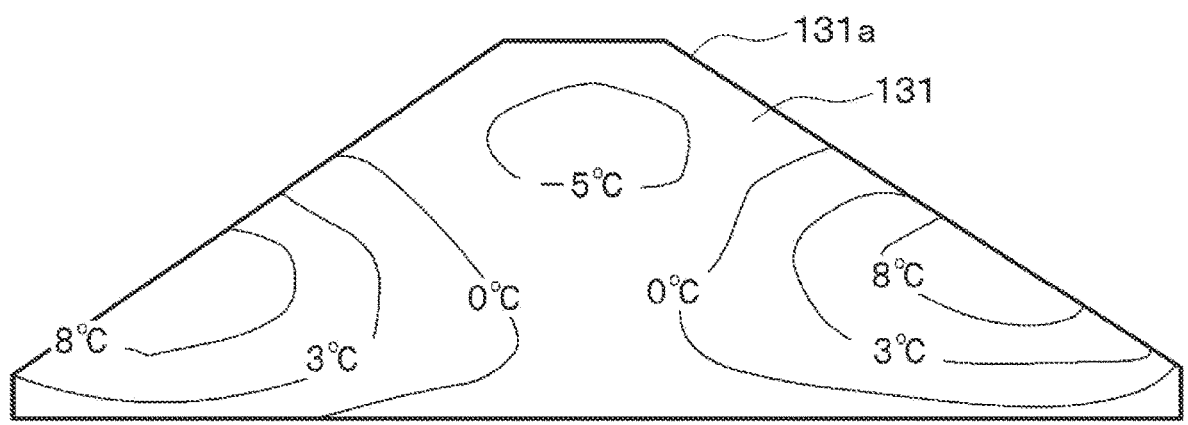
FIG. 17 is a contour diagram illustrating the temperature distribution of a heat generating portion in the third embodiment.

For example, the temperature distribution of the heat generating portion 131 is represented by the contour diagram in FIG. 17. When comparing this contour line and the contour line in FIG. 13, a portion of the heat generating portion 131 near the short side S1 is warmed with heat generated from the first resistance increase portion 113 and thus has its temperature increased in an example of FIG. 17. As a result, variations in the temperature of the inside of the heat generating portion 131 and the difference between the maximum and minimum temperature thereof are reduced, compared to the example of FIG. 13.

It is noted that the same effects as those in the first embodiment can be obtained from the configuration common to the present embodiment and the first embodiment. In addition, the changes made in the present embodiment with respect to the first embodiment can also be applied to the second embodiment in the same manner.

Fourth Embodiment

Figure 18:
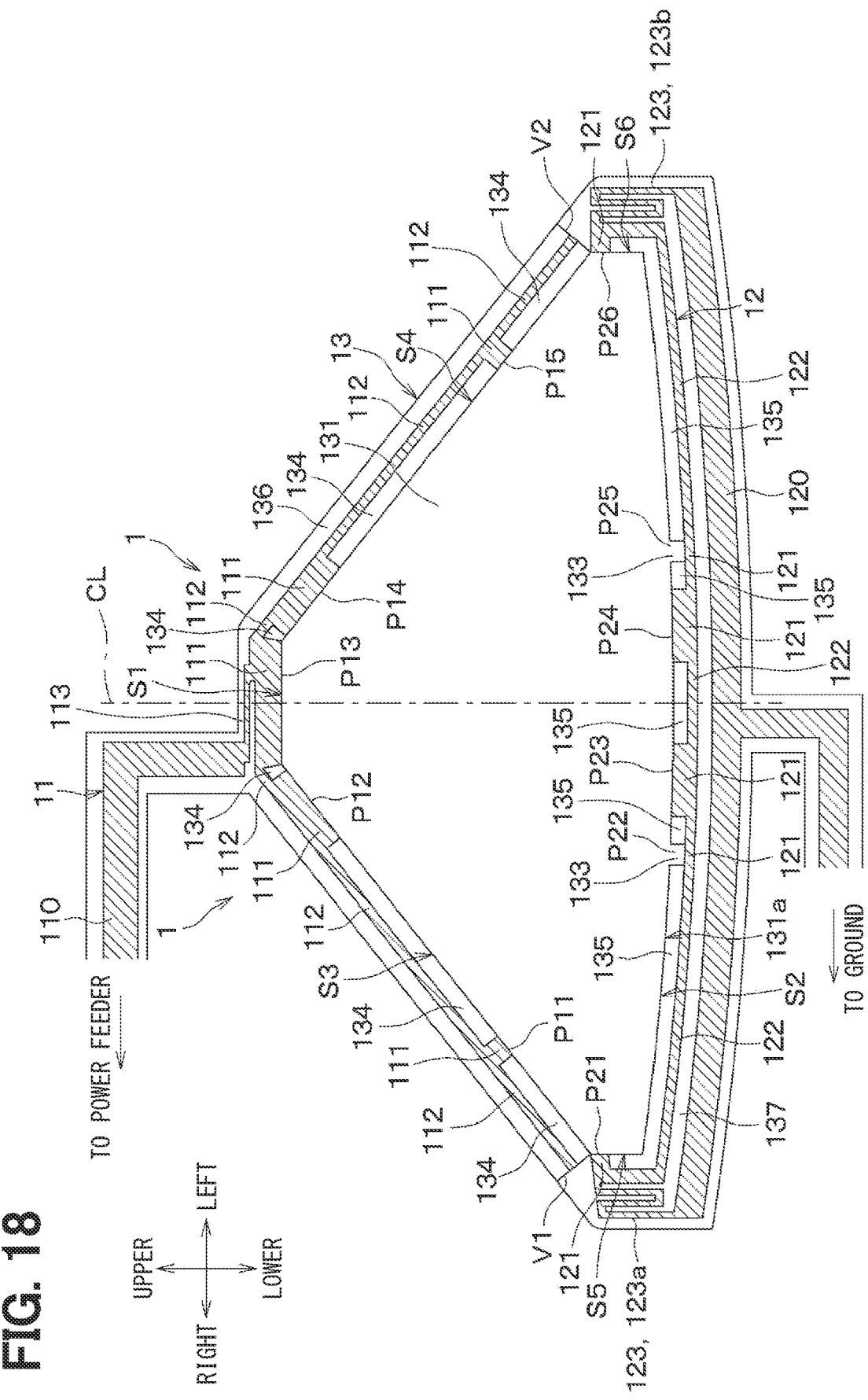
FIG. 18 is a cross-sectional view taken at the same cross-section as FIG. 3 in a fourth embodiment.

Next, a fourth embodiment will be described with reference to FIG. 18. In a film heater 1 of the present embodiment, the shapes of a second electrode 12 and a transparent conductive film 13 are changed from those of the third embodiment. Specifically, as illustrated in FIG. 18, the second electrode 12 has a second resistance increase portion 123, in addition to the second take-out portion 120, the plurality of second connection portions 121, and the plurality of second bypass portions 122. The material for the second resistance increase portion 123 is the same as that of the second take-out portion 120, the second connection portion 121, and the second bypass portion 122. The second resistance increase portion 123 has two separated portions 123a and 123b as illustrated in FIG. 18.

One end of the second take-out portion 120 is connected to the ground, while the other end thereof is connected to one end of the portion 123a of the second resistance increase portion 123. The second take-out portion 120 branches off in a path from the ground side end to the portion 123a side end. One end of the branched portion of the second take-out portion 120 is connected to one end of the portion 123b of the second resistance increase portion 123.

The other end of the portion 123a is connected to the second connection portion 121 adjacent to the first cut side S5. This other end of the portion 123a may be connected to the other second connection portion 121 or may be connected to the second bypass portion 122. The other end of the portion 123b is connected to the second connection portion 121 adjacent to the second cut side S6. This other end of the portion 123b may be connected to the other second connection portion 121 or may be connected to the second bypass portion 122.

The second resistance increase portion 123 has a width narrower than that of the second take-out portion 120. As used herein, the widths of the second resistance increase portion 123 and the second take-out portion 120 refer to the lengths of the second resistance increase portion 123 and the second take-out portion 120, respectively, in a direction orthogonal to the direction through which the current flows in the plane of the film heater 1. Therefore, the resistance value per unit length of the second resistance increase portion 123 along the flow direction of the current is higher than the resistance value per unit length of the second take-out portion 120 along the flow direction of the current.

The width of the second resistance increase portion 123 is shorter than the width of the second connection portion 121 to which the second resistance increase portion 123 is directly connected, and also shorter than the width of the other second connection portions 121. As used herein, the width of the second connection portion 121 is the length of the second connection portion 121 in the direction orthogonal to the outer edge 131a of the heat generating portion 131 in the plane of the film heater 1.

The above width of the second resistance increase portion 123 is shorter than that of any of the second bypass portions 122. As used herein, the width of the second bypass portion 122 is the length of the second bypass portion 122 in the direction orthogonal to the outer edge 131a of the heat generating portion 131 in the plane of the film heater 1.

The portions 123a and 123b of the second resistance increase portion 123 are disposed closest to the first cut side S5 and the second cut side S6 of the outer edge 131a of the heat generating portion 131, respectively. The portions 123a and 123b have portions extending in parallel to the first cut side S5 and the second cut side S6, along the first cut side S5 and the second cut side S6, respectively. The second connection portion 121 corresponding to the second port P21 is disposed between the portion 123a and the first cut side S5. The second connection portion 121 corresponding to the second port P26 is disposed between the portion 123b and the second cut side S6.

The transparent conductive film 13 has its shape changed to overlap the second take-out portion 120 and the second resistance increase portion 123, in response to the addition of the second resistance increase portion 123 and the change in the shape of the second take-out portion 120 that follows this addition.

With this arrangement, the current flows through the heat generating portion 131, the second connection portion 121, the portion 123a of the second resistance increase portion 123, and the second take-out portion 120 in this order, while the current flows through the heat generating portion 131, the second connection portion 121, the portion 123b of the second resistance increase portion 123, and the second take-out portion 120 in this order. That is, the heat generating portion 131, the second connection portion 121, the portion 123a of the second resistance increase portion 123, and the second take-out portion 120 are connected in series. Further, the heat generating portion 131, the second connection portion 121, the portion 123b of the second resistance increase portion 123, and the second take-out portion 120 are connected in series. The portions 123a and 123b of the second resistance increase portion 123 are arranged in parallel.

When the current flows through the second resistance increase portion 123, the second resistance increase portion 123 generates heat. At this time, the temperature of the second resistance increase portion 123 becomes higher than the temperature of the second take-out portion 120. This is because the resistance value per unit length of the second resistance increase portion 123 along the flow direction of the current is higher than the resistance value per unit length of the second take-out portion 120 along the flow direction of the current.

The heat generating portion 131 is heated with heat generated from the second resistance increase portion 123. Thus, the temperature of the heat generating portion 131 can be adjusted. Therefore, the temperature distribution of the heat generating portion 131 can be adjusted more flexibly. With a simple configuration in which the width of the second resistance increase portion 123 is made narrower than the width of the second take-out portion 120, the temperature of the second resistance increase portion 123 can be increased.

The reason why the portions 123a and 123b of the second resistance increase portion 123 are disposed near the first cut side S5 and the second cut side S6, respectively, is that the temperature of the corners near the first cut side S5 and the second cut side S6 of the heat generating portion 131 is more likely to become lower than that of other portions of the heat generating portion 131. Therefore, the unevenness of the temperature in the heat generating portion 131 can be reduced more by causing the portions 123a and 123b to generate heat near the first cut side S5 and the second cut side S6, respectively.

The resistance value of the second resistance increase portion 123 is higher than that of the first resistance increase portion 113. As used herein, the resistance value of the second resistance increase portion 123 refers to the sum of resistance values of the portions 123a and 123b.

Since the first resistance increase portion 113, the heat generating portion 131, and the second resistance increase portion 123 are coupled together in series, the amount of heat generated by the second resistance increase portion 123 is greater than that generated by the first resistance increase portion 113 due to the relationship of the resistance values described above.

For example, when each of the portions 123a and 123b has the same shape and size as the first resistance increase portion 113, the above relationship of the resistance values is achieved if the resistivity of the second resistance increase portion 123 is twice greater than the resistivity of the first resistance increase portion 113.

For example, when the second resistance increase portion 123 has the same resistivity and width as the first resistance increase portion 113, as illustrated in FIG. 18, the above relationship of the resistance values is achieved if the length of each of the portions 123a and 123b is twice greater than the length of the first resistance increase portion 113. As used herein, the length of each of the portions 123a and 123b refers to the length of each of the portions 123a and 123b along the direction in which the current flows through the portions 123a and 123b. To this end, each of the portions 123a and 123b of the second resistance increase portion 123 has a meandering and extending shape as illustrated in FIG. 18. More specifically, the portion 123a meanders and extends in the plane of the transparent conductive film 13 so as to fold and overlap in the direction orthogonal to the first cut side S5 while coming and going in the direction of extension of the first cut side S5. Similarly, the portion 123b meanders and extends in the plane of the transparent conductive film 13 so as to fold and overlap in the direction orthogonal to the second cut side S6 while coming and going in the direction of extension of the second cut side S6.

For example, when the second resistance increase portion 123 has the same resistivity and length as the first resistance increase portion 113, the above relationship of the resistance values is achieved if the width of each of the portions 123a and 123b is less than half the width of the first resistance increase portion 113.

A portion located near the long side S2 and having a relatively wide area is less likely to be warmed than a portion located near the short side S1 and having a relatively small area, because of its relatively wide area. However, this tendency can be reduced because the amount of heat generated in the second resistance increase portion 123 becomes larger than that in the first resistance increase portion 113 by making the resistance value of the second resistance increase portion 123 greater than that of the first resistance increase portion 113. It is noted that the same effects as those in the third embodiment can be obtained from the configuration common to the present embodiment and the third embodiment.

Fifth Embodiment

Figure 19:
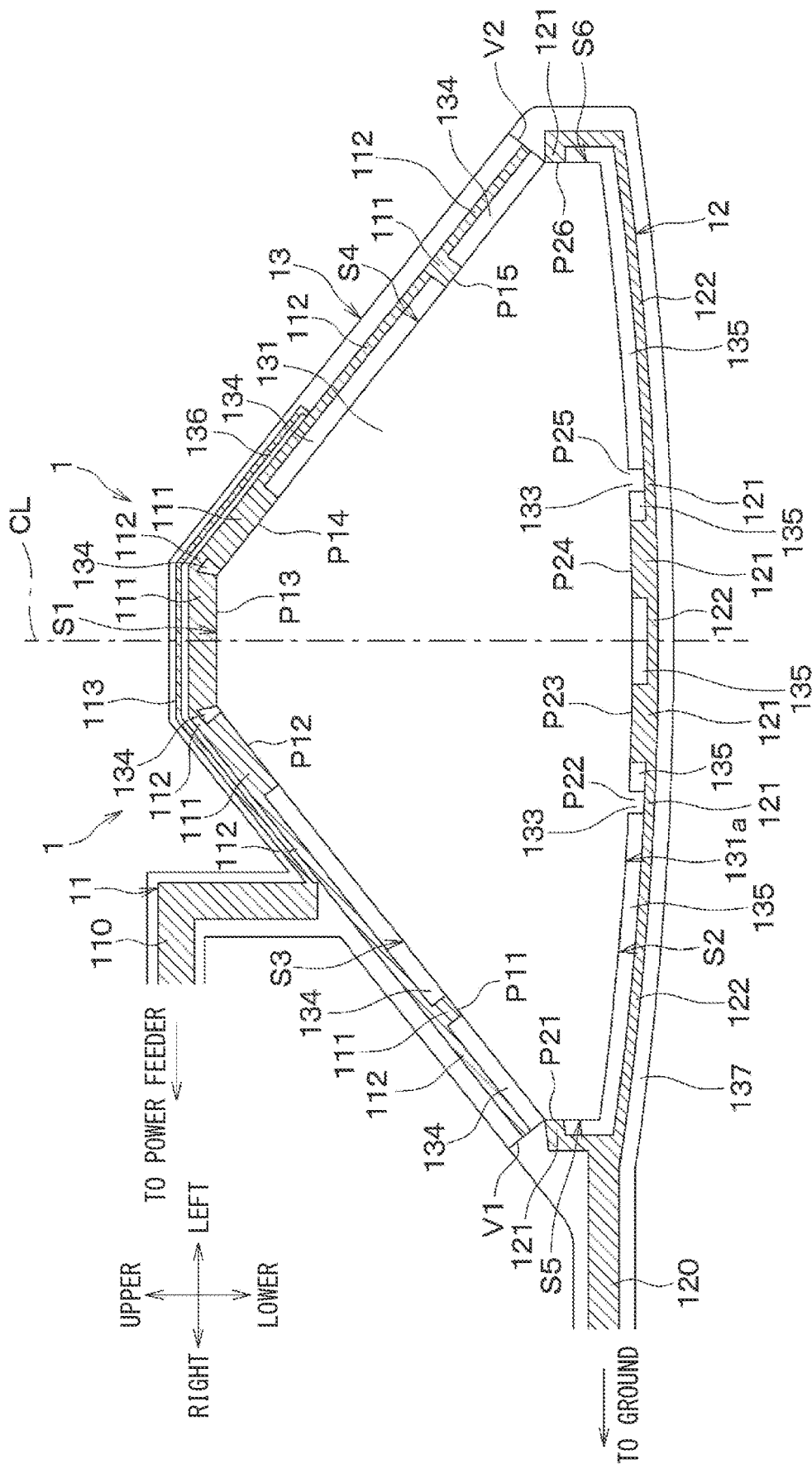
FIG. 19 is a cross-sectional view taken at the same cross-section as FIG. 3 in a fifth embodiment.

Next, a fifth embodiment will be described with reference to FIG. 19. In a film heater 1 of the present embodiment, the shapes of a first take-out portion 110, a first resistance increase portion 113, and a transparent conductive film 13 are changed from those of the first embodiment. Specifically, as illustrated in FIG. 19, the first resistance increase portion 113 faces a portion of the first oblique side S3 and a portion of the second oblique side S4, as well as the short side S1. More specifically, the first resistance increase portion 113 faces a portion of the first oblique side S3 on the side closer to the short side S1 with respect to the center of the first oblique side S3 and a portion of the second oblique side S4 on the side closer to the short side S1 with respect to the center of the second oblique side S4.

One end of the first take-out portion 110 is connected to the power feeder, while the other end thereof is connected to one end of the first resistance increase portion 113. The other end of the first resistance increase portion 113 is connected to the second connection portion 121 adjacent to the second oblique side S4. This other end of the first resistance increase portion 113 may be connected to the other second connection portion 121 or may be connected to the first connection portion 111.

The first resistance increase portion 113 has a width narrower than that of the first take-out portion 110, as in the third embodiment. Therefore, the resistance value per unit length of the first resistance increase portion 113 along the flow direction of the current is greater than the resistance value per unit length of the first take-out portion 110 along the flow direction of the current.

The width of the first resistance increase portion 113 is shorter than the width of each of the first connection portion 111 and the second connection portion 121 to which the first resistance increase portion 113 is directly connected, and also shorter than the width of the other second connection portions 121. The width of the first resistance increase portion 113 is shorter than that of any of the first connection portions 111. The widths of the first connection portion 111, the first bypass portion 112, and the first resistance increase portion 113 are defined in the same manner as in the third embodiment.

A portion of the first resistance increase portion 113 that faces the short side S1 is disposed in the position closest to the short side S1 on the outer edge 131a of the heat generating portion 131 and extends in parallel to and along the short side S1. The first connection portion 111 corresponding to the first port P13 is disposed between the portion of the first resistance increase portion 113 facing the short side S1 and the short side S1.

A portion of the first resistance increase portion 113 that faces the first oblique side S3 is disposed in the position closest to the first oblique side S3 on the outer edge 131a of the heat generating portion 131 and extends in parallel to and along the first oblique side S3. The first connection portion 111 corresponding to the first port P12 and the first bypass portion 112 adjacent to the first connection portion 111 on the side closer to the first cut side S5 are disposed between the first oblique side S3 and the portion of the first resistance increase portion 113 facing the first oblique side S3.

A portion of the first resistance increase portion 113 that faces the second oblique side S4 is disposed in the position closest to the second oblique side S4 on the outer edge 131a of the heat generating portion 131 and extends in parallel to and along the second oblique side S4. The first connection portion 111 corresponding to the first port P14 and the first bypass portion 112 adjacent to the first connection portion 111 on the side closer to the second cut side S6 are disposed between the second oblique side S4 and the portion of the first resistance increase portion 113 facing the second oblique side S4.

The transparent conductive film 13 has its shape changed to overlap the first take-out portion 110 and the first resistance increase portion 113, in response to the addition of the first resistance increase portion 113 and the change in the shape of the first take-out portion 110 that follows this addition.

As in the third embodiment, when the current flows to the first resistance increase portion 113, the first resistance increase portion 113 generates heat, so that the temperature of the first resistance increase portion 113 becomes higher than the temperature of the first take-out portion 110. This is because the resistance value per unit length of the first resistance increase portion 113 along the flow direction of the current is greater than the resistance value per unit length of the first take-out portion 110 along the flow direction of the current.

The heat generating portion 131 is heated with heat generated from the first resistance increase portion 113. Specifically, not only a portion of the heat generating portion 131 near the short side S1, but also portions of the heat generating portion 131 near portions of the first oblique side S3 and second oblique side S4 on the sides closer to the short side S1 with respect to the centers of the first and second oblique sides S3 and S4 are heated. When the heat generated only from the heat generating portion 131 itself is not sufficient for the temperature of the portions on the side closer to the short side S1 with respect to the centers of the first oblique side S3 and the second oblique side S4, the insufficient temperature can be compensated for by the arrangement described above, thereby reducing variations in the temperature in the heat generating portion 131.

It is noted that the same effects as those in the third embodiment can be obtained from the configuration common to the present embodiment and the third embodiment. In addition, the changes made in the present embodiment with respect to the third embodiment can also be applied to the fourth embodiment in the same manner. In that case, the same effects as those in the fourth embodiment can be obtained from the configuration common to the present embodiment applied thereto and the fourth embodiment. However, when the changes made in the present embodiment with respect to the third embodiment are applied to the fourth embodiment, the relationship in the resistance value between the first resistance increase portion 113 and the second resistance increase portion 123 may be reversed. That is, the resistance value of the first resistance increase portion 113 may be higher than that of the second resistance increase portion 123. This is due to the influence given by the first resistance increase portion 113 of the present embodiment which becomes long compared to the first resistance increase portion 113 of the fourth embodiment.

Sixth Embodiment

Figure 20:
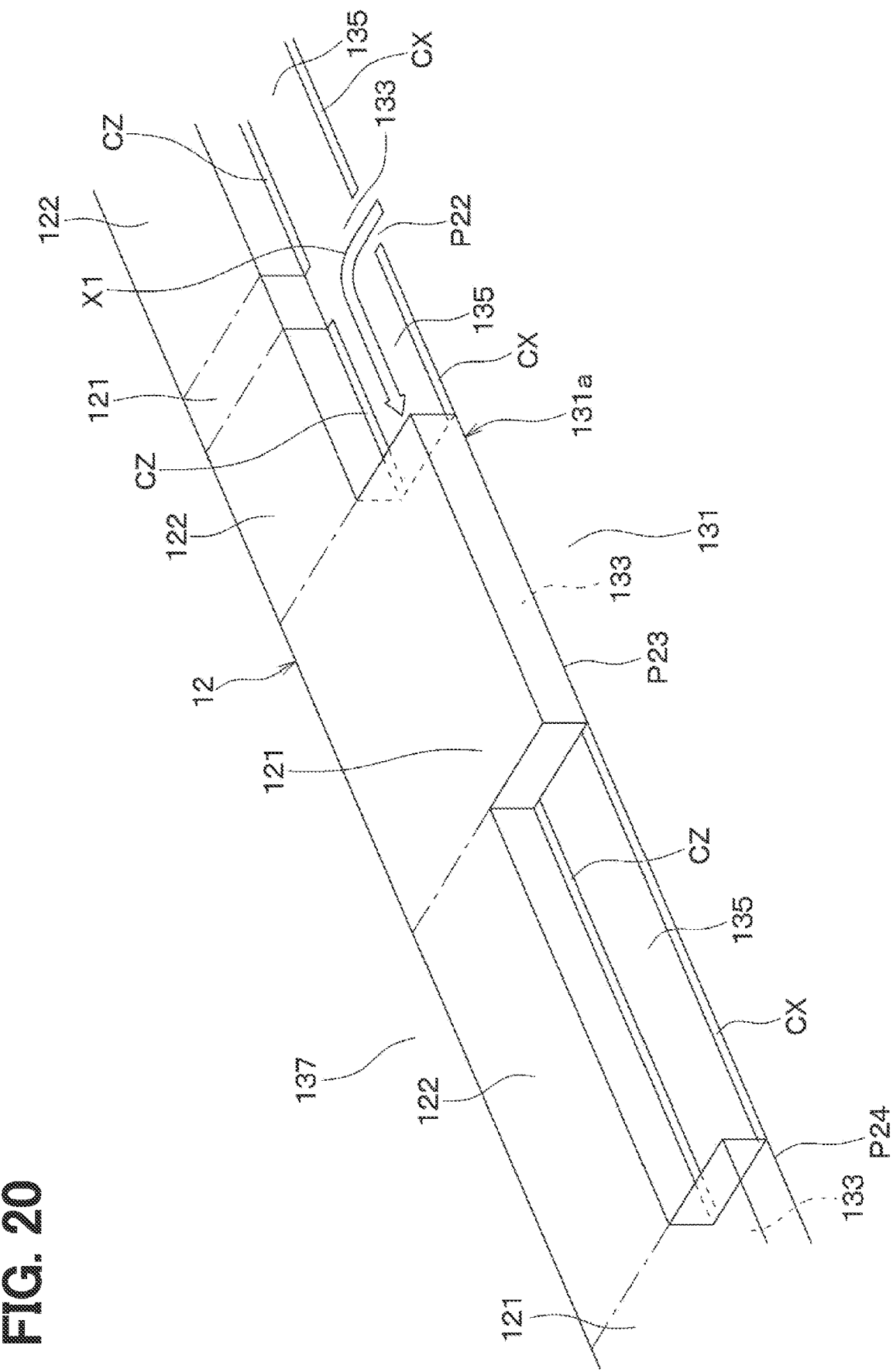
FIG. 20 is a partially enlarged perspective view of a second electrode and a transparent conductive film in a sixth embodiment.

Next, a sixth embodiment will be described with reference to FIG. 20. In a film heater 1 of the present embodiment, the gap CY of the gaps CX, CY, and CZ around the first resistive portion 134 and the second resistive portion 135 is eliminated from the film heater 1 of the first embodiment. FIG. 20 illustrates a state in which the gap CY is eliminated from the second resistive portion 135, but the same goes for the first resistive portion 134.

In the present embodiment, each first resistive portion 134 constitutes the first current suppression portion together with the gaps CX and CZ adjacent to the first resistive portion 134. Further, each second resistive portion 135 constitutes the second current suppression portion together with the gaps CX and CZ adjacent to the second resistive portion 135.

Since the gap CY is eliminated, the second resistive portion 135 of the transparent conductive film 13 is coupled with and conductive to the second bridge portion 133 at the end of the second resistive portion 135 in the direction along the outer edge 131a. Similarly, since the gap CY is eliminated, the first resistive portion 134 of the transparent conductive film 13 is coupled with and conductive to the first bridge portion 132 at the end of the first resistive portion 134 in the direction along the outer edge 131a.

Also in this state, the second current suppression portion in a region between the second ports P23 and P24 suppresses the flow of the current between the inside and outside of the heat generating portion 131 through the region while bypassing the second ports P23 and P24. Further, the gaps CX and CZ of the second current suppression portion suppress the flow of the current between the inside and outside of the heat generating portion 131 through the region between the second ports P23 and P24 along the outer edge 131a of the heat generating portion 131.

In practice, two second bridge portions 133 corresponding to the second ports P23 and P24 are conductive to the second resistive portions 135, thus allowing the current to flow to the second resistive portions 135. However, even though such a current flows, this current between the heat generating portion 131 and the second electrode 12 never bypasses the second ports P23 and P24 in the presence of the gap CX.

Therefore, the second current suppression portion including the second resistive portion 135 that has both ends thereof in the direction along the outer edge 131a in the first connection form suppresses the flow of the current between the inside and outside of the heat generating portion 131 through the second resistive portion 135 while bypassing the second ports on both the ends. As used herein, the outside refers to the second electrode 12.

Similarly, the first current suppression portion including the first resistive portion 134 that has both ends thereof in the direction along the outer edge 131a in the first connection form suppresses the flow of the current between the inside and outside of the heat generating portion 131 through the first resistive portion 134 while bypassing the first ports on both the ends. Further, the gaps CX and CZ of the first current suppression portion suppress the flow of the current between the inside and outside of the heat generating portion 131 through a region between the first ports along the outer edge 131a of the heat generating portion 131. As used herein, the outside refers to the first electrode 11.

The second current suppression portion in a region between the second ports P22 and P23 suppresses the flow of the current between the inside and outside of the heat generating portion 131 through the region while bypassing the second ports P22 and P23. Further, the gaps CX and CZ of the second current suppression portion suppress the flow of the current between the inside and outside of the heat generating portion 131 through the region between the second ports P22 and P23 along the outer edge 131a of the heat generating portion 131.

In practice, two second bridge portions 133 corresponding to the second ports P22 and P23 are conductive to the second resistive portions 135, thus allowing the current to flow to the second resistive portions 135. However, even though such a current flows, this current between the heat generating portion 131 and the second electrode 12 never bypasses the second ports P22 and P23 in the presence of the gap CX.

Furthermore, the current may flow as indicated by the arrow X1. That is, the current may flow from the heat generating portion 131 through the second port P22 and the corresponding second bridge portion 133, further through the second resistive portion 135 above, and then through the second bridge portion 133 corresponding to the second port P23 to reach the second connection portion 121.

However, the length of the path for the current in the second resistive portion 135 at this time is much longer than the length of the path in which the current flows from the second port P22 through the corresponding second bridge portion 133 to reach the corresponding second connection portion 121. For example, the former length is twice or more as long as the latter length. This is because the length of the second current suppression portion along the extension direction of the outer edge 131a is twice or greater than the length of the second bridge portion 133 in the direction orthogonal to the extension direction of the outer edge 131a in the plane of the transparent conductive film 13. As mentioned above, the resistivity of the transparent conductive film 13 is much greater than of the second electrode 12. Therefore, the effect of the current passing through the second resistive portions 135 on the heat generating portion 131 is thought to be very small.

Thus, the gaps CX and CZ and the second resistive portion 135 that has one end in the direction along the outer edge 131a in the first connection form and the other end in the second connection form function as the second current suppression portion. That is, the second current suppression portion suppresses the flow of the current between the inside and outside (i.e., the second electrode 12) of the heat generating portion 131 through the second resistive portion 135 while bypassing the second ports on both ends. The same goes for the gaps CX and CZ and the second resistive portion 135 that has both ends in the direction along the outer edge 131a in the second connection form.

Similarly, the gaps CX and CZ and the first resistive portion 134 that has one end in the direction along the outer edge 131a in the first connection form and the other end in the second connection form function as the first current suppression portion. That is, the first current suppression portion suppresses the flow of the current between the inside and outside (i.e., the first electrode 11) of the heat generating portion 131 through the first resistive portion 134 while bypassing the first ports on both ends. The same goes for the gaps CX and CZ and the first resistive portion 134 that has both ends in the direction along the outer edge 131a in the second connection form.

It is noted that in the present embodiment, the same effects as those in the first embodiment can be obtained from the configuration common to the present embodiment and the first embodiment. In addition, the changes made in the present embodiment with respect to the first embodiment can also be applied to the second, third, fourth, and fifth embodiments in the same manner.

Seventh Embodiment

Figure 21:
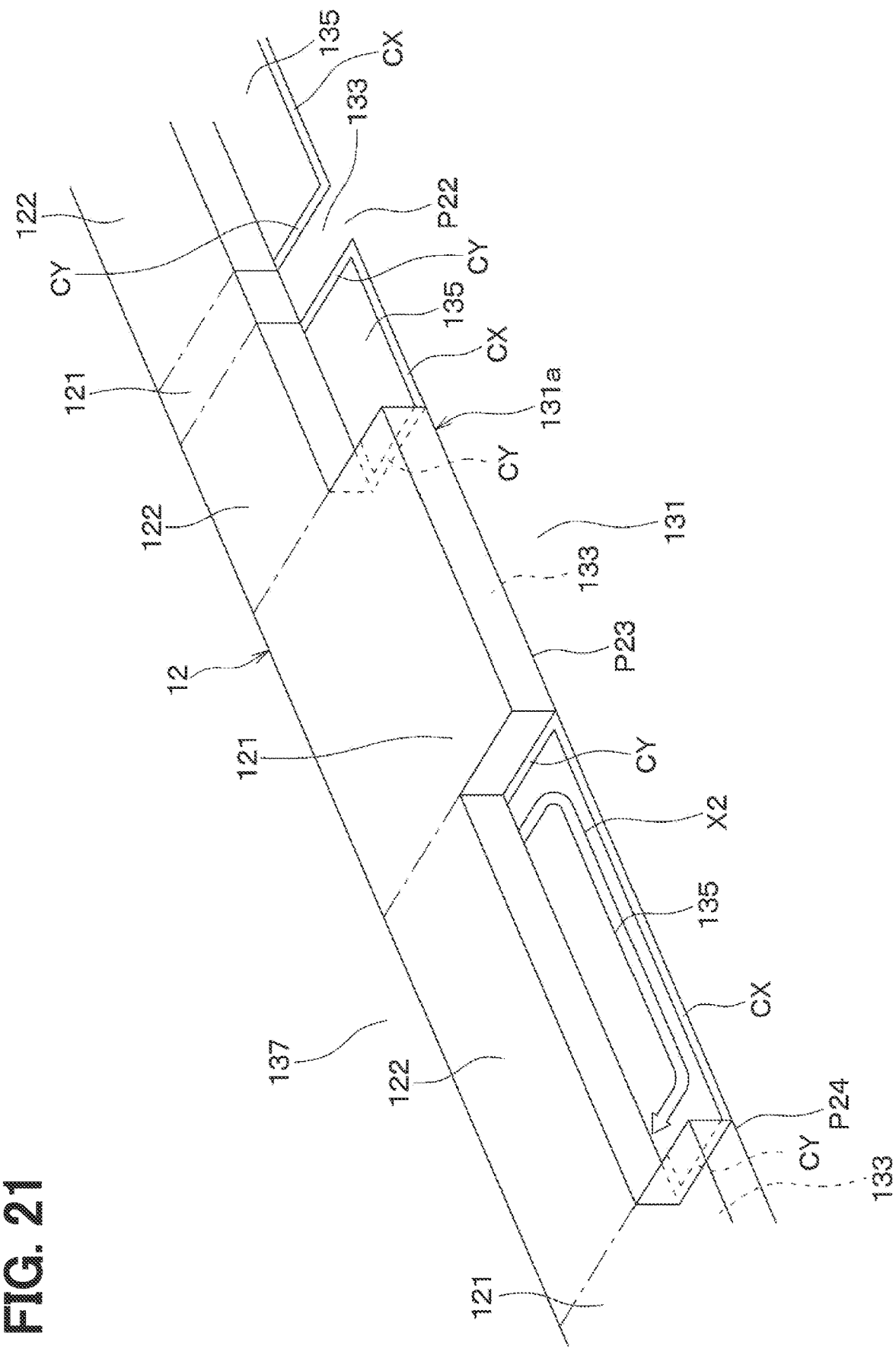
FIG. 21 is a partially enlarged perspective view of a second electrode and a transparent conductive film in a seventh embodiment.

Next, a seventh embodiment will be described with reference to FIG. 21. In a film heater 1 of the present embodiment, the gap CZ of the gaps CX, CY, and CZ around the first resistive portion 134 and the second resistive portion 135 is eliminated from the film heater 1 of the first embodiment. FIG. 21 illustrates a state in which the gap CZ is eliminated from the second resistive portion 135, but the same goes for the first resistive portion 134.

In the present embodiment, each first resistive portion 134 constitutes the first current suppression portion together with the gaps CX and CY adjacent to the first resistive portion 134. Further, each second resistive portion 135 constitutes the second current suppression portion together with the gaps CX and CY adjacent to the second resistive portion 135.

Since the gap CZ is eliminated, the second resistive portion 135 of the transparent conductive film 13 is coupled with and conductive to the second peripheral portion 137. Similarly, since the gap CZ is eliminated, the first resistive portion 134 of the transparent conductive film 13 is coupled with and conductive to the first peripheral portion 136.

Also in this state, the second current suppression portion in a region between the second ports P23 and P24 suppresses the flow of the current between the inside and outside of the heat generating portion 131 through the region while bypassing the second ports P23 and P24. Further, the gaps CX and CY of the second current suppression portion suppress the flow of the current between the inside and outside of the heat generating portion 131 through the region between the second ports P23 and P24 along the outer edge 131a of the heat generating portion 131. The same goes for the second current suppression portion in the region between the second ports P22 and P23.

In practice, the second resistive portion 135 is conductive to the second electrode 12 through the second peripheral portion 137, thus allowing the current to flow to the second resistive portions 135 as indicated by the arrow X2. However, even though such a current flows, this current between the heat generating portion 131 and the second electrode 12 never passes through the heat generating portion 131 by bypassing the second ports P22, P23, and P24 in the presence of the gaps CX and CY.

Since the resistivity of the second electrode 12 is much smaller than the resistivity of the transparent conductive film 13, the amount of current flowing through the second resistive portion 135 as indicated by the arrow X2 is even much smaller than the amount of current flowing through the second bypass portion 122 facing the second resistive portion 135.

Therefore, the second current suppression portion suppresses the flow of the current between the inside and outside (i.e., the second electrode 12) of the heat generating portion 131 through the second resistive portion 135 while bypassing the second ports on both ends. Similarly, the first current suppression portion suppresses the flow of the current between the inside and outside (i.e., the first electrode 11) of the heat generating portion 131 through the first resistive portion 134 while bypassing the first ports on both ends. Further, the first current suppression portion suppresses the flow of the current between the inside and outside of the heat generating portion 131 through a region between the first ports along the outer edge 131a of the heat generating portion 131.

It is noted that the same effects as those in the first embodiment can be obtained in the present embodiment from the configuration common to the present embodiment and the first embodiment. In addition, the changes made in the present embodiment with respect to the first embodiment can also be applied to the second, third, fourth, and fifth embodiments in the same manner.

Eighth Embodiment

Figure 22:
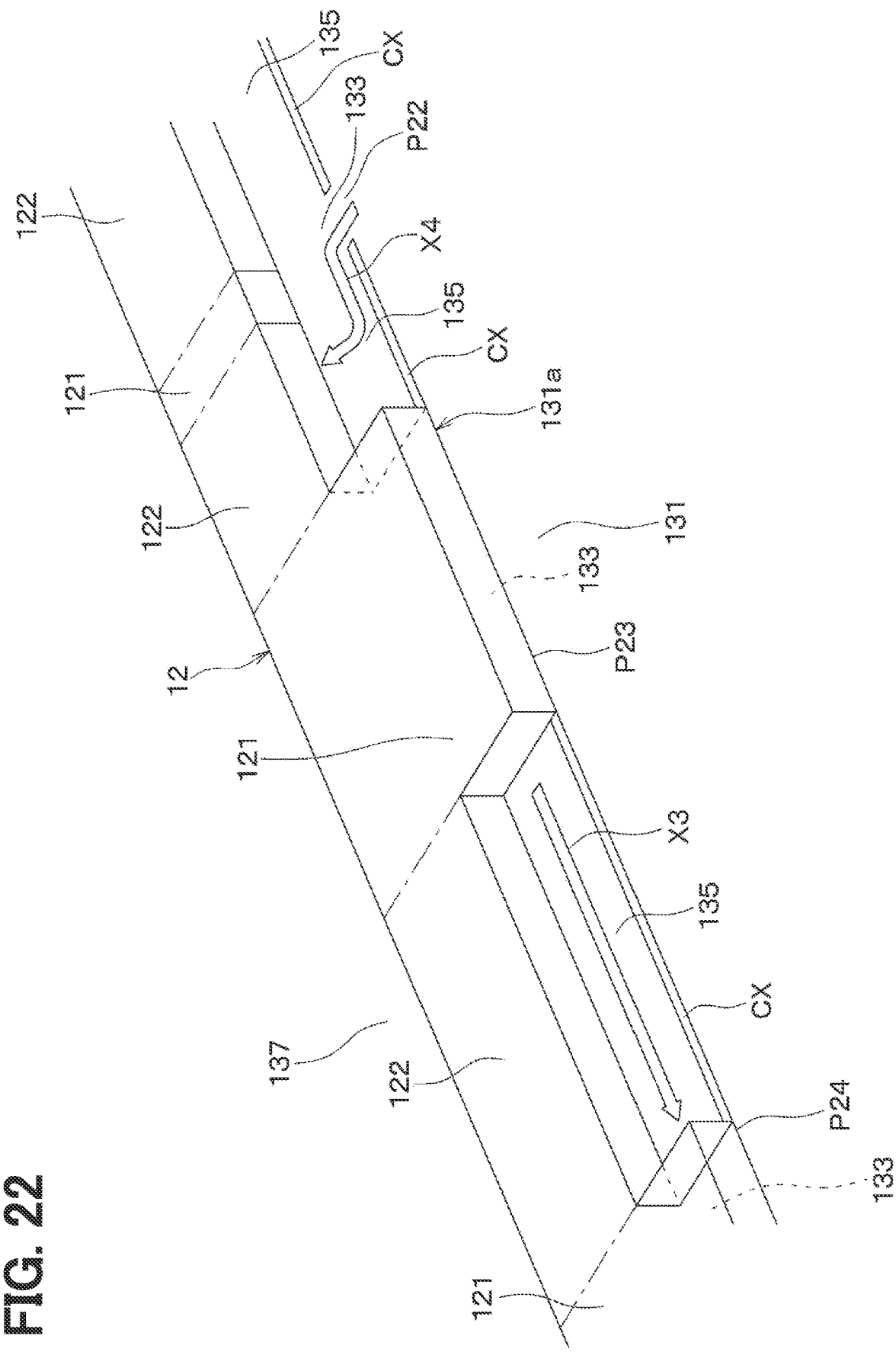
FIG. 22 is a partially enlarged perspective view of a second electrode and a transparent conductive film in an eighth embodiment.

Next, an eighth embodiment will be described with reference to FIG. 22. In a film heater 1 of the present embodiment, the gaps CY and CZ of the gaps CX, CY, and CZ around the first resistive portion 134 and the second resistive portion 135 are eliminated from the film heater 1 of the first embodiment. FIG. 22 illustrates a state in which the gaps CY and CZ are eliminated from the second resistive portion 135, but the same goes for the first resistive portion 134.

In the present embodiment, each first resistive portion 134 constitutes the first current suppression portion together with the gap CX adjacent to the first resistive portion 134. Further, each second resistive portion 135 constitutes the second current suppression portion together with the gap CX adjacent to the second resistive portion 135.

Since the gap CY is eliminated, the second resistive portion 135 of the transparent conductive film 13 is coupled with and conductive to the second bridge portion 133 at the end of the second resistive portion 135 in the direction along the outer edge 131a. In addition, since the gap CZ is eliminated, the second resistive portion 135 is coupled with and conductive to the second peripheral portion 137.

Similarly, since the gap CY is eliminated, the first resistive portion 134 of the transparent conductive film 13 is coupled with and conductive to the first bridge portion 132 at the end of the first resistive portion 134 in the direction along the outer edge 131a. Further, since the gap CZ is eliminated, the first resistive portion 134 is coupled with and conductive to the first peripheral portion 136.

Also in this state, the second current suppression portion in a region between the second ports P23 and P24 suppresses the flow of the current between the inside and outside of the heat generating portion 131 through the region while bypassing the second ports P23 and P24. Further, the gap CX of the second current suppression portion suppresses the flow of the current between the inside and outside of the heat generating portion 131 through the region between the second ports P23 and P24 along the outer edge 131a of the heat generating portion 131.

In practice, two second bridge portions 133 corresponding to the second ports P23 and P24 are conductive to the second resistive portion 135, thus allowing the current to flow to the second resistive portion 135 as indicated by the arrow X3. However, even though such a current flows, this current between the heat generating portion 131 and the second electrode 12 never bypasses the second ports P23 and P24 in the presence of the gap CX.

Therefore, the second current suppression portion that has both ends thereof in the direction along the outer edge 131a in the first connection form suppresses the flow of the current between the inside and outside (i.e., the second electrode 12) of the heat generating portion 131 through the second resistive portion 135 while bypassing the second ports on both ends.

Similarly, the first current suppression portion that has both ends thereof in the direction along the outer edge 131a in the first connection form suppresses the flow of the current between the inside and outside (i.e., the first electrode 11) of the heat generating portion 131 through the first resistive portion 134 while bypassing the first ports on both ends.

Also in this state, the second current suppression portion in a region between the second ports P22 and P23 suppresses the flow of the current between the inside and outside of the heat generating portion 131 through the region while bypassing the second ports P22 and P23. Further, the gap CX of the second current suppression portion suppresses the flow of the current between the inside and outside of the heat generating portion 131 through the region between the second ports P22 and P23 along the outer edge 131a of the heat generating portion 131.

In practice, two second bridge portions 133 corresponding to the second ports P22 and P23 are conductive to the second resistive portion 135, thus allowing the current to flow to the second resistive portion 135. However, even though such a current flows, this current between the heat generating portion 131 and the second electrode 12 never bypasses the second ports P22 and P23 in the presence of the gap CX.

Furthermore, the current may flow as indicated by the arrow X4. That is, the current may flow from the heat generating portion 131 through the second port P22 and the corresponding second bridge portion 133, further through the second resistive portion 135 above, and then through the second peripheral portion 137 to reach the second bypass portion 122.

However, the length of the path for the current to flow through in the second resistive portions 135 at this time is much longer than the length of the path for the current to flow from the second port P22 through the corresponding second bridge portion 133 to reach the corresponding second connection portion 121. For example, the former length is twice or more as long as the latter length. This is because the length of the second resistive portion 135 along the extension direction of the outer edge 131a is twice or greater than the length of the second bridge portion 133 in the direction orthogonal to the extension direction of the outer edge 131a in the plane of the transparent conductive film 13. As mentioned above, the resistivity of the transparent conductive film 13 is much greater than that of the second electrode 12. Therefore, the effect of the current passing through the second resistive portions 135 on the heat generating portion 131 is thought to be very small.

Therefore, the gap CX and the second resistive portion 135 that has one end in the direction along the outer edge 131a in the first connection form and the other end in the second connection form function as the second current suppression portion. That is, the second current suppression portion suppresses the flow of the current between the inside and outside (i.e., the second electrode 12) of the heat generating portion 131 through the second resistive portion 135 while bypassing the second ports on both ends. The same goes for the second current suppression portion that has both ends in the direction along the outer edge 131a in the second connection form.

Similarly, the gap CX and the first resistive portion 134 that has one end in the direction along the outer edge 131a in the first connection form and the other end in the second connection form function as the first current suppression portion. That is, the first current suppression portion suppresses the flow of the current between the inside and outside (i.e., the first electrode 11) of the heat generating portion 131 through the first resistive portion 134 while bypassing the first ports on both ends. Further, the first current suppression portion suppresses the flow of the current between the inside and outside of the heat generating portion 131 through a region between the first ports along the outer edge 131a of the heat generating portion 131. The same goes for the first current suppression portion that has both ends in the direction along the outer edge 131a in the second connection form.

It is noted that the same effects as those in the first embodiment can be obtained in the present embodiment from the configuration common to the present embodiment and the first embodiment. In addition, the changes made in the present embodiment with respect to the first embodiment can also be applied to the second, third, fourth, and fifth embodiments in the same manner.

Ninth Embodiment

Figure 23:
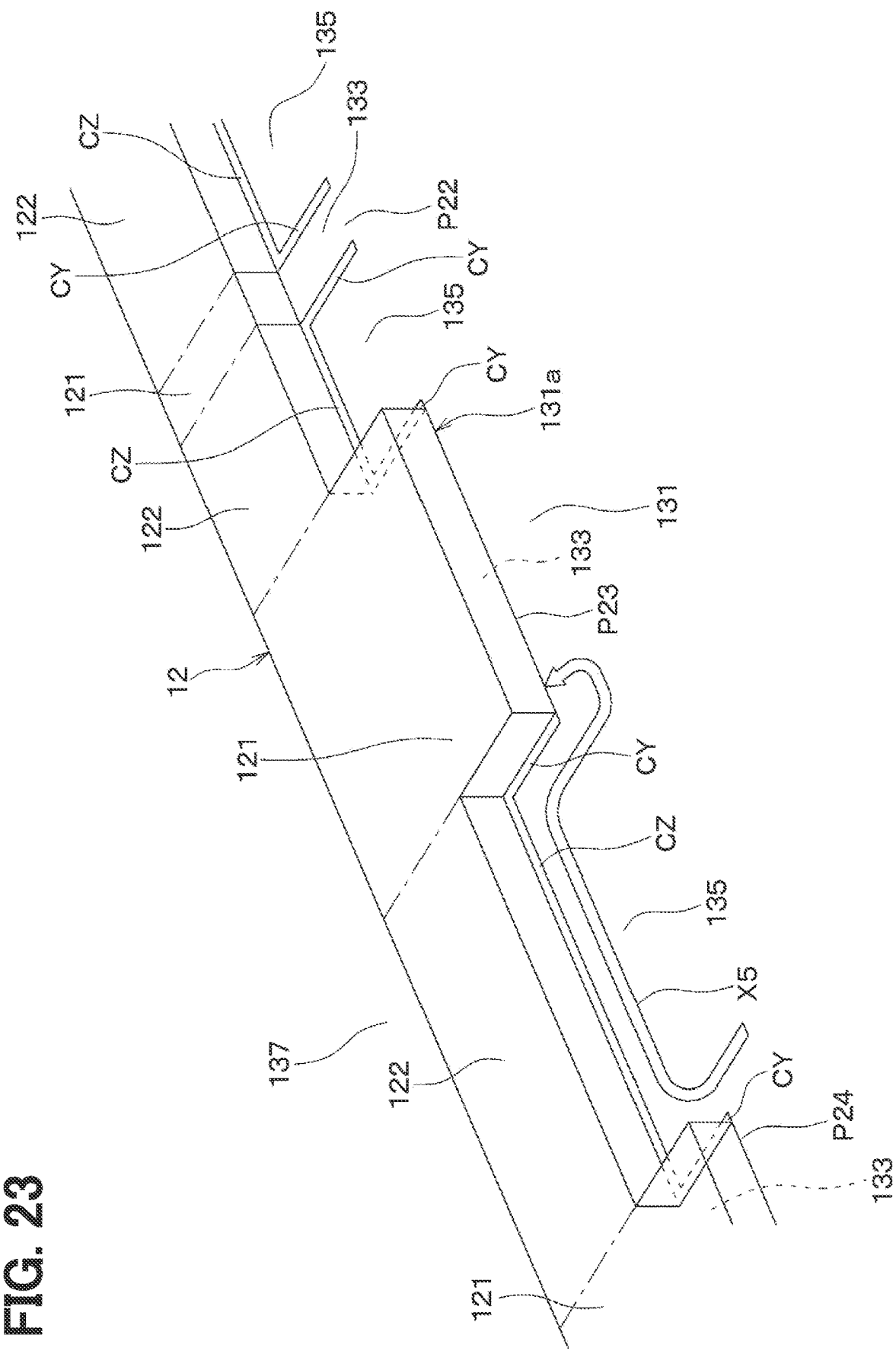
FIG. 23 is a partially enlarged perspective view of a second electrode and a transparent conductive film in a ninth embodiment.

Next, a ninth embodiment will be described with reference to FIG. 23. In a film heater 1 of the present embodiment, the gap CX of the gaps CX, CY, and CZ around the first resistive portion 134 and the second resistive portion 135 is eliminated from the film heater 1 of the first embodiment. FIG. 23 illustrates a state in which the gap CX is eliminated from the second resistive portion 135, but the same goes for the first resistive portion 134.

In the present embodiment, each first resistive portion 134 constitutes the first current suppression portion together with the gaps CY and CZ adjacent to the first resistive portion 134. Further, each second resistive portion 135 constitutes the second current suppression portion together with the gaps CY and CZ adjacent to the second resistive portion 135.

Since the gap CX is eliminated, the second resistive portion 135 of the transparent conductive film 13 is coupled with the outer edge 131a of the heat generating portion 131 and is conductive to the heat generating portion 131. Similarly, since the gap CX is eliminated, the first resistive portion 134 of the transparent conductive film 13 is coupled with the outer edge 131a of the heat generating portion 131 and is conductive to the heat generating portion 131.

Also in this state, the second current suppression portion in a region between the second ports P23 and P24 suppresses the flow of the current between the inside and outside of the heat generating portion 131 through the region while bypassing the second ports P23 and P24. Further, the gaps CY and CZ of the second current suppression portion suppress the flow of the current between the inside and outside of the heat generating portion 131 through the region between the second ports P23 and P24 along the outer edge 131a of the heat generating portion 131. The same goes for the second current suppression portion in a region between the second ports P22 and P23. In practice, the presence of the gaps CZ and CY prevents the current from flowing out of the second resistive portions 135 to the second electrode 12 while bypassing the second ports P22, P23, and P24 from the heat generating portion 131.

It is noted that as indicated by the arrow X5, the current may come around into the second resistive portion 135 from the heat generating portion 131, then return to the heat generating portion 131 again, and subsequently flow from the second port P23 to the second connection portion 121. Consequently, the second resistive portion 135 may generate heat. Regardless of this flow of current and heat generation, the second resistive portion 135 still suppresses the flow of the current between the inside and outside of the heat generating portion 131 through the second resistive portion 135 while bypassing the second ports.

Similarly, the first current suppression portion suppresses the flow of the current between the inside and outside (i.e., the first electrode 11) of the heat generating portion 131 through the first resistive portion 134 while bypassing the first ports on both ends.

It is noted that the same effects as those in the first embodiment can be obtained in the present embodiment from the configuration common to the present embodiment and the first embodiment. In addition, the changes made in the present embodiment with respect to the first embodiment can also be applied to the second, third, fourth, and fifth embodiments in the same manner.

Tenth Embodiment

Figure 24:
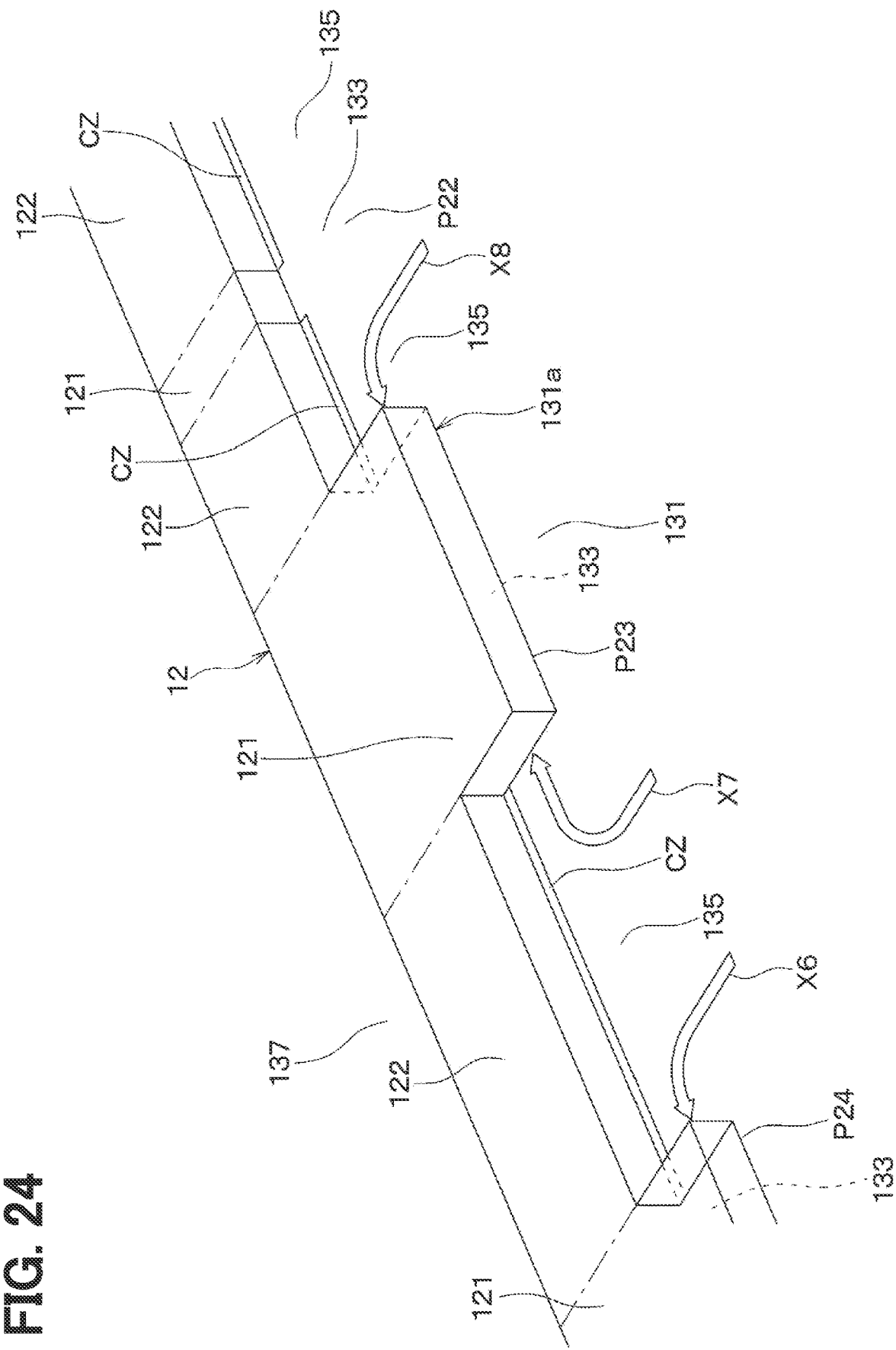
FIG. 24 is a partially enlarged perspective view of a second electrode and a transparent conductive film in a tenth embodiment.

Next, a tenth embodiment will be described with reference to FIG. 24. In a film heater 1 of the present embodiment, the gaps CX and CY of the gaps CX, CY, and CZ around the first resistive portion 134 and the second resistive portion 135 are eliminated from the film heater 1 of the first embodiment. FIG. 24 illustrates a state in which the gaps CX and CY are eliminated from the second resistive portion 135, but the same goes for the first resistive portion 134.

In the present embodiment, each first resistive portion 134 constitutes the first current suppression portion together with the gap CZ adjacent to the first resistive portion 134. Further, each second resistive portion 135 constitutes the second current suppression portion together with the gap CZ adjacent to the second resistive portion 135.

Since the gap CX is eliminated, the second resistive portion 135 of the transparent conductive film 13 is coupled with the outer edge 131a of the heat generating portion 131 and is conductive to the heat generating portion 131. In addition, since the gap CY is eliminated, the second resistive portion 135 of the transparent conductive film 13 is coupled with and conductive to the second bridge portion 133 at the end of the second resistive portion 135 in the direction along the outer edge 131a.

Similarly, since the gap CX is eliminated, the first resistive portion 134 of the transparent conductive film 13 is coupled with the outer edge 131a of the heat generating portion 131 and is conductive to the heat generating portion 131. In addition, since the gap CY is eliminated, the first resistive portion 134 of the transparent conductive film 13 is coupled with and conductive to the first bridge portion 132 at the end of the first resistive portion 134 in the direction along the outer edge 131a.

Also in this state, the gap CZ suppresses the flow of the current between the inside and outside of the heat generating portion 131 through the regions between adjacent ones of the second ports P22, P23, and P24 along the outer edge 131a of the heat generating portion 131.

In practice, three second bridge portions 133 corresponding to the second ports P22, P23, and P24 are conductive to the second resistive portions 135 adjacent to the second bridge portions 133, thus allowing the current to flow through the second resistive portions 135 as indicated by the arrows X6, X7, and X8. Regardless of such flows of the current, the gap CZ suppresses the flows of the current through between the adjacent ones of the second ports P22, P23, and P24 between the second bypass portion 122 and the heat generating portion 131 in the direction orthogonal to the outer edge 131a in the plane of the film heater 1. By suppressing the current in such a direction, not all but most of the flows of the current between the inside and outside of the heat generating portion 131 through the regions between adjacent ones of the second ports P22, P23, and P24 are suppressed.

Also in this state, the gap CZ suppresses the flow of the current between the inside and outside of the heat generating portion 131 through the region between the first ports along the outer edge 131a of the heat generating portion 131.

It is noted that the same effects as those in the first embodiment can be obtained in the present embodiment from the configuration common to the present embodiment and the first embodiment. In addition, the changes made in the present embodiment with respect to the first embodiment can also be applied to the second, third, fourth, and fifth embodiments in the same manner.

Eleventh Embodiment

Next, an eleventh embodiment will be described with reference to FIG. 25. In the present embodiment, the configurations of a transparent conductive film 13, a first electrode 11, and a second electrode 12 are changed from those of the first embodiment.

The transparent conductive film 13 is stacked on the transparent insulating film 14 as in the first embodiment, and includes the heat generating portion 131, the plurality of first bridge portions 132, and the plurality of second bridge portions 133. The shape of the heat generating portion 131 in the present embodiment is the same as in the first embodiment. That is, the outer edge 131a of the heat generating portion 131 has the short side S1, the long side S2, the first oblique side S3, the second oblique side S4, the first cut side S5, and the second cut side S6, which have substantially the same shape as in the first embodiment.

The plurality of first bridge portions 132 protrudes and extends from different positions on the short side S1, the first oblique side S3, and the second oblique side S4 as starting points in the directions away from the heat generating portion 131. Contact portions of the heat generating portion 131 with the first bridge portions 132 are first ports P111 to P121.

The plurality of second bridge portions 133 protrudes and extends from different positions on the long side S2, the first cut side S5, and the second cut side S6 as starting points in the directions away from the heat generating portion 131. Contact portions of the heat generating portion 131 with the second bridge portions 133 are second ports P211 to P216.

Most portions of the first electrode 11 and the second electrode 12 are stacked on the surface of the transparent insulating film 14 on the transparent conductive film 13 side, while only small portions of the first electrode 11 and the second electrode 12 are stacked on the surfaces of the first bridge portions 132 on the side opposite to the transparent insulating film 14.

The first electrode 11 has a first take-out portion 110 and a plurality of first connection portions 111. The first take-out portion 110 receives the power from the power feeder to allow the current to flow from the power feeder to the plurality of first connection portions 111 and the plurality of first bypass portions 112, as in the first embodiment. The entire first take-out portion 110 is stacked on and in contact with the surface of the transparent insulating film 14 on the transparent conductive film 13 side.

The plurality of first connection portions 111 branches off and extends from the end of the first take-out portion 110 on the side opposite to the power feeder side. Each first connection portion 111 has one end connected to the first take-out portion 110 and the other end connected to an end of the corresponding first bridge portion 132. Each first connection portion 111 has a portion connected to an end of the first bridge portion 132, and at this portion, the first connection portion 111 is stacked on and in contact with the end of the first bridge portion 132. Meanwhile, at the other portions, each first connection portion 111 is stacked on and in contact with the surface of the transparent insulating film 14 on the transparent conductive film 13 side. Thus, each first connection portion 111 is conductive to the heat generating portion 131 through the corresponding first bridge portion 132.

The second electrode 12 has a second take-out portion 120 and a plurality of second connection portions 121. The second take-out portion 120 is connected to the ground, as in the first embodiment. The entire second take-out portion 120 is stacked on and in contact with the surface of the transparent insulating film 14 on the transparent conductive film 13 side.

The plurality of second connection portions 121 branches off and extends from the end of the second take-out portion 120 on the side opposite to the ground side. Each second connection portion 121 has one end connected to the second take-out portion 120 and the other end connected to an end of the corresponding second bridge portion 133. Each second connection portion 121 has a portion connected to an end of the second bridge portion 133, and at this portion, the second connection portion 121 is stacked on and in contact with the end of the second bridge portion 133. Meanwhile, at the other portions, each second connection portion 121 is stacked on and in contact with the surface of the transparent insulating film 14 on the transparent conductive film 13 side. Thus, each second connection portion 121 is conductive to the heat generating portion 131 through the corresponding second bridge portion 133.

The operation of the film heater 1 with the above-described configuration will be described below. As illustrated in FIGS. 1 and 2, the power is supplied from the power feeder to the film heater 1 in a state where the film heater 1 is attached to the windshield 3 of the vehicle. Then, the current flows through the first take-out portion 110, the first connection portions 111, the first ports P111 to P121, the heat generating portion 131, the second ports P211 to P216, the second connection portions 121, the second take-out portion 120, and the ground in this order. At this time, when the current flows through the heat generating portion 131 of the transparent conductive film 13, the heat generating portion 131 generates heat, thereby suppressing fogging of a portion of the windshield 3 where the heat generating portion 131 is attached.

At this time, the current does not flow into the heat generating portion 131 or out of the heat generating portion 131 at any portions of the outer edge 131a other than the first ports P111 to P121 and the second ports P211 to P216. That is, the flow of the current between the inside and outside of the heat generating portion 131 through the region between the first ports is suppressed, and the flow of the current between the inside and outside of the heat generating portion 131 through the region between the second ports is also suppressed. This is because only the first bridge portions 132 and the second bridge portions 133 serve as members that make each of the first and second electrodes 11 and 12 conductive to the outer edge 131a in the present embodiment. Except for the first bridge portions 132 and the second bridge portions 133, only the transparent insulating film 14 is present between each of the first and second electrodes 11 and 12 and the outer edge 131a. Therefore, in the present embodiment, a portion of the transparent insulating film 14 located between the first electrode 11 and the outer edge 131a corresponds to the first resistive portion, while a portion of the transparent insulating film 14 located between the second electrode 12 and the outer edge 131a corresponds to the second resistive portion. Each first resistive portion and its surrounding gaps correspond to the first current suppression portion, while each second resistive portion and its surrounding gaps correspond to the second current suppression portion.

The film heater 1 of the present embodiment can obtain the same effects as those of the film heater 1 of the first embodiment. Specifically, the first ports P111 to P121 through which the current flows from the first electrode 11 into the heat generating portion 131 are arranged discretely. Further, the second ports P211 to P216 through which the current flows from the heat generating portion 131 into the second electrode 12 are arranged discretely. Therefore, by devising the positions of the first ports P111 to P121 and the second ports P211 to P216, the unevenness of the temperature distribution in the heat generating portion 131 can be suppressed.

An existence ratio between the first port and the first current suppression portion in the direction along the outer edge 131a is greater in the short side S1 than in each of the first oblique side S3 and the second oblique side S4. The existence ratio in a portion from the center of the first oblique side S3 to its end on the side of the short side S1 is higher than that in a portion from the center of the first oblique side S3 to its end on the side of the long side S2. The existence ratio in a portion from the center of the second oblique side S4 to its end on the side of the short side S1 is higher than that in a portion from the center of the second oblique side S4 to its end on the side of the long side S2. Thus, the unevenness of the temperature distribution in the heat generating portion 131 can be suppressed.

However, the first port P111 is located on the side closer to the long side S2 with respect to the center of the first oblique side S3. Similarly, the first port P121 is located on the side closer to the long side S2 with respect to the center of the second oblique side S4. Thus, the possibility that the temperature of the corner may be biased significantly toward the lower temperature can be reduced.

The first port P114 to P118 are located on the short side S1. The second ports P212 to P215 are located on the long side S2 in the position facing the short side S1. Thus, the possibility that the temperature around the short side S1 may be biased significantly toward the lower temperature can be reduced.

The second port P211 is disposed on the first cut side S5. The second port P216 is disposed on the second cut side S6. Thus, the possibility that the temperature of the corner may be biased significantly toward the lower temperature can be further reduced.

The whole length of the first current suppression portions on both sides of each of the first ports P111, P112, P113, P119, P120, and P121 along the outer edge 131a is longer than the whole length of the second current suppression portions on both sides of each of the second ports P213 and P214 along the outer edge 131a. Thus, the possibility of generation of an excessive amount of heat near the second ports of the heat generating portion 131 can be reduced.

The second port P211 located at the farthest position on one side from the center line CL among the second ports, which center line is a straight line connecting the center of the short side S1 and the center of the long side S2, is farther from the center line CL than the first port P111 located at the farthest position on this side (i.e., the right side) from the center line CL among the first ports. Similarly, the second port P216 located at the farthest position on the other side (i.e., the left side) from the center line CL among the second ports is farther from the center line CL than the first port P121 located at the farthest position on the other side from the center line CL among the first ports. Thus, the possibility that the temperature of the corner may be biased significantly toward the lower temperature can be reduced.

The changes made in the third embodiment with respect to the first embodiment and the changes made in the fourth embodiment thereto can also be applied to the present embodiment in the same manner. Further, the changes made in the fifth to tenth embodiments with respect to the first embodiment can also be applied to the present embodiment in the same manner.

Twelfth Embodiment

Next, a twelfth embodiment will be described with reference to FIG. 26. In the present embodiment, the configurations of a transparent conductive film 13, a first electrode 11, and a second electrode 12 are changed from those of the first embodiment.

The transparent conductive film 13 is stacked on the transparent insulating film 14 as in the first embodiment. The transparent conductive film 13 includes the heat generating portion 131, the plurality of first bridge portions 132, the plurality of second bridge portions 133, the plurality of first resistive portions 134, the plurality of second resistive portions 135, the first peripheral portion 136, and the second peripheral portion 137, as in the first embodiment.

Each first resistive portion 134 and the gaps CX, CY, and CZ disposed around its periphery correspond to the first current suppression portion. In addition, each second resistive portion 135 and the gaps CX, CY, and CZ disposed around its periphery correspond to the second current suppression portion.

Figure 26:
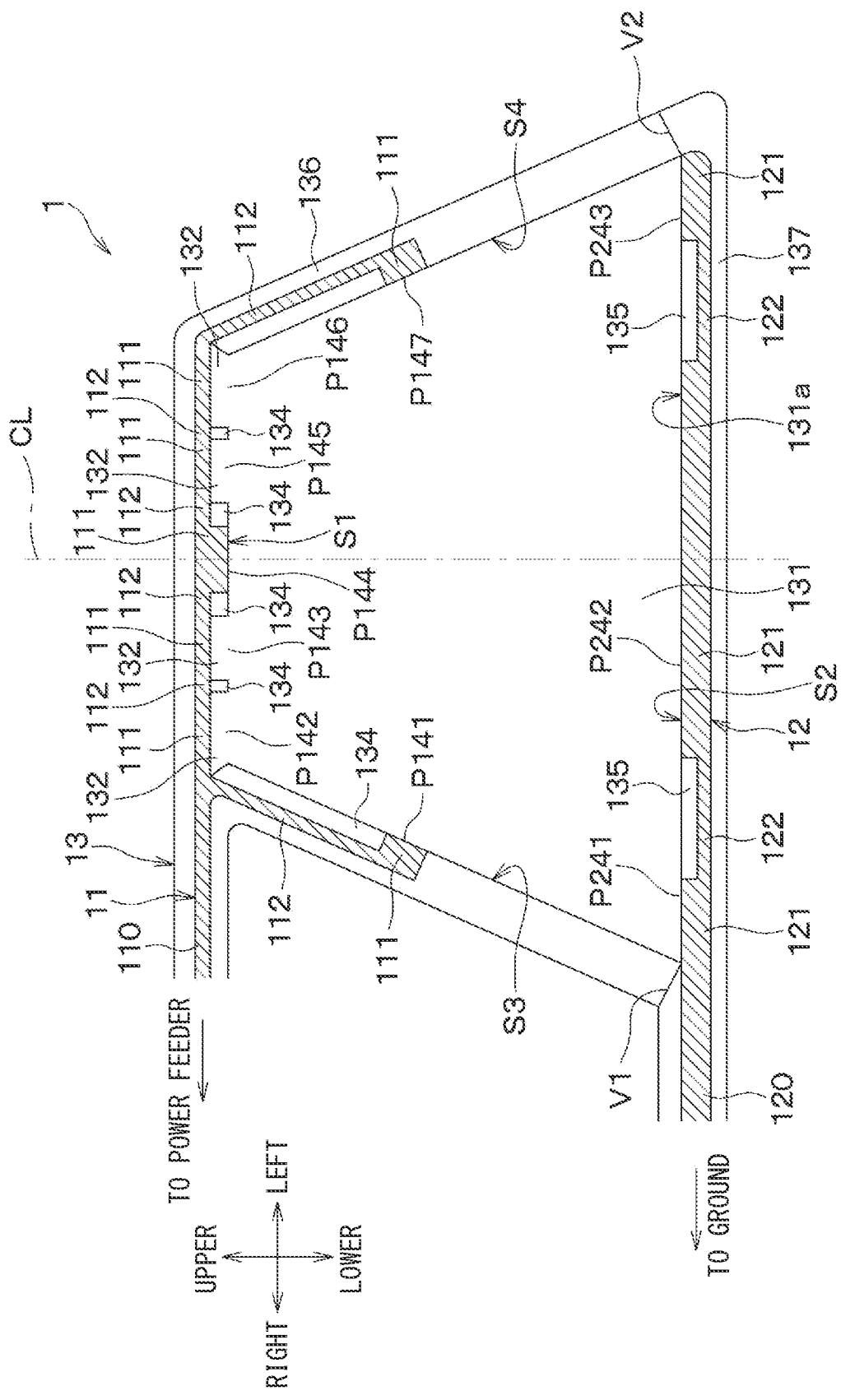
FIG. 26 is a cross-sectional view taken at the same cross-section as FIG. 3 in a twelfth embodiment.

As illustrated in FIG. 26, an outer edge 131a of the heat generating portion 131 has a substantially trapezoidal shape that includes a short side S1, a long side S2, a first oblique side S3, and a second oblique side S4. The outer edge 131a of the present embodiment does not have the first cut side S5 and the second cut side S6.

The form of the short side S1 is the same as that in the first embodiment. The long side S2 is longer than the short side S1 and extends facing the short side S1. The long side S2 has one end (i.e., the right end) connected to a lower end of the first oblique side S3 and the other end (i.e., the left end) connected to a lower end of the second oblique side S4. Each of the short side S1 and the long side S2 extends in a gentle curved shape that is slightly convex toward the outside of the heat generating portion 131 with respect to a horizontal straight line.

The first oblique side S3 extends from a right end of the short side S1 to approach a right end of the long side S2. The second oblique side S4 extends from a left end of the short side S1 to approach a left end of the long side S2. The left side corresponds to one side, while the right side corresponds to the other side. The first oblique side S3 and the second oblique side S4 extend linearly away from each other in the direction from the short side S1 toward the long side S2.

The end of the first oblique side S3 on the side of the short side S1 is connected to the right end of the short side S1, while the end of the first oblique side S3 on the side of the long side S2 is connected to the right end of the long side S2. The end of the second oblique side S4 on the side of the short side S1 is connected to the left end of the short side S1, while the end of the second oblique side S4 on the side of the long side S2 is connected to the left end of the long side S2.

The plurality of first bridge portions 132, the plurality of second bridge portions 133, the plurality of first resistive portions 134, the plurality of second resistive portions 135, and the first peripheral portion 136 are configured as in the first embodiment. However, the numbers of these components in the present embodiment are different from those in the first embodiment. In the present embodiment, seven first ports P141 to P147 and three second ports P241 to P243 are provided according to the changes in the numbers of these components.

Some of the first connection portions 111 in the present embodiment are connected to the transparent conductive film 13 in the first connection form, while the others thereof are connected to the transparent conductive film 13 in the second connection form. Specifically, each of the first connection portions 111 closest to the first bridge portions 132 corresponding to the first ports P141, P144, and P147 is stacked on the corresponding first bridge portion 132. Further, this first connection portion 111 is also stacked on a portion of the first peripheral portion 136 that is connected to the corresponding first bridge portion 132. That is, the first connection portions 111 corresponding to the first ports P141, P144, and P147 are connected to the transparent conductive film 13 in the first connection form.

Each of the first connection portions 111 closest to the first bridge portions 132 corresponding to the first ports P142, P143, P145, and P146 is not stacked on the corresponding second bridge portion 133, but is stacked on a portion of the second peripheral portion 137 that is connected to the corresponding second bridge portion 133. That is, the first connection portions 111 corresponding to the first ports P142, P143, P145, and P146 are connected to the transparent conductive film 13 in the second connection form.

Therefore, the resistance value per unit length from each first connection portion 111 to the corresponding first port along the outer edge 131a of the heat generating portion 131 is lower when the first connection portion 111 is in the first connection form than when the first connection portion 111 is in the second connection form.

Thus, when the width of the first connection portion 111 along the outer edge 131a in the first connection form is the same as that in the second connection form, the current value between the first connection portion 111 in the first connection form and the corresponding first port is greater than the current value between the first connection portion 111 in the second connection form and the corresponding first port.

Here, the first ports corresponding to the respective first connection portions 111 in the first connection form are the first ports P141, P144, and P147. Meanwhile, the first ports corresponding to the respective first connection portions 111 in the second connection form are the first ports P142, P143, P145, and P146.

By making the resistance values per unit length of the different first connection portions 111 along the outer edge 131a of the heat generating portion 131 different in this way, the distribution of the current density of the current flowing through the heat generating portion can be adjusted more flexibly, compared to when setting the resistance values per unit length of different first connection portions 111 uniformly the same. Furthermore, the temperature distribution of the heat generating portion 131 can be adjusted more flexibly. It is noted that all the second connection portions 121 of the present embodiment are connected to the transparent conductive film 13 in the first connection form.

The film heater 1 with such a configuration can obtain the same effects as those of the film heater 1 of the first embodiment. Specifically, the first ports P141 to P147 through which the current flows from the first electrode 11 into the heat generating portion 131 are arranged discretely. Further, the second ports P241 to P243 through which the current flows out of the heat generating portion 131 to the second electrode 12 are arranged discretely. Therefore, by devising the positions of the first ports P141 to P147 and the second ports P241 to P243, the unevenness of the temperature distribution in the heat generating portion 131 can be suppressed.

An existence ratio between the first port and the first current suppression portion in the direction along the outer edge 131a is greater in the short side S1 than in each of the first oblique side S3 and the second oblique side S4. The existence ratio in a portion from the center of the first oblique side S3 to its end on the side of the short side S1 is higher than that in a portion from the center of the first oblique side S3 to its end on the side of the long side S2. The existence ratio in a portion from the center of the second oblique side S4 to its end on the side of the short side S1 is higher than that in a portion from the center of the second oblique side S4 to its end on the side of the long side S2. Thus, the unevenness of the temperature distribution in the heat generating portion 131 can be suppressed.

The first port P142 to P146 are located on the short side S1. A portion of the second port P242 is located on the long side S2 in the position facing the short side S1. Thus, the possibility that the temperature near the short side S1 may be biased significantly toward the lower temperature can be reduced.

The length of the two first current suppression portions, each being adjacent to either the first port P141 or P147, is longer than the length of the two second current suppression portions between the second ports P241 and P243, each being adjacent to either the second port P241 or P243. Thus, the possibility of generation of an excessive amount of heat near the second ports of the heat generating portion 131 can be reduced.

The second port P241 located at the farthest position on one side (i.e., the right side) from the center line CL among the second ports, which center line is a straight line connecting the center of the short side S1 and the center of the long side S2, is farther from the center line CL than the first port P141 located at the farthest position on this side from the center line CL among the first ports. Similarly, the second port P243 located at the farthest position on the other side (i.e., the left side) from the center line CL among the second ports is farther from the center line CL than the first port P147 located at the farthest position on the other side from the center line CL among the first ports. Thus, the possibility that the temperature of the corner may be biased significantly toward the lower temperature can be reduced.

The changes made in the third embodiment with respect to the first embodiment and the changes made in the fourth embodiment thereto can also be applied to the present embodiment in the same manner. Further, the changes made in the fifth to tenth embodiments with respect to the first embodiment can also be applied to the present embodiment in the same manner.

Thirteenth Embodiment

Next, a thirteenth embodiment will be described with reference to FIG. 27. In the present embodiment, the configurations of a transparent conductive film 13, a first electrode 11, and a second electrode 12 are changed from those of the first embodiment.

The transparent conductive film 13 is stacked on the transparent insulating film 14 as in the first embodiment. The transparent conductive film 13 includes the heat generating portion 131, the plurality of first bridge portions 132, the plurality of second bridge portions 133, the plurality of first resistive portions 134, the plurality of second resistive portions 135, the first peripheral portion 136, and the second peripheral portion 137, as in the first embodiment.

Each first resistive portion 134 and the gaps CX, CY, and CZ disposed around its periphery correspond to the first current suppression portion. In addition, each second resistive portion 135 and the gaps CX, CY, and CZ disposed around its periphery correspond to the second current suppression portion.

Figure 27:
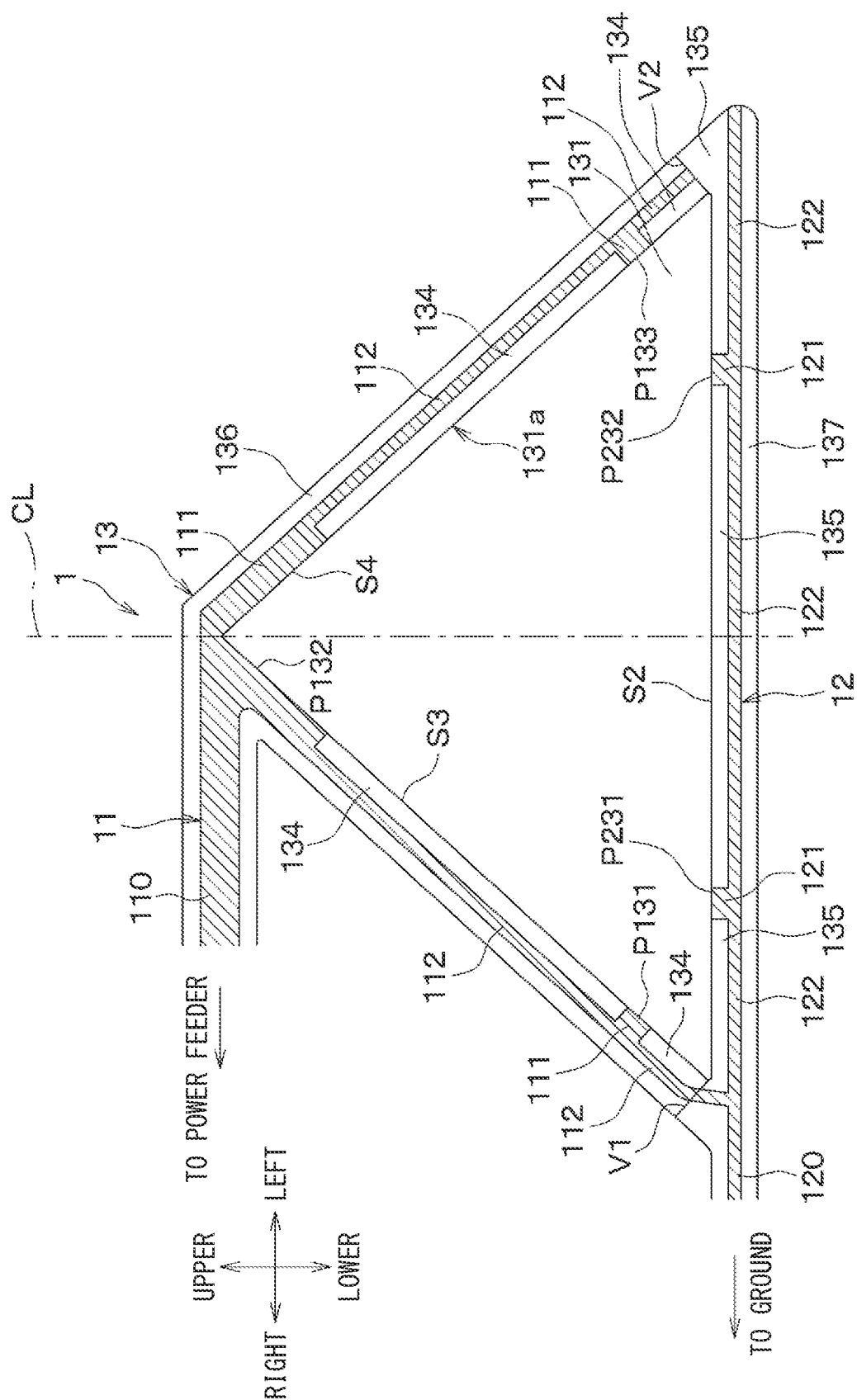
FIG. 27 is a cross-sectional view taken at the same cross-section as FIG. 3 in a thirteenth embodiment.

As illustrated in FIG. 27, the outer edge 131a of the heat generating portion 131 has a substantially triangle shape that has a long side S2, a first oblique side S3, and a second oblique side S4. The outer edge 131a of the present embodiment does not have the short side S1, the first cut side S5, and the second cut side S6.

The long side S2 has one end (i.e., the right end) connected to a lower end of the first oblique side S3 and the other end (i.e., the left end) connected to a lower end of the second oblique side S4. The long side S2 extends in a gentle curved shape that is slightly convex toward the outside of the heat generating portion 131 with respect to a horizontal straight line.

The first oblique side S3 extends from a right end of the second oblique side S4 to approach a right end of the long side S2. The second oblique side S4 extends from a left end of the first oblique side S3 to approach a left end of the long side S2. The left side corresponds to one side, while the right side corresponds to the other side. The first oblique side S3 and the second oblique side S4 extend linearly away from each other toward the long side S2.

The left end of the first oblique side S3 is connected to the right end of the second oblique side S4, while the end of the first oblique side S3 on the side of the long side S2 is connected to the right end of the long side S2. The right end of the second oblique side S4 is connected to the left end of the first oblique side S3, while the end of the second oblique side S4 on the side of the long side S2 is connected to the left end of the long side S2.

The plurality of first bridge portions 132, the plurality of second bridge portions 133, the plurality of first resistive portions 134, the plurality of second resistive portions 135, and the first peripheral portion 136 are configured as in the first embodiment. However, the numbers of these components in the present embodiment are different from those in the first embodiment. In the present embodiment, three first ports P131 to P133 and two second ports P231 and P232 are provided according to the changes in the numbers of these components. It is noted that all the first connection portions 111 and the second connection portions 121 of the present embodiment are connected to the transparent conductive film 13 in the first connection form.

The film heater 1 with such a configuration can obtain the same effects as the film heater 1 of the first embodiment.

Specifically, the current flowing in the plane of the heat generating portion 131 has a substantially two-dimensional flexibility in its flowing direction. Therefore, for each of the first ports P131 to P133, the current flows through the inside of the heat generating portion 131 between the first port and at least two second ports. Specifically, the current flows from each of the first ports P131, P132, and P133 to the second ports P231 and P232. In the above-described embodiment, the current may flow from each of the first ports P131, P132, and P133 to all of the second ports P231 and P232. The current from the first port P131, P132 or P133 may flow to at least both of the second ports P231 and P232. Similarly, for each of the second ports P231 and P232, the current may flow through the inside of the heat generating portion 131 between the second port and at least two first ports.

The first ports P131 to P133 through which the current flows from the first electrode 11 into the heat generating portion 131 are arranged discretely. Further, the second ports P231 and P232 through which the current flows out of the heat generating portion 131 to the second electrode 12 are arranged discretely. Therefore, by devising the positions of the first ports P131 to P133 and the second ports P231 and P232, the unevenness of the temperature distribution in the heat generating portion 131 can be suppressed.

The first port P131 is located on a side closer to the long side with respect to the center of the first oblique side S3. Thus, the possibility that the temperature of a corner sandwiched between the first oblique side S3 and the long side S2 may be biased significantly toward the lower temperature can be reduced. The first port P133 is located on a side closer to the long side with respect to the center of the second oblique side S4. Thus, the possibility that the temperature of a corner sandwiched between the second oblique side S4 and the long side S2 may be biased significantly toward the lower temperature can be reduced.

The first current suppression portion between the first ports P131 and P132 is longer than each of the second current suppression portion adjacent to and on the right side of the second port P231 and the second current suppression portion adjacent to and on the left side of the second port P232. The same goes for the first current suppression portion between the first ports P132 and P133. Thus, the possibility of generation of an excessive amount of heat near the second ports of the heat generating portion 131 can be reduced.

The changes made in the third embodiment with respect to the first embodiment and the changes made in the fourth embodiment thereto can also be applied to the present embodiment in the same manner. Further, the changes made in the fifth to tenth embodiments with respect to the first embodiment can also be applied to the present embodiment in the same manner.

Other Embodiments

The present disclosure is not limited to the above-described embodiments, and various modifications can be made to these embodiments as appropriate. The above-mentioned respective embodiments are not independent of each other and can be combined as appropriate except when the combination thereof is obviously impossible. In the above-mentioned respective embodiments, constituent elements included in the embodiments are not necessarily essential, particularly except when they are clearly indicated to be essential, unless otherwise considered to be clearly essential in principle, and the like. In the above-mentioned respective embodiments, when referring to a specific value in terms of the number, numerical value, quantity, range, and the like of a constituent element of the embodiments, the constituent element is not limited to the specific value, particularly except when it is clearly indicated to be essential, unless otherwise considered to be clearly limited to the specific value in principle, and the like. When the above embodiments have described that external environmental information on the vehicle (for example, humidity outside the vehicle) is acquired from a sensor, the sensor may be abolished, and instead the external environmental information can also be received from a server or cloud outside the vehicle. Alternatively, the sensor can be abolished, and relevant information associated with the external environmental information can be acquired from a server or cloud outside the vehicle, thereby estimating the external environmental information from the acquired relevant information. In particular, when a plurality of values associated with one amount is exemplified, a mean value of the plurality of values can also be adopted, unless otherwise noted or except when clearly impossible in principle. In the above-described respective embodiments, when referring to the shape, positional relationship, and the like of the constituent elements or the like, the constituent element is not limited to the specific shape, positional relationship, and the like, particularly unless otherwise specified, except when they are limited to the specific shape, positional relationship, etc., in principle, or the like. The following modifications associated with the above-described respective embodiments as well as other modifications falling within a scope equivalent thereto are allowed in the present disclosure. In addition, the modifications below can be selectively applied or not applied to the above embodiments independently. In other words, any combination of the modifications below can be applied to the above embodiments.

(Modification 1)

In the above-described third, fourth, and fifth embodiments, the first take-out portion 110, the first resistance increase portion 113, and the heat generating portion 131 are connected in series as illustrated in FIGS. 16, 18, and 19. In the fourth embodiment, the second take-out portion 120, the second resistance increase portion 123, and the heat generating portion 131 are connected in series as illustrated in FIG. 18.

However, the connection form of the resistance increase portion that heats the heat generating portion 131 by generating heat is not necessarily configured in such a manner. For example, as illustrated in FIG. 28, resistance increase portions 115 and 116 may be provided in place of the first resistance increase portion 113 in the third and fifth embodiments. Alternatively, as illustrated in FIG. 28, resistance increase portions 115 and 116 may be provided in place of the first resistance increase portion 113 and the second resistance increase portion 123 in the fourth embodiment.

Each of the resistance increase portions 115 and 116 has one end connected to the first electrode 11 and the other end connected to the second electrode 12 such that the current flows from the first electrode 11 to the second electrode 12 while bypassing the heat generating portion 131. In an example of FIG. 28, one end of the resistance increase portion 115 is connected to the first take-out portion 110, while the other end thereof is connected to the second take-out portion 120. Meanwhile, one end of the resistance increase portion 116 is connected to the first take-out portion 110, while the other end thereof is connected to the second bypass portions 122.

Therefore, the resistance increase portion 115 and the heat generating portion 131 are connected in parallel with respect to the first electrode 11 and the second electrode 12. The resistance increase portion 116 and the heat generating portion 131 are connected in parallel with respect to the first electrode 11 and the second electrode 12. Each of the resistance increase portions 115 and 116 is also coupled with and conductive to the heat generating portion 131 even at the gaps V1 and V2 formed in the transparent conductive film 13.

Each of these resistance increase portions 115 and 116 has the same heat generation characteristics as the first resistance increase portion 113. That is, the resistance per unit length of each of the resistance increase portions 115 and 116 along the flow direction of the current is greater than the resistance per unit length of the first take-out portion 110 along the flow direction of the current. Each of the resistance increase portions 115 and 116 has the same heat generation characteristics as the second resistance increase portion 123. That is, the resistance per unit length of each of the resistance increase portions 115 and 116 along the flow direction of the current is greater than the resistance per unit length of the second take-out portion 120 along the flow direction of the current.

With this arrangement, the temperature of the resistance increase portions 115 and 116 become high, so that the temperature of the heat generating portion 131 can be adjusted with the heat therefrom. Therefore, the temperature distribution of the heat generating portion 131 can be adjusted more flexibly.

Hereinafter, a description will be given on differences in the effects between the case of connecting the resistance increase portion and the heat generating portion 131 in series as in the above third, fourth, and fifth embodiments and the case of connecting the resistance increase portion and the heat generating portion 131 in parallel as in this example.

Assuming that the transparent conductive films 13 with the same resistance are used, when adopting the resistance increase portion and the heat generating portion that are connected in parallel, its internal resistance becomes smaller, and a high temperature can be achieved more quickly. On the other hand, the design of a circuit can be simplified when adopting the resistance increase portion and the heat generating portion that are connected in series.

(Modification 2)

In each of the above embodiments, the plurality of first ports through which the current flows across the outer edge 131a are arranged discretely at the outer edge 131a of the heat generating portion 131, while the plurality of second ports through which the current flows across the outer edge 131a are also arranged discretely at the outer edge 131a of the heat generating portion 131. However, as illustrated in FIG. 29, a single first port and a single second port through which the current flows across the outer edge 131a may be disposed around the entire outer edge 131a as a whole. Even in this case, the unevenness of the temperature distribution in the heat generating portion 131 can be suppressed by the heat generation in the first resistance increase portion 113, the portion 123a of the second resistance increase portion 123, and the portion 123b of the second resistance increase portion 123 as in the fourth embodiment illustrated in FIG. 18. That is, the unevenness of the temperature distribution in the heat generating portion 131 can be suppressed by the heat generation of the resistance increase portions located at three corners.

(Modification 3)

In each of the above embodiments, the first current suppression portion suppresses the flow of the current between the inside and outside of the heat generating portion 131 through the region between the first ports because a portion or the whole of the first current suppression portion is separated from the surrounding transparent conductive film 13. However, the first current suppression portion is not limited to such a configuration. For example, the first current suppression portion may be connected to the surrounding transparent conductive film 13 at its entire periphery and be sufficiently thin compared to the surrounding transparent conductive film 13. Even with this arrangement, the current density of the current flowing between the inside and outside of the heat generating portion 131 can be reduced through the first current suppression ports in the region between the adjacent first ports sufficiently (for example, to ¹⁄₁₀₀₀₀₀ or less of the current density of the current flowing through the first ports). The same goes for the second current suppression portion.

In each of the above embodiments, the first current suppression portion and the second current suppression portion each are composed of a portion of the transparent conductive film 13 and the gap(s), but may be composed of only a gap(s). Alternatively, the first current suppression portion and the second current suppression portion may be made of a non-conductive member (for example, non-conductive resin). In this case, the first current suppression portion may be disposed so as to be sandwiched between the first electrode 11 and the transparent conductive film 13 in the stacking direction of the first electrode 11 and the transparent conductive film 13. Similarly, the second current suppression portion may be disposed so as to be sandwiched between the first electrode 11 and the transparent conductive film 13 in the stacking direction of the second electrode 12 and the transparent conductive film 13.

(Modification 4)

In the above embodiments, the transparent conductive film 13 is composed of an ITO film and a protective film of chromium and chromium oxide formed on the ITO film by sputtering, etc., by way of example. However, the transparent conductive film 13 can have any other configuration as long as it is a transparent film with the electrical conductivity. For example, the transparent conductive film 13 may be a film in which carbon nanotubes are arranged in a network on a highly transparent, non-conductive base material (for example, PET). Such a film also allows the current to flow through paths formed in a complex and fine network inside the film, and thus the current flows substantially in the plane.

(Modification 5)

In the above embodiments, examples of the connection form between each of the first connection portion 111 and the second connection portion 121 and the transparent conductive film 13 are the first connection form and the second connection form. However, any other connection forms which are different from the first and second connection forms may be adopted as the connection form. Alternatively, the connection form between each of the first connection portion 111 and the second connection portion 121 and the transparent conductive film 13 may be only the first connection form or only the second connection form.

(Modification 6)

In each of the above embodiments, the first take-out portion 110 of the first electrode 11 is connected to the power feeder, while the second take-out portion 120 of the second electrode 12 is connected to the ground. Thus, the current flows through the first electrode 11, the heat generating portion 131, and the second electrode 12 in this order. However, conversely, the first take-out portion 110 of the first electrode 11 may be connected to the ground, while the second take-out portion 120 of the second electrode 12 may be connected to the power feeder. That is, the current may flow through the second electrode 12, the heat generating portion 131, and the first electrode 11 in the reverse order from that in each embodiment described above.

(Modification 7)

In the above embodiments, the first resistance increase portion 113 is formed more thinly than each of the first take-out portion 110, the first connection portion 111, and the first bypass portion 112, thereby increasing the amount of heat generated in the first resistance increase portion 113. However, the material for the first resistance increase portion 113 may be made different from that of the first take-out portion 110, the first connection portion 111, and the first bypass portion 112 in order to increase the amount of heat generated in the first resistance increase portion 113. Alternatively, the first resistance increase portion 113 may be formed to be longer than each of the first take-out portion 110, the first connection portion 111, and the first bypass portion 112, thereby increasing the amount of heat generated in the first resistance increase portion 113. The same goes for the relationship of the second resistance increase portion 123 with the second take-out portion 120, the second connection portion 121, and the second bypass portion 122.

(Modification 8)

In the above third and fourth embodiments, the first resistance increase portion 113 may also include two or more portions separated from each other as in the second resistance increase portion 123 of the fourth embodiment. In that case, the resistance value of the first resistance increase portion 113 becomes the sum of resistance values of the two or more portions.

(Modification 9)

In the fourth embodiment illustrated in FIG. 18, the resistance value of the second resistance increase portion 123 is higher than that of the first resistance increase portion 113. However, conversely, the resistance value of the first resistance increase portion 113 may be higher than that of the second resistance increase portion 123. This is because, by having such an arrangement, variations in the temperature of the inside of the heat generating portion 131 may be reduced in some cases.

In such a case, for example, when the second resistance increase portion 123 has the same resistivity and width as the first resistance increase portion 113, the above relationship of the resistance values is achieved if the length of the first resistance increase portion 113 is longer than a half the length of a longer one of the portions 123a and 123b. To this end, the first resistance increase portion 113 may have a meandering and extending shape. More specifically, the first resistance increase portion 113 may meander and extend in the plane of the transparent conductive film 13 so as to fold and overlap in the direction orthogonal to the short side S1 while coming and going in the direction of extension of the short side S1.

(Modification 10)

Figure 25:
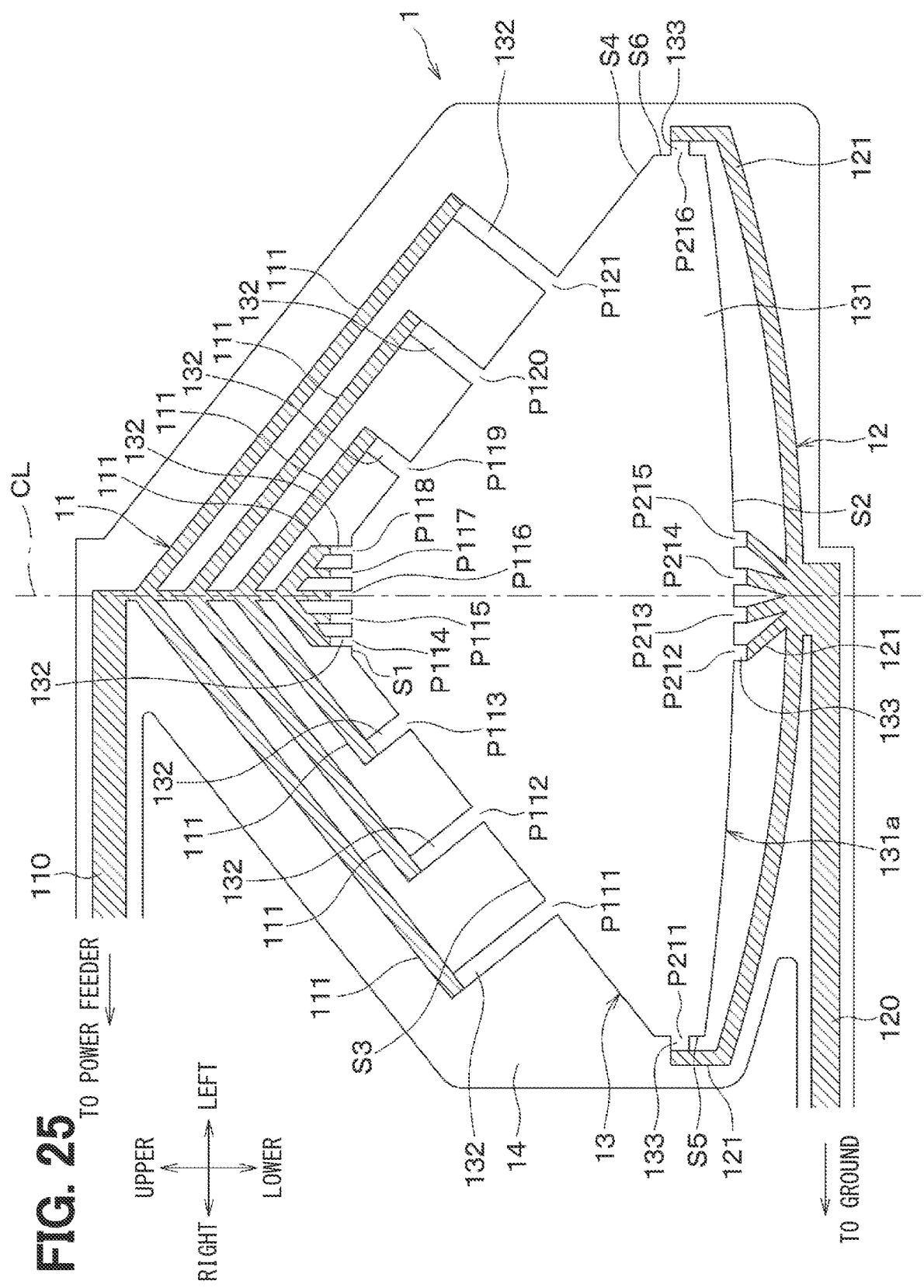
FIG. 25 is a cross-sectional view taken at the same cross-section as FIG. 3 in an eleventh embodiment.

In the eleventh embodiment illustrated in FIG. 25, some or all of the first bypass portions 112 may be replaced by the first connection portions 111. That is, some or all of the first connection portions 111 may be directly connected to the first ports P111 to P121. Similarly, some or all of the second bypass portions 122 may be replaced by the second connection portions 121. That is, some or all of the second connection portions 121 may be directly connected to the second ports P211 to P216.

(Modification 11)

In the eleventh embodiment illustrated in FIG. 25, the transparent conductive film 13 includes only the heat generating portion 131 and the first bridge portions 132 and the second bridge portions 133 that protrude and extend outward from the heat generating portion 131. However, other portions of the transparent conductive film 13 around the heat generating portion 131, the first bridge portions 132, and the second bridge portions 133 may be stacked on the transparent insulating film 14. In such a case, the other portions each may have a gap between each portion and the heat generating portion 131, the first bridge portions 132, the second bridge portions 133, the first electrode 11, and the second electrode 12 so that the other portions are not conductive to these elements. These gaps may be formed by cutting the transparent conductive film 13 with the laser. In this case, the other portions of the transparent conductive film 13 and the gaps correspond to the first current suppression portion and the second current suppression portion.

(Modification 12)

The first cut side S5 and the second cut side S6 of the first embodiment may be added to the configuration of the thirteenth embodiment illustrated in FIG. 27. In such a case, each of the first cut side S5 and the second cut side S6 may be provided with a second port, while the second connection portion 121 and the transparent conductive film 13 may be connected to each other so that the current flows between the heat generating portion 131 and the second electrode 12 through the second port.

(Modification 13)

In each of the above embodiments, the windshield 3 is exemplified as an example of the light transmissive member through which light is transmitted in a vehicle, but the light transmissive member may be another member other than the windshield 3. For example, the light transmissive member may be the rear window glass or the side window glass of the vehicle. Alternatively, the light transmissive member may be a transparent cover member that covers an on-board sensor or an on-board headlight.

(Modification 14)

In each of the above embodiments, an existence ratio of the second connection portions 121 in the long side S2 may be greater than the existence ratio of the second connection portion 121 in the first cut side S5. Similarly, the existence ratio of the second connection portions 121 in the long side S2 may be greater than the existence ratio of the second connection portion 121 in the second cut side S6. As used herein, the existence ratio in each side refers to a ratio of the total length of the second connection portions 121 along the side, which are arranged on the side, to the entire length of the side.

(Modification 15)

In each of the above embodiments, the heat generating portion 131 has a shape symmetrical with respect to the center line CL. However, the shape of the heat generating portion 131 is not necessarily symmetrical with respect to the center line CL. For example, when the film heater 1 is attached to a transparent cover, which is a light transmissive member for covering the headlight of the vehicle or the on-board sensor, the heat generating portion 131 may become laterally asymmetrical due to the shape of the transparent cover. In such a case, only a single second current suppression portion composed of a single second resistive portion 135 and the surrounding gaps CX, CY, and CZ may be disposed across the long side S2, the first cut side S5, and the second cut side S6 in order to suppress lateral asymmetry of the temperature distribution in the heat generating portion 131. In such a case, the second current suppression portion suppresses lateral asymmetry of the temperature distribution in the heat generating portion 131 by biasing the position of the second current suppression portion toward the right or left side with respect to the center of a line segment composed of the long side S2, the first cut side S5, and the second cut side S6.

(Modification 16)

In the above embodiments, for each of all the plurality of first ports, the current flows through the inside of the heat generating portion 131 between the first port and at least two second ports. However, the present disclosure is not necessarily limited to such a configuration. That is, only for each of some first ports, the current may flow through the inside of the heat generating portion 131 between the first port and at least two second ports.

According to a first aspect based on a part or all embodiments described above, a film heater to be attached to a light transmissive member through which light is transmitted in a vehicle includes a transparent conductive film configured to transmit the light and to generate heat by being energized, a first electrode connected to the transparent conductive film, and a second electrode connected to the transparent conductive film. The transparent conductive film includes a heat generating portion configured to heat the light transmissive member by generating heat through the energization using the first electrode and the second electrode. An outer edge of the heat generating portion has a short side, a long side that is longer than the short side and extends while facing the short side, a first oblique side that extends from one end of the short side to approach one end of the long side, and a second oblique side that extends from another end of the short side to approach the another end of the long side. The first electrode includes a plurality of first connection portions corresponding to a plurality of first ports that are located across the short side, the first oblique side, and the second oblique side while being spaced apart from each other. The second electrode includes a plurality of second connection portions corresponding to a plurality of second ports that are located in a range including the long side while being spaced apart from each other. Each of the plurality of first connection portions is connected to the transparent conductive film such that current flows between an inside of the heat generating portion and the first connection portion through the corresponding first port, and each of the plurality of second connection portions is connected to the transparent conductive film such that the current flows between the inside of the heat generating portion and the second connection portion through the corresponding second port. A plurality of first current suppression portions is disposed along the outer edge of the heat generating portion to suppress flow of the current between the inside and an outside of the heat generating portion through a region between the plurality of first ports along the outer edge of the heat generating portion. A plurality of second current suppression portions is disposed along the outer edge of the heat generating portion to suppress flow of the current between the inside and the outside of the heat generating portion through a region between the plurality of second ports along the outer edge of the heat generating portion. Furthermore, each of some or all of the plurality of first ports is configured to flow the current through the inside of the heat generating portion between the first port and at least two second ports According to a second aspect, at least one of the plurality of first ports is located on a side closer to the long side with respect to a center of the first oblique side. A portion of the heat generating portion that is enclosed between a side of the first oblique side closer to the long side with respect to the center of the first oblique side and one side of the long side corresponds to a corner. If none of the first ports exists near the corner, the amount of current flowing to the corner may become extremely small, which may cause the temperature at the corner to be biased significantly toward the lower temperature. In contrast, the possibility that the temperature at the corner may be biased significantly toward the lower temperature can be reduced when at least one of the plurality of first ports is located on the side closer to the long side with respect to the center of the first oblique side as described above.

According to a third aspect, at least one of the plurality of first ports is located on the short side, and at least one of the plurality of second ports is located on the long side in a position facing the short side.

Since the short side is located farther from the long side than the first oblique side and the second oblique side are, the amount of current passing through the first port may become extremely small if at least one first port is located on the short side. Furthermore, the temperature near the short side may be biased significantly toward the lower temperature. In contrast, the possibility that the temperature near the short side may be biased significantly toward the lower temperature can be reduced if at least one second port is located on the long side in the position facing the short side as described above.

According to a fourth aspect, the outer edge of the heat generating portion has a cut side that extends from one end of the first oblique side to the one end of the long side, and at least one of the plurality of second ports is disposed on the cut side.

A portion of the heat generating portion that is enclosed between the side of the first oblique side closer to the long side with respect to the center of the first oblique side and one side of the long side corresponds to the so-called corner. Depending on the arrangement of the first port and the second port, the current may flow less through the corner, causing the temperature of the corner to be biased significantly toward the lower temperature. By providing the cut side, the corner is shaped with its apex cut, so that the tendency for the current to flow less through the corner can be reduced. In addition, by disposing at least one second port on the cut side, the possibility that the temperature of the corner may be biased significantly toward the lower temperature can be further reduced.

According to a fifth aspect, a length of one first current suppression portion of the plurality of first current suppression portions along the outer edge of the heat generating portion is longer than a length of one second current suppression portion of the plurality of second current suppression portions along the outer edge of the heat generating portion.

The length of a portion composed of the short side, the first oblique side, and the second oblique side in the outer edge of the heat generating portion is longer than that of a portion composed of the long side. Therefore, when the plurality of first current suppression portions and the plurality of second current suppression portions have the same length in total, the number of first ports may be much greater than the number of second ports. If the number of first ports becomes much greater than the number of second ports, the current may be concentrated on the second ports, resulting in an excessive amount of heat generated near the second ports of the heat generating portion. In contrast, if any of the first current suppression portions is longer than any of the second current suppression portions, the number of first ports can be prevented from possibly becoming much greater than the number of second ports. Thus, the possibility of generation of an excessive amount of heat near the second ports of the heat generating portion can be reduced.

According to a sixth aspect, a resistance value per unit length of a path in which the current flows from one first connection portion of the plurality of first connection portions to a corresponding first port, along the outer edge of the heat generating portion, is different from a resistance value per unit length from another first connection portion of the plurality of first connection portions to a corresponding first port, along the outer edge of the heat generating portion.

By making the resistance values per unit length of the different first connection portions along the outer edge of the heat generating portion different in this way, the distribution of the current density of the current flowing through the heat generating portion can be adjusted more flexibly, compared to when setting the resistance values per unit length of different first connection portions uniformly the same. Furthermore, the temperature distribution of the heat generating portion can be adjusted more flexibly.

According to a seventh aspect, a resistance value per unit length of a path in which the current flows from one second connection portion of the plurality of second connection portions to a corresponding second port, along the outer edge of the heat generating portion, is different from a resistance value per unit length of a path from another second connection portion of the plurality of second connection portions to a corresponding second port, along the outer edge of the heat generating portion.

By making the resistance values per unit length of the different second connection portions along the outer edge of the heat generating portion different in this way, the distribution of the current density of the current flowing through the heat generating portion can be adjusted more flexibly, compared to when setting the resistance values per unit length of different second connection portions uniformly the same. Furthermore, the temperature distribution of the heat generating portion can be adjusted more flexibly.

According to an eighth aspect, a second port located at a farthest position on one side from a center line among the plurality of second ports is farther from the center line than a first port located at a farthest position on the one side from the center line among the plurality of first ports, the center line connecting a center of the short side and a center of the long side.

A portion of the heat generating portion that is enclosed between the side of the first oblique side closer to the long side with respect to the center of the first oblique side and one side of the long side with respect to the center of the long side corresponds to a so-called corner. Depending on the arrangement of the first port and the second port, the current may flow less through the corner, causing the temperature of the corner to be biased significantly toward the lower temperature side. Specifically, when comparing the first port and the second port which are located at the farthest positions on one side from the center line among the first and second ports, respectively, the current flows avoiding the corner if the first port is located farther from the center line. On the other hand, when comparing the first port and the second port which are located at the farthest positions on one side from the center line among the first and second ports, respectively, the current flows in the direction that passes through the corner if the second port is located farther from the center line. Thus, the possibility that the temperature of the corner may be biased significantly toward the lower temperature can be reduced.

According to a ninth aspect, the first electrode includes a take-out portion connected to a power feeder or a ground, and a resistance increase portion connected to the take-out portion and also to the plurality of first connection portions. The current flows through the take-out portion, the resistance increase portion, the plurality of first connection portions, and the heat generating portion in this order or a reverse order thereto. A resistance per unit length of the resistance increase portion along a flow direction of the current is greater than a resistance per unit length of the take-out portion along the flow direction of the current.

With this arrangement, the temperature of the resistance increase portion becomes high, so that the temperature of the heat generating portion can be adjusted with the heat therefrom. Therefore, the temperature distribution of the heat generating portion can be adjusted more flexibly.

According to a tenth aspect, the resistance increase portion has a width narrower than a width of the take-out portion. Thus, the temperature of the resistance increase portion can be increased by such a simple configuration.

According to an eleventh aspect, the take-out portion is a first take-out portion, the resistance increase portion is a first resistance increase portion, and the second electrode includes a second take-out portion connected to one of the power feeder or the ground to which the first take-out portion is not connected and a second resistance increase portion connected to the second take-out portion and also to the plurality of second connection portions. The current flows through the second take-out portion, the second resistance increase portion, the plurality of second connection portions, and the heat generating portion in this order or a reverse order thereto. A resistance per unit length of the second resistance increase portion along a flow direction of the current is greater than a resistance per unit length of the second take-out portion along the flow direction of the current.

With this arrangement, the temperature of the second resistance increase portion becomes high, so that the temperature of the heat generating portion can be adjusted with the heat therefrom. Therefore, the temperature distribution of the heat generating portion can be adjusted more flexibly.

According to a twelfth aspect, the second resistance increase portion has a width narrower than a width of the second take-out portion. Thus, the temperature of the second resistance increase portion can be increased easily.

According to a thirteenth aspect, a resistance value of the second resistance increase portion is higher than a resistance value of the first resistance increase portion. A portion located near the long side and having a relatively wide area is less likely to be warmed than a portion located near the short side and having a relatively small area because of its relatively wide area. The above-described tendency can be reduced by making the resistance value of the second resistance increase portion greater than that of the first resistance increase portion because the amount of heat generated in the second resistance increase portion becomes larger than that in the first resistance increase portion.

According to a fourteenth aspect, a film heater to be attached to a light transmissive member through which light is transmitted in a vehicle includes a transparent conductive film configured to transmit the light and to generate heat by being energized, a first electrode connected to the transparent conductive film, and a second electrode connected to the transparent conductive film. The transparent conductive film includes a heat generating portion that heats the light transmissive member by generating heat through the energization using the first electrode and the second electrode. An outer edge of the heat generating portion has a long side, a first oblique side, and a second oblique side. The first oblique side has one end connected to the second oblique side and another end connected to one end of the long side. The second oblique side has one end connected to the one end of the first oblique side and another end connected to another end of the long side. The first electrode includes a plurality of first connection portions corresponding to a plurality of first ports that are located across the first oblique side and the second oblique side, while being spaced apart from each other. The second electrode includes a plurality of second connection portions corresponding to a plurality of second ports that are located in a range including the long side, while being spaced apart from each other. Each of the plurality of first connection portions is connected to the transparent conductive film such that current flows between an inside of the heat generating portion and the first connection portion through the corresponding first port. Each of the plurality of second connection portions is connected to the transparent conductive film such that the current flows between the inside of the heat generating portion and the second connection portion through the corresponding second port. A plurality of first current suppression portions is disposed along the outer edge of the heat generating portion to suppress flow of the current between the inside and an outside of the heat generating portion through a region between the plurality of first ports along the outer edge. A plurality of second current suppression portions is disposed along the outer edge of the heat generating portion to suppress flow of the current between the inside and the outside of the heat generating portion through a region between the plurality of second ports along the outer edge. For each of some or all of the plurality of first ports, the current flows through the inside of the heat generating portion between the first port and at least two second ports.

What is claimed is:

1. A film heater to be attached to a light transmissive member through which light is transmitted in a vehicle, the film heater comprising:
    a transparent conductive film configured to transmit the light and to generate heat by being energized;
    a first electrode connected to the transparent conductive film; and
    a second electrode connected to the transparent conductive film, wherein
    the transparent conductive film includes a heat generating portion configured to heat the light transmissive member by generating heat through the energization using the first electrode and the second electrode,
    an outer edge of the heat generating portion has a short side, a long side that is longer than the short side and extends while facing the short side, a first oblique side that extends from one end of the short side to approach one end of the long side, and a second oblique side that extends from another end of the short side to approach the another end of the long side,
    the first electrode includes a plurality of first connection portions corresponding to a plurality of first ports that are located across the short side, the first oblique side, and the second oblique side while being spaced apart from each other,
    the second electrode includes a plurality of second connection portions corresponding to a plurality of second ports that are located in a range including the long side while being spaced apart from each other,
    each of the plurality of first connection portions is connected to the transparent conductive film such that current flows between an inside of the heat generating portion and the first connection portion through the corresponding first port,
    each of the plurality of second connection portions is connected to the transparent conductive film such that the current flows between the inside of the heat generating portion and the second connection portion through the corresponding second port,
    a plurality of first current suppression portions is disposed along the outer edge of the heat generating portion to suppress flow of the current between the inside and an outside of the heat generating portion through a region between the plurality of first ports along the outer edge of the heat generating portion,
    a plurality of second current suppression portions is disposed along the outer edge of the heat generating portion to suppress flow of the current between the inside and the outside of the heat generating portion through a region between the plurality of second ports along the outer edge of the heat generating portion, and
    each of some or all of the plurality of first ports is configured to flow the current through the inside of the heat generating portion between the first port and at least two second ports.

2. The film heater according to claim 1, wherein
at least one of the plurality of first ports is located at a position closer to the long side with respect to a center of the first oblique side.

3. The film heater according to claim 1, wherein
at least one of the plurality of first ports is located on the short side, and
at least one of the plurality of second ports is located on the long side at a position facing the short side.

4. The film heater according to claim 1, wherein
the outer edge of the heat generating portion has a cut side that extends from one end of the first oblique side to the one end of the long side, and
at least one of the plurality of second ports is disposed on the cut side.

5. The film heater according to claim 1, wherein
a length of one first current suppression portion of the plurality of first current suppression portions along the outer edge of the heat generating portion is longer than a length of one second current suppression portion of the plurality of second current suppression portions along the outer edge of the heat generating portion.

6. The film heater according to claim 1, wherein
a resistance value per unit length of a path in which the current flows from one first connection portion of the plurality of first connection portions to a corresponding first port, along the outer edge of the heat generating portion, is different from a resistance value per unit length from another first connection portion of the plurality of first connection portions to a corresponding first port, along the outer edge of the heat generating portion.

7. The film heater according to claim 1, wherein
a resistance value per unit length of a path in which the current flows from one second connection portion of the plurality of second connection portions to a corresponding second port, along the outer edge of the heat generating portion, is different from a resistance value per unit length from another second connection portion of the plurality of second connection portions to a corresponding second port, along the outer edge of the heat generating portion.

8. The film heater according to claim 1, wherein
a second port located at a farthest position on one side from a center line among the plurality of second ports is farther from the center line than a first port located at a farthest position on the one side from the center line among the plurality of first ports, wherein the center line is a line connecting a center of the short side and a center of the long side.

9. The film heater according to claim 1, wherein
the first electrode includes a take-out portion connected to a power feeder or a ground, and a resistance increase portion connected to the take-out portion and to the plurality of first connection portions,
the current flows through the take-out portion, the resistance increase portion, the plurality of first connection portions, and the heat generating portion in this order or a reverse order thereto, and
a resistance per unit length of the resistance increase portion along a flow direction of the current is greater than a resistance per unit length of the take-out portion along the flow direction of the current.

10. The film heater according to claim 9, wherein
the resistance increase portion has a width narrower than a width of the take-out portion.

11. The film heater according to claim 9, wherein
the take-out portion is a first take-out portion,
the resistance increase portion is a first resistance increase portion,
the second electrode includes a second take-out portion connected to one of the power feeder or the ground to which the first take-out portion is not connected, and a second resistance increase portion connected to the second take-out portion and to the plurality of second connection portions,
the current flows through the second take-out portion, the second resistance increase portion, the plurality of second connection portions, and the heat generating portion in this order or a reverse order thereto, and
a resistance per unit length of the second resistance increase portion along the flow direction of the current is greater than a resistance per unit length of the second take-out portion along the flow direction of the current.

12. The film heater according to claim 11, wherein
the second resistance increase portion has a width narrower than a width of the second take-out portion.

13. The film heater according to claim 11, wherein
a resistance value of the second resistance increase portion is higher than a resistance value of the first resistance increase portion.

14. A film heater to be attached to a light transmissive member through which light is transmitted in a vehicle, the film heater comprising:
a transparent conductive film configured to transmit the light and to generate heat by being energized;
a first electrode connected to the transparent conductive film; and
a second electrode connected to the transparent conductive film, wherein
the transparent conductive film includes a heat generating portion that heats the light transmissive member by generating heat through the energization using the first electrode and the second electrode,
an outer edge of the heat generating portion has a long side, a first oblique side, and a second oblique side,
the first oblique side has one end connected to the second oblique side and another end connected to one end of the long side,
the second oblique side has one end connected to the one end of the first oblique side and another end connected to another end of the long side,
the first electrode includes a plurality of first connection portions corresponding to a plurality of first ports that are located across the first oblique side and the second oblique side, while being spaced apart from each other,
the second electrode includes a plurality of second connection portions corresponding to a plurality of second ports that are located in a range including the long side, while being spaced apart from each other,
each of the plurality of first connection portions is connected to the transparent conductive film such that current flows between an inside of the heat generating portion and the first connection portion through the corresponding first port,
each of the plurality of second connection portions is connected to the transparent conductive film such that the current flows between the inside of the heat generating portion and the second connection portion through the corresponding second port,
a plurality of first current suppression portions is disposed along the outer edge of the heat generating portion to suppress flow of the current between the inside and an outside of the heat generating portion through a region between the plurality of first ports along the outer edge,
a plurality of second current suppression portions is disposed along the outer edge of the heat generating portion to suppress flow of the current between the inside and the outside of the heat generating portion through a region between the plurality of second ports along the outer edge, and
for each of some or all of the plurality of first ports, the current flows through the inside of the heat generating portion between the first port and at least two second ports.

* * * * *